US010115261B2

(12) United States Patent
Adams

(10) Patent No.: US 10,115,261 B2
(45) **Date of Patent: *Oct. 30, 2018**

(54) 3D ENHANCEMENTS TO GAMING COMPONENTS IN GAMING SYSTEMS WITH REAL-WORLD PHYSICS

(71) Applicant: IGT CANADA SOLUTIONS ULC, Moncton (CA)

(72) Inventor: Khaled Adams, Moncton (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 812 days.

This patent is subject to a terminal disclaimer.

(21) Appl. No.: 14/327,023

(22) Filed: Jul. 9, 2014

(65) Prior Publication Data

US 2014/0323203 A1 Oct. 30, 2014

Related U.S. Application Data

(63) Continuation of application No. 14/142,176, filed on Dec. 27, 2013, now Pat. No. 9,373,216.

(60) Provisional application No. 61/746,707, filed on Dec. 28, 2012.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC ........ *G07F 17/3213* (2013.01); *G07F 17/326* (2013.01); *G07F 17/34* (2013.01)

(58) Field of Classification Search
USPC .................................................... 463/16–42
See application file for complete search history.

(56) References Cited

U.S. PATENT DOCUMENTS

| | | | |
|---|---|---|---|
| 6,607,441 | B1 | 8/2003 | Acres |
| 6,846,238 | B2 | 1/2005 | Wells |
| 7,804,995 | B2 | 9/2010 | Lipton et al. |
| 8,357,041 | B1 | 1/2013 | Saunders |

(Continued)

FOREIGN PATENT DOCUMENTS

| | | | |
|---|---|---|---|
| CA | 2601560 | A1 | 10/2006 |
| CA | 2783122 | A1 | 1/2013 |

(Continued)

OTHER PUBLICATIONS

United States Patent and Trademark Office, Office Action dated Aug. 25, 2014, issued on U.S. Appl. No. 13/631,129.

(Continued)

*Primary Examiner* — Masud Ahmed
(74) *Attorney, Agent, or Firm* — Sage Patent Group

(57) ABSTRACT

A computer-implemented method for enhancing game components in a gaming system using various three-dimensional enhancements. The three-dimensional enhancements may involve stacks of gaming components to provide and integrate additional symbols, multi-faceted gaming components, multi-faceted gaming surfaces running multiple games in parallel, items animating to simulate real-world physics, merging components, shapes to push up or down gaming components to create stacks, and so on. Further example three-dimensional enhancements are described.

25 Claims, 42 Drawing Sheets

(56) References Cited

U.S. PATENT DOCUMENTS

| | | | |
|---|---|---|---|
| 8,366,538 B1* | 2/2013 | Saunders .............. | G07F 17/326 463/11 |
| 8,371,930 B1* | 2/2013 | Saunders ............ | G07F 17/3211 463/11 |
| 8,414,380 B2 | 4/2013 | Saunders et al. | |
| 8,715,060 B2 | 5/2014 | Bowron | |
| 2002/0122585 A1 | 9/2002 | Swift et al. | |
| 2003/0032479 A1 | 2/2003 | LeMay et al. | |
| 2003/0064805 A1 | 4/2003 | Wells | |
| 2004/0218269 A1 | 11/2004 | Divelbiss et al. | |
| 2005/0020278 A1 | 1/2005 | Krumm et al. | |
| 2005/0117637 A1 | 6/2005 | Routhier et al. | |
| 2005/0190180 A1 | 9/2005 | Jin et al. | |
| 2006/0287060 A1 | 12/2006 | Yoshimi | |
| 2007/0296859 A1 | 12/2007 | Suzuki | |
| 2008/0020845 A1 | 1/2008 | Low et al. | |
| 2008/0090636 A1* | 4/2008 | Lathrop .................. | G07F 17/34 463/20 |
| 2008/0318684 A1 | 12/2008 | Rofougaran | |
| 2010/0248809 A1 | 9/2010 | Fitzsimons | |
| 2010/0267439 A1 | 10/2010 | Englman et al. | |
| 2010/0298040 A1 | 11/2010 | Joshi et al. | |
| 2011/0032329 A1 | 2/2011 | Bauza et al. | |
| 2011/0045891 A1 | 2/2011 | Ansari | |
| 2011/0053675 A1* | 3/2011 | Aoki ................... | G07F 17/3202 463/20 |
| 2011/0298795 A1 | 12/2011 | Van Der Heijden et al. | |
| 2012/0077564 A1 | 3/2012 | Collette et al. | |
| 2012/0077566 A1* | 3/2012 | Schultz ............... | G07F 17/3244 463/20 |
| 2012/0122547 A1* | 5/2012 | Aoki ....................... | G07F 17/34 463/20 |
| 2012/0165101 A1 | 6/2012 | Krishnamoorthy et al. | |
| 2013/0019024 A1 | 1/2013 | Sheth et al. | |
| 2013/0023325 A1* | 1/2013 | Saunders ................ | G07F 17/32 463/20 |
| 2013/0093752 A1 | 4/2013 | Yuan | |
| 2013/0178271 A1 | 7/2013 | Aponte et al. | |
| 2013/0184070 A1 | 7/2013 | Gadher et al. | |
| 2013/0184071 A1 | 7/2013 | Gadher et al. | |
| 2013/0310140 A1 | 11/2013 | Melnick | |
| 2014/0082530 A1* | 3/2014 | De Oliveira .......... | G06F 17/211 715/762 |
| 2014/0087827 A1* | 3/2014 | Nicely ................ | G07F 17/3288 463/20 |
| 2014/0094249 A1* | 4/2014 | Gugler .................... | G07F 17/34 463/20 |
| 2014/0094268 A1 | 4/2014 | Adams | |
| 2014/0187309 A1* | 7/2014 | Trainor ............... | G07F 17/3213 463/20 |
| 2014/0194183 A1 | 7/2014 | Pierer et al. | |

FOREIGN PATENT DOCUMENTS

| | | | |
|---|---|---|---|
| CA | 2783272 | A1 | 1/2013 |
| CA | 2800295 | A1 | 3/2014 |
| CA | 2827465 | A1 | 3/2014 |
| EP | 2551832 | A2 | 1/2013 |
| WO | 2008118800 | A1 | 10/2008 |

OTHER PUBLICATIONS

Patent Cooperation Treaty, Written Opinion and International Search Report dated Oct. 30, 2013, issued on PCT Application No. PCT/CA2013/000636.

United States Patent and Trademark Office, Office Action dated Jun. 20, 2014, issued on U.S. Appl. No. 13/631,129.

* cited by examiner (a) (b) (c) (d) (e) (f) (g)

(c)

(b)

(a)

(b)

(a)

3D ENHANCEMENTS TO GAMING COMPONENTS IN GAMING SYSTEMS WITH REAL-WORLD PHYSICS

CROSS REFERENCE TO RELATED APPLICATION

This application is a continuation of U.S. patent application Ser. No. 14/142,176, filed Dec. 27, 2013, which claims the benefit of U.S. provisional patent application Ser. No. 61/746,707, filed Dec. 28, 2012, the entire contents of which are herein incorporated by reference.

TECHNICAL FIELD

Embodiments described herein relate to the field of electronic gaming systems, such as on-line gaming and gaming systems in casinos.

INTRODUCTION

Various video gaming systems or machines are known. These may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. One type of game displays a plurality of moving arrangements of gaming elements (such as reels, and symbols on reels), and one or more winning combinations are displayed using a pattern of gaming elements in an arrangement of cells (or an "array"), where each cell may include a gaming element, and where gaming elements may define winning combinations (or a "winning pattern").

Games that are based on winning patterns may be referred to as "pattern games" in this disclosure.

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Gaming systems or machines of this type are popular, however, there is a need to compete for the attention of users, and therefore it is necessary to innovate by launching new, engaging game features.

SUMMARY

There are described systems, devices, and methods for providing enhancements to game components in a gaming system.

In accordance with a broad aspect, there is provided a computer-implemented method for enhancing game components in a gaming system, the method comprising: displaying at least one of a row and a column of the game components along a plane on a display device in accordance with a set of game rules for a given game, each one of the game components having an original symbol associated thereto; selecting at least one of the game components for three-dimensional enhancement; expanding selected ones of the game components outside of the plane and associating at least one additional symbol to expanded selected ones of the game components; and integrating the at least one additional symbol into the given game.

In an aspect, embodiments described herein relate to computer-implemented devices, systems and method for enhancing game components that may involve displaying at least one of a row and a column of the game components along a plane on a display device in accordance with a set of game rules for a given game, each one of the game components having an original symbol associated thereto; selecting at least one of the game components for three-dimensional enhancement; expanding selected ones of the game components outside of the plane and associating at least one additional symbol to expanded selected ones of the game components; and integrating the at least one additional symbol into the given game.

In accordance with some embodiments, the three-dimensional enhancement may involve displaying multi-faceted game components as a three dimensional configuration, wherein each multi-faceted game component is associated with a single game symbol, wherein the single game symbol is identifiable on a plurality of faces of the multi-faceted game component such that the single game symbol is identifiable when the multi-faceted game component is part of the three dimensional configuration.

In accordance with some embodiments, the three-dimensional enhancement may involve multi-faceted game components wherein each multi-faceted game component is associated with different game symbols.

In accordance with some embodiments, the three-dimensional enhancement may involve one or more additional game components that combine to create an additional game symbol.

In accordance with some embodiments, the three-dimensional enhancement may involve a three dimensional shape that contacts one or more original symbols and integrates additional game components stacked behind the one or more original symbols.

In accordance with some embodiments, the three-dimensional enhancement may involve transparent areas to integrate additional game components stacked behind the transparent areas.

In accordance with some embodiments, the three-dimensional enhancement may involve with additional symbol positions on the matrix as extra lines.

In accordance with some embodiments, the three-dimensional enhancement may involve a multi-faceted gaming surface that may rotate to reveal and hid different gaming surfaces. The rotation may be on multiple axes.

In accordance with some embodiments, the three-dimensional enhancement may involve stacked symbols used in different winning combinations are removed until the last symbol in the stack is revealed, this symbol is wild feature.

In accordance with some embodiments, the three-dimensional enhancement may involve allowing three-dimensional symbols to have a function when they spin past on a reel without landing, instead of just when the symbol lands in view.

In accordance with some embodiments, the three-dimensional enhancement may involve causing a game component to interact with other game components by imitating real-world physics, the interaction may award wilds, bonus triggers, extra credits, change in the symbols, special symbols, and so on. The real-world physics imitation relates to gravity, and wherein game components may be associated with different virtual weights, so the symbols or gaming components react differently to a virtual gravity effect.

In accordance with some embodiments, the three-dimensional enhancement may involve stacking symbols on the Z-axis to provide a cascading effect for symbols involved in winning combinations.

In accordance with some embodiments, the three-dimensional enhancement may involve a cascading effect for symbols involved in any winning patterns that are created by the new layer of gaming symbols, which may cause winning gaming symbols to disappear and reveal gaming symbols directly beneath to form additional winning patterns.

In accordance with some embodiments, expanding selected ones of the game components comprises stacking the at least one additional symbol with the original symbol along an axis coming out of the display device.

In accordance with some embodiments, stacking the at least one additional symbol with the original symbol comprises at least one of stacking the at least one additional symbol behind the original symbol, and stacking the at least one additional symbol on top of the original symbol.

In accordance with some embodiments, expanding selected ones of the game components comprises exploding the selected ones of the game components into multiple symbols outside of the plane arranged in a predetermined configuration.

In accordance with some embodiments, expanding selected ones of the game components comprises providing a cube with the original symbol on a first surface of the cube and the at least one additional symbol on a second surface of the cube.

In accordance with some embodiments, selecting at least one of the game components for enhancement comprises selecting a plurality of game components, and expanding selected ones comprises generating a multi-faceted gaming surface in three-dimensions.

In accordance with some embodiments, the devices, systems or methods may further involve running multiple instances of the given game in parallel on different surfaces of the multi-faceted gaming surface.

In accordance with some embodiments, the devices, systems or methods may further involve associating the at least one additional symbol with a secondary prize via a secondary game playable in parallel to the given game.

In accordance with some embodiments, the devices, systems or methods may further involve associating the at least one additional symbol with a secondary prize via a secondary game comprises allowing the at least one additional symbol to be displaced on the display device via a user interface.

In accordance with some embodiments, the devices, systems or methods may further involve stacking the at least one additional symbol with the original symbol comprises stacking different ones of the game components to varying depths.

In accordance with some embodiments, the devices, systems or methods may further involve expanding selected ones of the game components comprises providing the at least one additional symbol at least one of parallel, perpendicular, and at an angle with the original symbol.

In accordance with an aspect, embodiments described herein may provide an electronic gaming machine for enhancing game components comprising: at least one processor; at least one persistent data store; at least one receiver to receive game data for storage in the at least one persistent data store; a display device configured with a user interface to display a portion of the game data as a base layer matrix of at least one of a row and a column of game components along a plane in accordance with a set of game rules for a given game, each one of the game components having an original symbol associated thereto; wherein the processor is configured to: generate at least one stack or other three dimensional configuration of at least one additional game component; associate at least one additional symbol with the at least one additional game components in the stack; and integrate the at least one additional symbol into the given game; and wherein the display device is configured with the user interface to display the at least one stack along an axis orthogonal to the plane of the display device in relation to at least one of the game components of the base layer matrix to provide a three-dimensional enhancement.

In accordance with some embodiments, the stack of at least one additional game component along an axis is orthogonal to the plane of the display device is at least one of on top of and below the at least one of the game components of the base layer matrix.

In accordance with some embodiments, at least one additional symbol is associated with a secondary prize via a secondary game playable in parallel to the given game on the display device.

In accordance with some embodiments, the processor is further configured to associate the at least one additional symbol with a secondary prize via a secondary game by allowing the at least one additional symbol to be displaced on the display device via a user interface.

In accordance with some embodiments, the display device is configured with the user interface to display a plurality of stacks of additional game components along an axis orthogonal to the plane of the display device in relation a plurality of the game components of the base layer matrix to provide the three-dimensional enhancement; and the processor is further configured to: associate a plurality of additional symbols with the additional game components in the a plurality of stacks; and integrate the at least one additional symbol into the given game.

In accordance with some embodiments, the processor is further configured to generate the plurality of stacks by stacking different one of the game components to varying depths.

In accordance with some embodiments, the display device is further configured to display a three dimensional enhancement shape in contact with one or more game components of the base layer matrix to generate the plurality of stacks.

In accordance with some embodiments, the display device is further configured to display as the stack a plurality of multi-faceted game components, wherein each multi-faceted game component is associated with a single game symbol, wherein the single game symbol is identifiable on a plurality of faces of the multi-faceted game component such that the single game symbol is identifiable when the multi-faceted game component is part of the stack.

In accordance with some embodiments, the display device is further configured to display at least one game component of the base layer matrix as a transparent area such that the stack of the at least one additional game component is behind and visible through the transparent area to integrate the at least one additional symbol into the given game.

In accordance with some embodiments, the receiver is further configured to receive a request to purchase the at least one additional game component of the stack; and wherein the processor is further configured to determine winning combinations using the symbols in the display device plane and along the stack.

In accordance with some embodiments, the processor is further configured to determine winning combinations of symbols, wherein a winning combination involves the at least one additional symbol of the stack; and remove the at least one additional symbol of the stack to reveal a further symbol, wherein the further symbol is a Wild feature.

In accordance with some embodiments, the processor is further configured to: determine winning combinations of symbols, wherein a winning combination involves the original symbol of the stack; remove the original symbol of the stack to reveal the at least one additional symbol of the stack; and determine an additional winning combination of symbols, wherein the additional winning combination involves the determining winning combinations of symbols, wherein a winning combination involves the at least one additional symbol of the stack.

In another aspect, embodiments described herein may provide an electronic gaming machine for enhancing game components comprising: at least one processor; at least one persistent data store; at least one receiver to receive game data for storage in the at least one persistent data store; a display device configured with a user interface to display: a portion of the game data as at least one of a row and a column of game components along a plane in accordance with a set of game rules for a given game, each one of the game components having an original symbol associated thereto; at least one of the game components as a multi-faceted game component, wherein the multi-faceted game components are displayed in three-dimensional configuration in relation to the plane of the display device; wherein the at least one processor is configured to associate at least one additional symbol with at least one facet of the multi-faceted game component; and integrate the at least one additional symbol into the given game.

In accordance with some embodiments, the multi-faceted game component is a cube with the original symbol on a first surface of the cube and the at least one additional symbol on a second surface of the cube.

In a further aspect, embodiments described herein may provide an electronic gaming machine for enhancing game components comprising: at least one persistent data store; at least one receiver to receive game data for storage in the at least one persistent data store; at least one processor configured to, using a portion of the game data, generate a multi-faceted gaming surface, wherein each gaming surface comprises at least one of a row and a column of game components along a plane in accordance with a set of game rules for a given game; a display device configured with a user interface to display the multi-faceted gaming surface in three-dimensions in relation to the plane of the display device; and wherein the at least one processor is configured to run multiple instances of the given game in parallel on different gaming surfaces of the multi-faceted gaming surface.

In accordance with some embodiments, the at least one processor is configured to rotate one or more axes the multi-faceted gaming surface to reveal or hid a gaming surface, and wherein the display device is configured to display an animation of the rotation.

In a further aspect, embodiments described herein may provide an electronic gaming machine for enhancing game components comprising:

at least one processor; at least one persistent data store; at least one receiver to receive game data for storage in the at least one persistent data store; a display device configured with a user interface to display a portion of the game data as at least one of a row and a column of game components along a plane in accordance with a set of game rules for a given game, each one of the game components having an original symbol associated thereto, and at least two additional game components to provide a three dimensional enhancement in relation to the plane of the display device; wherein the at least one processor is configured to merge the at least two additional game components to provide at least one additional symbol, and integrate the at least one additional symbol into the given game.

In a further aspect, embodiments described herein may provide an electronic gaming machine for enhancing game components comprising: at least one processor; at least one persistent data store; at least one receiver to receive game data for storage in the at least one persistent data store; a display device configured with a user interface to display at least one of a row and a column of game components along a plane in accordance with a set of game rules for a given game, each one of the game components having an original symbol associated thereto, and at least one of the game components as a three dimensional game component in relation to the plane of the display device, wherein the three dimensional game component provides additional functionality to the given game; and wherein the at least one processor is configured to associate at least one additional symbol with the three dimensional game component; and integrate the at least one additional symbol into the given game.

In a further aspect, embodiments described herein may provide an electronic gaming machine for enhancing game components comprising at least one processor; at least one persistent data store; at least one receiver to receive game data for storage in the at least one persistent data store; a display device configured with a user interface to display at least one of a row and a column of the game components along a plane on a display device in accordance with a set of game rules for a given game, each one of the game components having an original symbol associated thereto, and an item in a manner that imitates real-world physics and interacts with the game components, wherein the item provides a three-dimensional enhancement; wherein the at least one processor is configured to integrate the item into the given game based on the interaction.

In accordance with some embodiments, the at least one processor is configured to integrate the item into the given game based on the interaction by awarding at least one of wilds, bonus triggers, extra credits, change in the symbols, and special symbols.

In accordance with some embodiments, the real-world physics relates to at least one of gravity and collision.

In accordance with some embodiments, the real-world physics relates to gravity and wherein the at least one processor is configured to associate the item with a virtual weight so that the item reacts differently to a virtual gravity effect.

In a further aspect, embodiments described herein may provide an electronic gaming system for enhancing game components comprising: a server comprising a transmitter for transmitting electronic data signals representing game data; an electronic device comprising: at least one processor; at least one persistent data store; at least one receiver to receive the electronic data signals representing game data for storage in the at least one persistent data store; a display device configured with a user interface to display a portion of the game data as a base layer matrix of at least one of a row and a column of game components along a plane in accordance with a set of game rules for a given game, each one of the game components having an original symbol associated thereto; wherein the processor is configured to: generate at least one stack or other three dimensional configuration of at least one additional game component;

associate at least one additional symbol with the at least one additional game components in the stack; and integrate the at least one additional symbol into the given game; and wherein the display device is configured with the user interface to display the at least one stack along an axis orthogonal to the plane of the display device in relation to at least one of the game components of the base layer matrix to provide a three-dimensional enhancement; and a network configured to provide a communication link to couple the server and the electronic device.

In accordance with some embodiments, the electronic device is an electronic gaming terminal and wherein the system further comprises: a mobile gaming device operated by a player coupled via a communications link to the electronic gaming terminal, the mobile gaming device running a remote gaming program to play the given game, the first gaming terminal programmed to carry out at least the game functions of pseudo-randomly determining a game outcome and determining an award to a player, receiving player control signals by the first gaming terminal from the mobile gaming device to initiate the first game; wherein the electronic gaming terminal is configured to carry out the first game by the first gaming terminal, including determining a final outcome of the first game and any award for the outcome and transmit electronic data signals to the mobile gaming device identifying the final outcome of the first game and the award.

In accordance with some embodiments, the stack of at least one additional game component along an axis orthogonal to the plane of the display device is at least one of on top of and below the at least one of the game components of the base layer matrix.

In accordance with some embodiments, the processor is further configured to associate the at least one additional symbol with a secondary prize via a secondary game playable in parallel to the given game on the display device.

In accordance with some embodiments, the processor is further configured to associate the at least one additional symbol with a secondary prize via a secondary game by allowing the at least one additional symbol to be displaced on the display device via a user interface.

In accordance with some embodiments, the display device is configured with the user interface to display a plurality of stacks of additional game components along an axis orthogonal to the plane of the display device in relation a plurality of the game components of the base layer matrix to provide the three-dimensional enhancement; the processor is further configured to: associate a plurality of additional symbols with the additional game components in the a plurality of stacks; and integrate the at least one additional symbol into the given game.

In accordance with some embodiments, the processor is further configured to generate the plurality of stacks by stacking different one of the game components to varying depths.

In accordance with some embodiments, the display device is further configured to display a three dimensional enhancement shape in contact with one or more game components of the base layer matrix to generate the plurality of stacks.

In accordance with some embodiments, the display device is further configured to display as the stack a plurality of multi-faceted game components, wherein each multi-faceted game component is associated with a single game symbol, wherein the single game symbol is identifiable on a plurality of faces of the multi-faceted game component such that the single game symbol is identifiable when the multi-faceted game component is part of the stack.

In accordance with some embodiments, the display device is further configured to display at least one game component of the base layer matrix as a transparent area such that the stack of the at least one additional game component is behind and visible through the transparent area to integrate the at least one additional symbol into the given game.

In accordance with some embodiments, the receiver is further configured to receive a request to purchase the at least one additional game component of the stack; and wherein the processor is further configured to determine winning combinations using the symbols in the display device plane and along the stack.

In accordance with some embodiments, the processor is further configured to determine winning combinations of symbols, wherein a winning combination involves the at least one additional symbol of the stack; and remove the at least one additional symbol of the stack to reveal a further symbol, wherein the further symbol is a Wild feature.

In accordance with some embodiments, the processor is further configured to: determine winning combinations of symbols, wherein a winning combination involves the original symbol of the stack; remove the original symbol of the stack to reveal the at least one additional symbol of the stack; and determine an additional winning combination of symbols, wherein the additional winning combination involves the determining winning combinations of symbols, wherein a winning combination involves the at least one additional symbol of the stack.

In a further aspect, embodiments described herein may provide an electronic gaming system for enhancing game components comprising: a server comprising a transmitter for transmitting electronic data signals representing game data; an electronic device comprising: at least one processor; at least one persistent data store; at least one receiver to receive the game data for storage in the at least one persistent data store; a display device configured with a user interface to display: a portion of the game data as at least one of a row and a column of game components along a plane in accordance with a set of game rules for a given game, each one of the game components having an original symbol associated thereto; at least one of the game components as a multi-faceted game component, wherein the multi-faceted game components are displayed in three-dimensional configuration in relation to the plane of the display device; wherein the at least one processor is configured to associate at least one additional symbol with at least one facet of the multi-faceted game component; and integrate the at least one additional symbol into the given game; and a network configured to provide a communication link to couple the server and the electronic device.

The multi-faceted game component may be a cube with the original symbol on a first surface of the cube and the at least one additional symbol on a second surface of the cube.

In a further aspect, embodiments described herein may provide an electronic gaming system for enhancing game components comprising: a server comprising a transmitter for transmitting electronic data signals representing game data; an electronic device comprising: at least one persistent data store; at least one receiver to receive the game data for storage in the at least one persistent data store; at least one processor configured to, using a portion of the game data, generate a multi-faceted gaming surface, wherein each gaming surface comprises at least one of a row and a column of game components along a plane in accordance with a set of game rules for a given game; a display device configured with a user interface to display the multi-faceted gaming surface in three-dimensions in relation to the plane of the display device; and wherein the at least one processor is configured to run multiple instances of the given game in parallel on different gaming surfaces of the multi-faceted gaming surface; and a network configured to provide a communication link to couple the server and the electronic device.

In accordance with some embodiments, the at least one processor is configured to rotate one or more axes the multi-faceted gaming surface to reveal or hid a gaming surface, and wherein the display device is configured to display an animation of the rotation.

In a further aspect, embodiments described herein may provide an electronic gaming system for enhancing game components comprising: a server comprising a transmitter for transmitting electronic data signals representing game data; an electronic device comprising: at least one processor; at least one persistent data store; at least one receiver to receive the game data for storage in the at least one persistent data store; a display device configured with a user interface to display a portion of the game data as at least one of a row and a column of game components along a plane in accordance with a set of game rules for a given game, each one of the game components having an original symbol associated thereto, and at least two additional game components to provide a three dimensional enhancement in relation to the plane of the display device; wherein the at least one processor is configured to merge the at least two additional game components to provide at least one additional symbol, and integrate the at least one additional symbol into the given game; and a network configured to provide a communication link to couple the server and the electronic device.

In a further aspect, embodiments described herein may provide an electronic gaming system for enhancing game components comprising: a server comprising a transmitter for transmitting electronic data signals representing game data; an electronic device comprising: at least one processor; at least one persistent data store; at least one receiver to receive game data for storage in the at least one persistent data store; a display device configured with a user interface to display at least one of a row and a column of game components along a plane in accordance with a set of game rules for a given game, each one of the game components having an original symbol associated thereto, and at least one of the game components as a three dimensional game component in relation to the plane of the display device, wherein the three dimensional game component provides additional functionality to the given game; and wherein the at least one processor is configured to associate at least one additional symbol with the three dimensional game component; and integrate the at least one additional symbol into the given game; and a network configured to provide a communication link to couple the server and the electronic device.

In a further aspect, embodiments described herein may provide an electronic gaming system for enhancing game components comprising a server comprising a transmitter for transmitting electronic data signals representing game data; an electronic device comprising: at least one processor; at least one persistent data store; at least one receiver to receive game data for storage in the at least one persistent data store; a display device configured with a user interface to display at least one of a row and a column of the game components along a plane on a display device in accordance with a set of game rules for a given game, each one of the game components having an original symbol associated thereto, and an item in a manner that imitates real-world physics and interacts with the game components, wherein the item provides a three-dimensional enhancement; wherein the at least one processor is configured to integrate the item into the given game based on the interaction; and a network configured to provide a communication link to couple the server and the electronic device.

In accordance with some embodiments, the at least one processor is configured to integrate the item into the given game based on the interaction by awarding at least one of wilds, bonus triggers, extra credits, change in the symbols, and special symbols.

In accordance with some embodiments, the real-world physics relates to at least one of gravity and collision.

In accordance with some embodiments, the real-world physics relates to gravity and wherein the at least one processor is configured to associate the item with a virtual weight so that the item reacts differently to a virtual gravity effect.

In a further aspect, embodiments described herein may provide a computer-implemented method for enhancing game components in a gaming system, the method comprising: displaying on a display device a base layer matrix of at least one of a row and a column of game components along a plane in accordance with a set of game rules for a given game, each one of the game components having an original symbol associated thereto; generating at least one stack or other three dimensional configuration of at least one additional game component; displaying on the display device the at least one stack along an axis orthogonal to the plane of the display device in relation to at least one of the game components of the base layer matrix to provide a three-dimensional enhancement; associating at least one additional symbol with the at least one additional game components in the stack; and integrating the at least one additional symbol into the given game.

In accordance with some embodiments, the stack of at least one additional game component along an axis orthogonal to the plane of the display device is at least one of on top of and below the at least one of the game components of the base layer matrix.

In accordance with some embodiments, the method may further involve associating the at least one additional symbol with a secondary prize via a secondary game playable in parallel to the given game.

In accordance with some embodiments, the method may further involve associating the at least one additional symbol with a secondary prize via a secondary game comprises allowing the at least one additional symbol to be displaced on the display device via a user interface.

In accordance with some embodiments, the method may further involve displaying on the display device a plurality of stacks of additional game components along an axis orthogonal to the plane of the display device in relation a plurality of the game components of the base layer matrix to provide the three-dimensional enhancement; associating a plurality of additional symbols with the additional game components in the a plurality of stacks; and integrating the at least one additional symbol into the given game.

In accordance with some embodiments, the method may further involve generating the plurality of stacks by stacking different one of the game components to varying depths.

In accordance with some embodiments, the method may further involve displaying a three dimensional enhancement shape in contact with one or more game components of the base layer matrix to generate the plurality of stacks.

In accordance with some embodiments, the method may further involve displaying as the stack a plurality of multi-faceted game components, wherein each multi-faceted game component is associated with a single game symbol, wherein the single game symbol is identifiable on a plurality of faces of the multi-faceted game component such that the single game symbol is identifiable when the multi-faceted game component is part of the stack.

In accordance with some embodiments, the method may further involve displaying on a display device at least one game component of the base layer matrix as a transparent area such that the stack of the at least one additional game component is behind and visible through the transparent area to integrate the at least one additional symbol into the given game.

In accordance with some embodiments, the method may further involve receiving a request to purchase the at least one additional game component of the stack, wherein winning combinations may be determined using the symbols in the display device plane and along the stack.

In accordance with some embodiments, the method may further involve determining winning combinations of symbols, wherein a winning combination involves the at least one additional symbol of the stack; and removing the at least one additional symbol of the stack to reveal a further symbol, wherein the further symbol is a Wild feature.

In accordance with some embodiments, the method may further involve determining winning combinations of symbols, wherein a winning combination involves the original symbol of the stack; and removing the original symbol of the stack to reveal the at least one additional symbol of the stack; determining an additional winning combination of symbols, wherein the additional winning combination involves the determining winning combinations of symbols, wherein a winning combination involves the at least one additional symbol of the stack.

In a further aspect, embodiments described herein may provide a computer-implemented method for enhancing game components in a gaming system, the method comprising: displaying on a display device at least one of a row and a column of game components along a plane in accordance with a set of game rules for a given game, each one of the game components having an original symbol associated thereto; displaying at least one of the game components as a multi-faceted game component, wherein the multi-faceted game components are displayed in three-dimensional configuration in relation to the plane of the display device; associating at least one additional symbol with at least one facet of the multi-faceted game component; and integrating the at least one additional symbol into the given game.

In accordance with some embodiments, the multi-faceted game component is a cube with the original symbol on a first surface of the cube and the at least one additional symbol on a second surface of the cube.

In a further aspect, embodiments described herein may provide a computer-implemented method for enhancing game components in a gaming system, the method comprising: generating a multi-faceted gaming surface, wherein each gaming surface comprises at least one of a row and a column of game components along a plane in accordance with a set of game rules for a given game; displaying on a display device the multi-faceted gaming surface in three-dimensions in relation to the plane of the display device; and running multiple instances of the given game in parallel on different gaming surfaces of the multi-faceted gaming surface.

In accordance with some embodiments, the method may further involve rotating one or more axes the multi-faceted gaming surface to reveal or hid a gaming surface.

In a further aspect, embodiments described herein may provide a computer-implemented method for enhancing game components in a gaming system, the method comprising: displaying on a display device at least one of a row and a column of game components along a plane in accordance with a set of game rules for a given game, each one of the game components having an original symbol associated thereto; displaying at least two additional game components to provide a three dimensional enhancement in relation to the plane of the display device.

merging the at least two additional game components to provide at least one additional symbol; and integrating the at least one additional symbol into the given game.

In a further aspect, embodiments described herein may provide a computer-implemented method for enhancing game components in a gaming system, the method comprising: displaying on a display device at least one of a row and a column of game components along a plane in accordance with a set of game rules for a given game, each one of the game components having an original symbol associated thereto; displaying at least one of the game components as a three dimensional game component in relation to the plane of the display device, wherein the three dimensional game component provides additional functionality to the given game; and associating at least one additional symbol with the three dimensional game component; and integrating the at least one additional symbol into the given game.

In a further aspect, embodiments described herein may provide a computer-implemented method for enhancing game components in a gaming system, the method comprising displaying at least one of a row and a column of the game components along a plane on a display device in accordance with a set of game rules for a given game, each one of the game components having an original symbol associated thereto; displaying an item in a manner that imitates real-world physics and interacts with the game components, wherein the item provides a three-dimensional enhancement; integrating the item into the given game based on the interaction.

In accordance with some embodiments, the method may further involve integrating the item into the given game based on the interaction by awarding at least one of wilds, bonus triggers, extra credits, change in the symbols, and special symbols.

In accordance with some embodiments, the real-world physics relates to at least one of gravity and collision.

In accordance with some embodiments, the real-world physics relates to gravity and wherein the method further involves: associating the item with a virtual weight so that the item reacts differently to a virtual gravity effect.

Features of the systems, devices, and methods described herein may be used in various combinations, and may also be used for the system and computer-readable storage medium in various combinations.

In this specification, the term “game component” or game element is intended to mean any individual element which when grouped with other elements will form a layout for a game. For example, in card games such as poker, blackjack, and gin rummy, the game components may be the cards that form the player’s hand and/or the dealer’s hand, and cards that are drawn to further advance the game. In a traditional Bingo game, the game components may be the numbers printed on a 5×5 matrix which the players must match against drawn numbers. The drawn numbers may also be game components. In a spinning reel game, each reel may be made up of one or more game components. Each game component may be represented by a symbol of a given image, number, shape, color, theme, etc. Like symbols are of a same image, number, shape, color, theme, etc. Other embodiments for game components will be readily understood by those skilled in the art.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
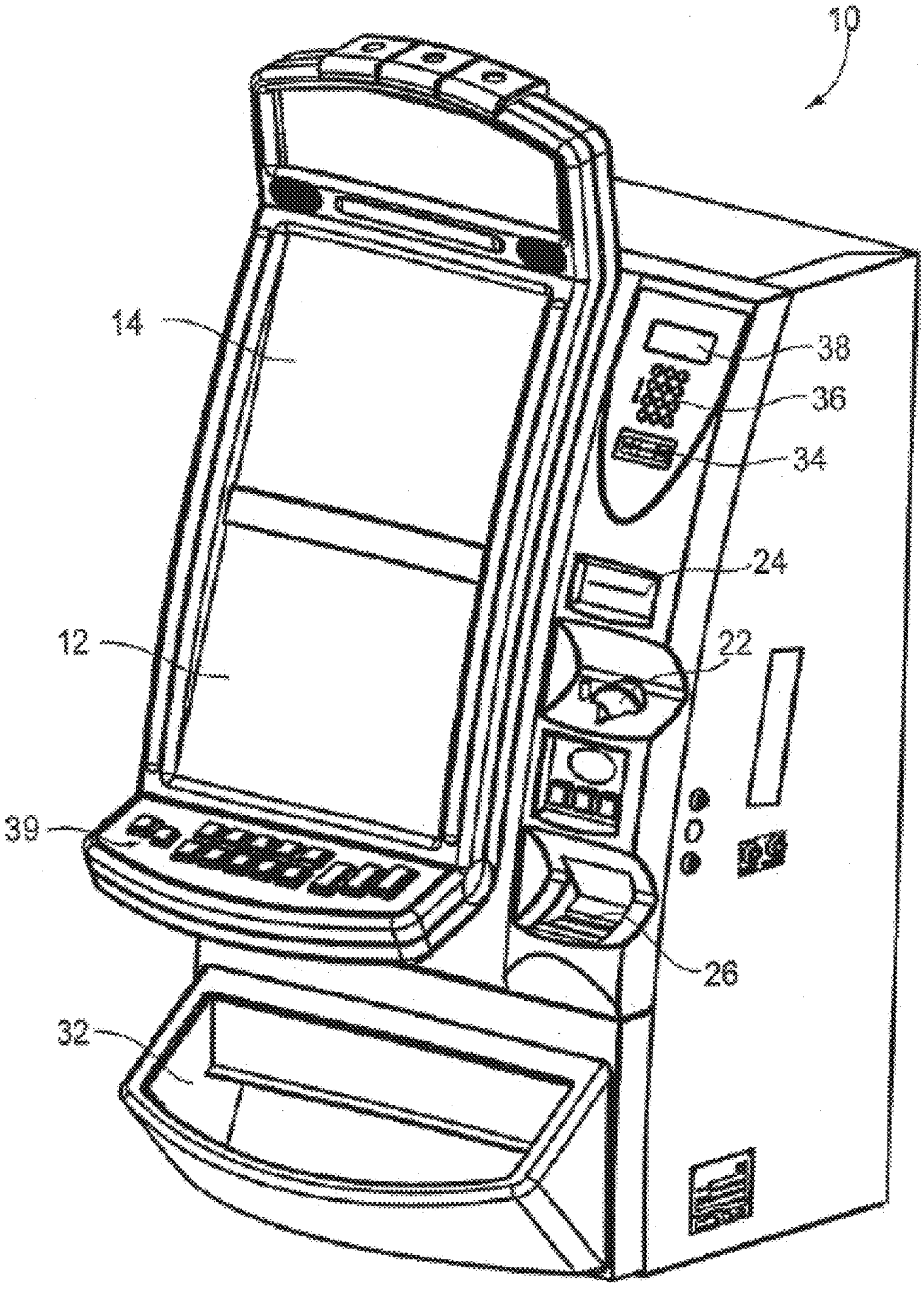
FIG. 1 is a perspective view of an electronic gaming machine for implementing the gaming enhancements, in accordance with one embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, gaming machine, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for interprocess communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously.

The gaming enhancements described herein may be carried out using any type of computer, including portable devices, such as smart phones, that can access a gaming site or a portal (which may access a plurality of gaming sites) via the internet or other communication path (e.g., a LAN or WAN). Embodiments described herein can also be carried out using an electronic gaming machine (EGM) in various venues, such as a casino. One example type of EGM is described with respect to FIG. 1.

FIG. 1 is a perspective view of an EGM 10 where the three-dimensional enhancements to game components may be provided. EGM 10 includes a display 12 that may be a thin film transistor (TFT) display, a liquid crystal display (LCD), a cathode ray tube (CRT), auto stereoscopic three dimensional displays and LED display, an OLED display, or any other type of display. A second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12/14 may also include a camera.

Display 12 or 14 may have a touch screen lamination that includes a transparent grid of conductors. Touching the screen may change the capacitance between the conductors, and thereby the X-Y location of the touch may be determined. The processor associates this X-Y location with a function to be performed. Such touch screens may be used for slot machines. There may be an upper and lower multi-touch screen in accordance with some embodiments.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the gaming machine 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. The card reader reads the inserted card for player and credit information for cashless gaming. The card reader may read a magnetic code on a conventional player tracking card, where the code uniquely identifies the player to the host system. The code is cross-referenced by the host system to any data related to the player, and such data may affect the games offered to the player by the gaming terminal. The card reader may also include an optical reader and printer for reading and printing coded barcodes and other information on a paper ticket. A card may also include credentials that enable the host system to access one or more accounts associated with a user. The account may be debited based on wagers by a user and credited based on a win. Alternatively, an electronic device may couple (wired or wireless) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

Player control buttons 39 may include any buttons or other controllers needed for the play of the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

The EGM 10 may also include hardware configured to provide optical motion tracking. The optical motion tracking may include a body and head controller.

As described herein, EGM 10 may be configured to provide three dimensional enhancements to game components. The three dimensional enhancements may be provided dynamically as dynamic game content in response to electronic data signals relating to player input, game activity, player interactivity with display and EGM 10, and so on. the EGM 10 may include a display with multi-touch and auto stereoscopic three-dimensional functionality, including a camera, for example. The EGM 10 may also include several effects and frame lights. The three dimensional enhancements may be three dimensional variants of gaming components. For example, the three dimensional variants may not be limited to a three dimensional version of the gaming components.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also couple to a user's mobile device to provide a tethering gaming experience. That is, EGM 10 may be configured to establish a communications link between a mobile gaming device operated by a player and EGM 10. The mobile gaming device may run a remote gaming program to play games via EGM 10, and the EGM 10 may be programmed to carry out at game functions of pseudo-randomly determining a game outcome and determining an award to a player. The EGM 10 may receive player control signals from the mobile gaming device to initiate a game. The EGM 10 may carry out the game, including determining a final outcome of the game and any award for the outcome. The EGM 10 may transmit signals to the mobile gaming device identifying the final outcome of the first game and the award. In this configuration, a player may play games provided by the EGM 10 remotely using their mobile gaming device.

That is, a wireless hand-held device, such as a tablet, may also be used to remotely play EGM 10. The EGM 10, for security and central monitoring/accounting purposes, may perform all the processing to deduct a bet from the remote player's stored bank of credits, randomly select a game outcome, determine the award to be paid to the player, and credit the player's bank of credits. The information processed by EMG 10 may be wirelessly communicated to the tablet, and the predetermined outcome may be displayed to the player (such as by displaying stopped reels). The tablet may function as a user interface and display.

The EGM 10 may also include a camera. The camera may be used for motion tracking of player, such as detecting player positions and movements, and generating signals defining x, y and z coordinates. A viewing object of the game may be illustrated as a three-dimensional enhancement coming towards the player. Another viewing object of the game may be illustrated as a three-dimensional enhancement moving away from the player. The players head position may be used as a view guide for the viewing camera during a three-dimensional enhancement. A player sitting directly in front of display 12 may see a different view than a player moving aside. The camera may also be used to detect occupancy of the machine.

The EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The EGM 10 may also include physical buttons.

The EGM 10 may include frame and effect lights. The lights may be synchronized with enhancements of the game. The EGM 10 may be configured to control color and brightness of lights. Additional custom animations (color cycle, blinking, etc.) may also be configured by the EGM 10. The customer animations may be triggered by certain gaming events.

Figure 2A:
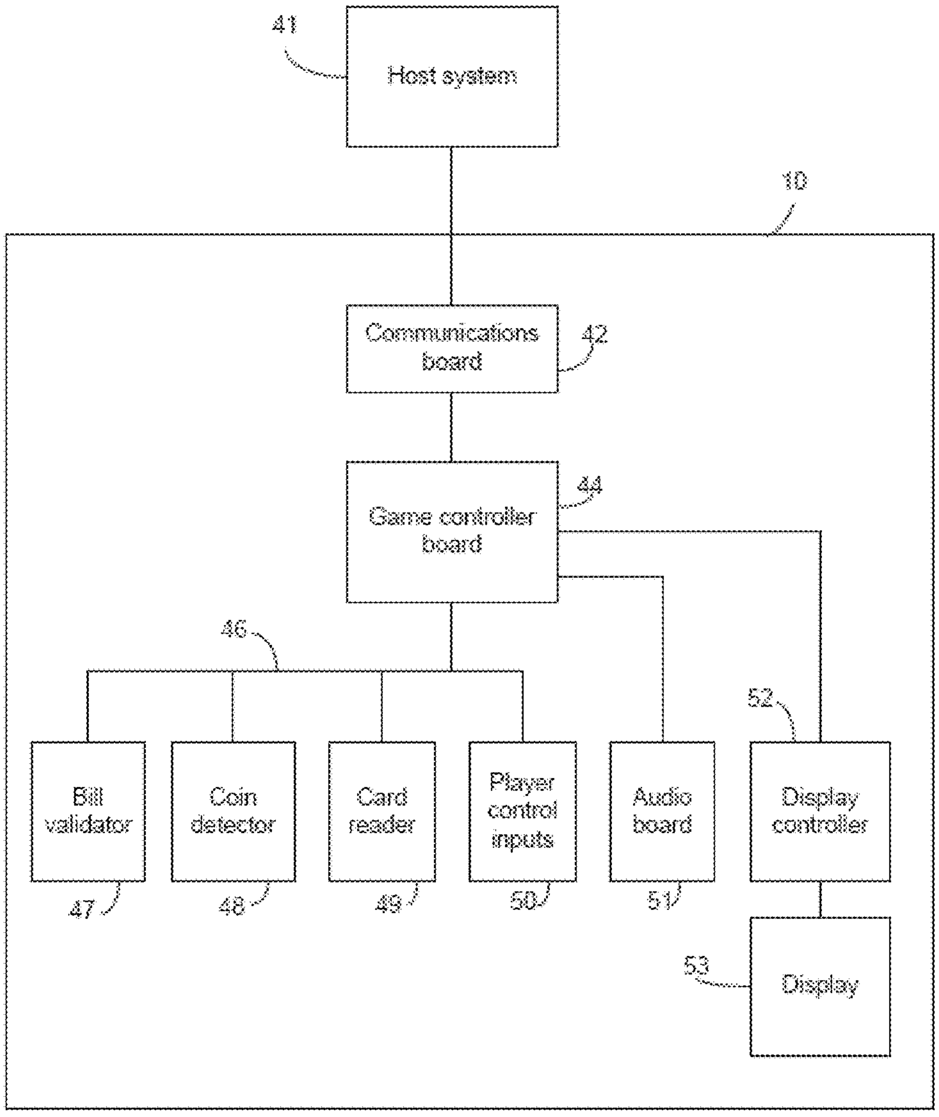
FIG. 2*a* is a block diagram of an electronic gaming machine linked to a casino host system, in accordance with one embodiment.
Figure 2B:
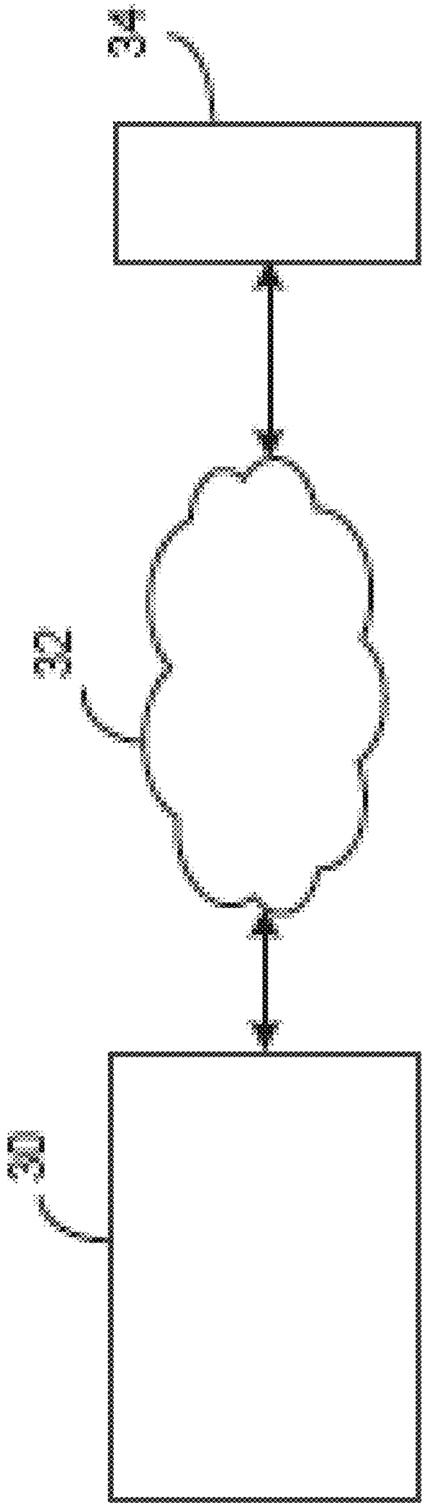
FIG. 2*b* is an exemplary online implementation of a computer system and online gaming system.

FIG. 2*a* is a block diagram of EGM 10 linked to the casino's host system 41. The EGM 10 may use conventional hardware. FIG. 2*b* illustrates a possible online implementation of a computer system and online gaming device in accordance with the present gaming enhancements. For example, a server computer 34 may be configured to enable online gaming in accordance with embodiments described herein. One or more users may use a computing device 30 that is configured to connect to the Internet 32 (or other network), and via the Internet 32 to the server computer 34 in order to access the functionality described in this disclosure.

A communications board 42 may contain conventional circuitry for coupling the EGM 10 to a local area network (LAN) or other type of network using any suitable protocol, such as the G2S protocols. Internet protocols are typically used for such communication under the G2S standard, incorporated herein by reference. The communications board 42 transmits using a wireless transmitter, or it may be directly connected to a network running throughout the casino floor. The communications board 42 basically sets up a communication link with a master controller and buffers data between the network and the game controller board 44. The communications board 42 may also communicate with a network server, such as in accordance with the G2S standard, for exchanging information to carry out embodiments described herein.

The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

The game controller board 44 also controls one or more devices that produce the game output including audio and video output associated with a particular game that is presented to the user. For example audio board 51 converts coded signals into analog signals for driving speakers. A display controller 52, which typically requires a high data transfer rate, converts coded signals to pixel signals for the display 53. Display controller 52 and audio board 51 may be directly connected to parallel ports on the game controller board 44. The electronics on the various boards may be combined onto a single board.

Computing device 30 may be particularly configured with hardware and software to interact with gaming machine 10 or gaming server 34 via network 32 to implement gaming functionality and render three dimensional enhancements, as described herein. For simplicity only one computing device 30 is shown but system may include one or more computing devices 30 operable by users to access remote network resources. Computing device 30 may be implemented using one or more processors and one or more data storage devices configured with database(s) or file system(s), or using multiple devices or groups of storage devices distributed over a wide geographic area and connected via a network (which may be referred to as "cloud computing").

Computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. As described herein, a computing device 30 may couple to EGM 10 to remotely play games via EGM 10. Further, in some configurations computing device 30 may operate as EGM 10, or components thereof.

Computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 30 may include one or more input devices, such as a keyboard, mouse, camera, touch screen and a microphone, and may also include one or more output devices such as a display screen (with three dimensional capabilities) and a speaker. Computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Computing device 30 is operable to register and authenticate users (using a login, unique identifier, and password for example) prior to providing access to applications, a local network, network resources, other networks and network security devices. Computing device 30 may serve one user or multiple users.

Figure 3:
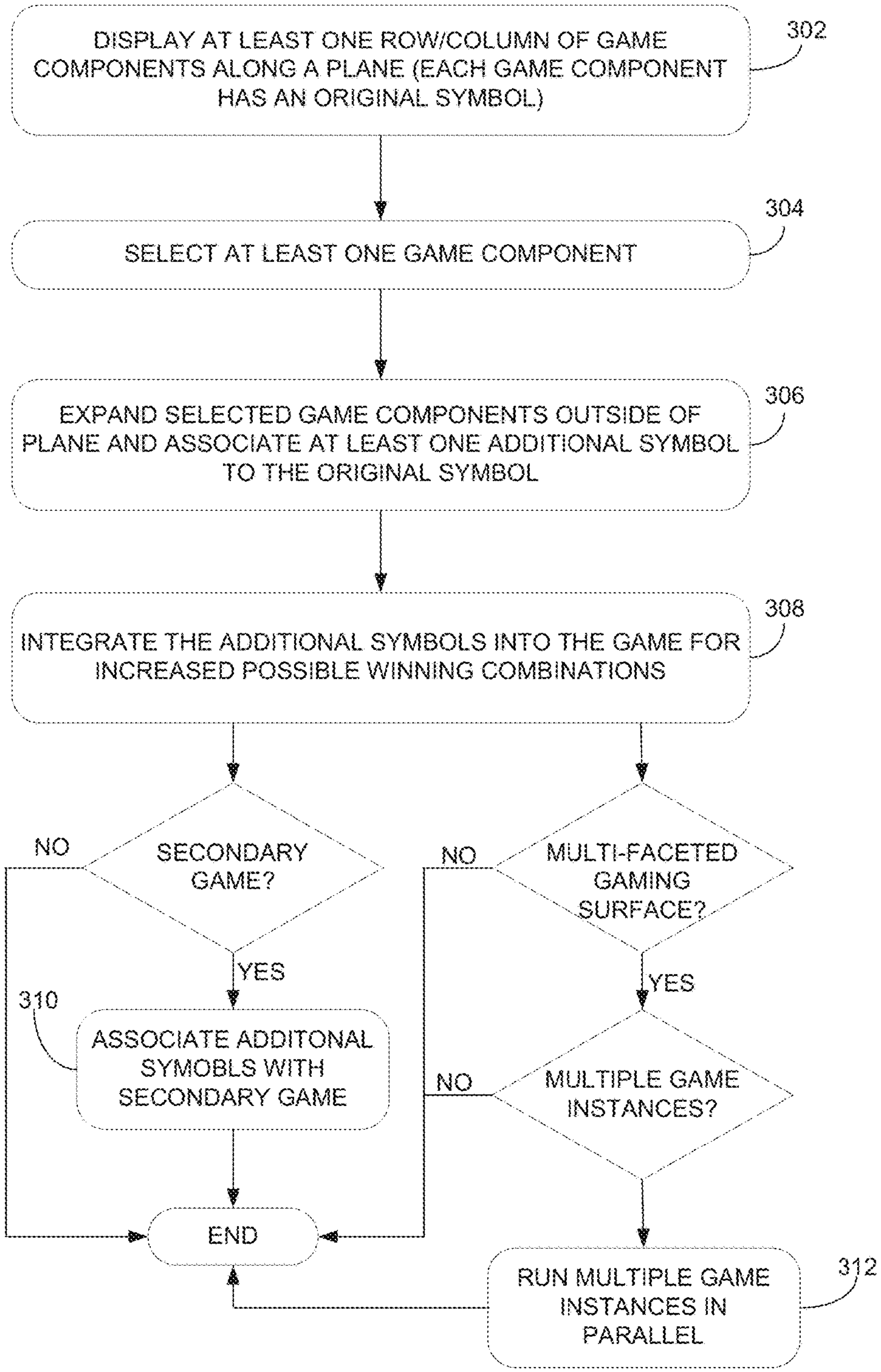
FIG. 3 is a flowchart of an exemplary computer-implemented method for the game component enhancements.

FIG. 3 is a flowchart illustrating an exemplary embodiment for a computer-implemented method for enhancing game components in a gaming system such as that illustrated in FIGS. 1, 2*a*, and 2*b*. In a step 302, at least one row and/or column of game components are displayed on a display device, such as display devices 12, 14, along a plane, referred to herein as the gaming plane, in accordance with a gaming configuration for a given game. The row/column may be made up of two or more game components, depending on the game being played. Each game component has a given symbol associated thereto, which may be referred to herein as an original symbol as it represents the game component before any enhancements are provided.

At 304, at least one game component is selected for enhancement from the plurality of game components displayed. The gaming component may be selected by the player or by the game. For example, the game outcome or state may determine which symbol to select for enhancement.

At 306, each selected game component is enhanced by expanding it outside of the gaming plane in which the original symbol was displayed, and at least one additional symbol is associated to the original symbol to form the enhanced game component. For example, the enhancement may be a three-dimensional enhancement where the selected game symbol is expanded in a third dimension. That is, EGM 10 may be configured to transform a selected game components by generating a three-dimensional variation for display on a display device. The transformation results in a different display of electronic data signals.

At 308, the additional symbols may be integrated into the game for increased possible winning combinations, as will be described in more detail herein.

In some embodiments, at 310, a secondary game is provided in addition to the primary or given game and the additional symbol may be associated with the secondary game in accordance with different gaming strategies and/or configurations.

The enhanced gaming components may be displayed as a three dimensional variant of the original symbol. For example, three dimensional enhancement of the enhanced gaming component may not be limited to a three dimensional version of the gaming component. The enhanced gaming component may also be enhanced by associating it with multiple gaming components, where each may be used independently to calculate winning combinations for a given game.

In some embodiments, expansion of the selected game components outside of the gaming plane results in a multi-faceted gaming surface. The multi-faceted gaming surface allows multiple gaming instances to be run in parallel, at 312, if desired. Alternatively, a single gaming instance may be run on the multi-faceted gaming surface.

Figure 4A:
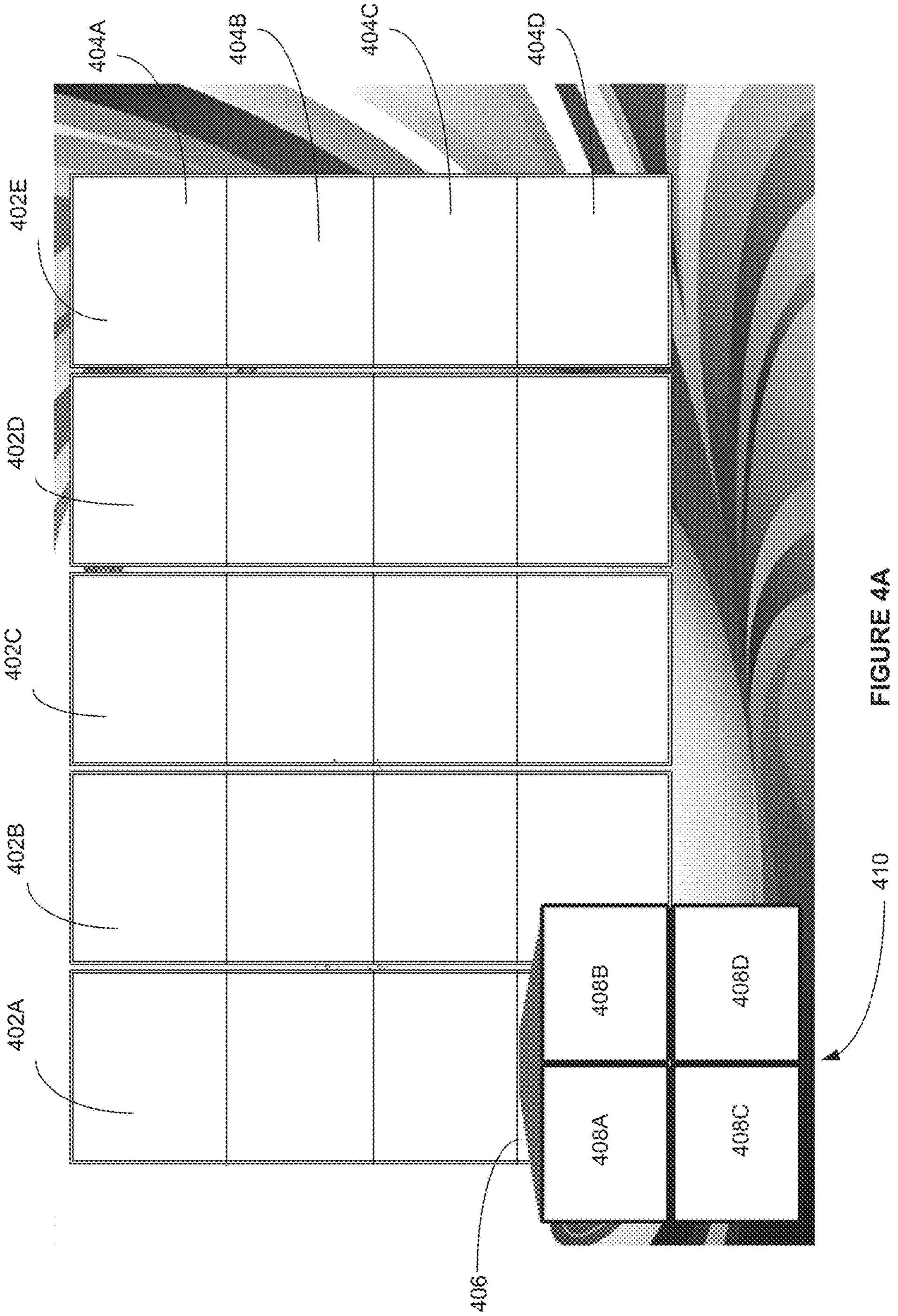
FIG. 4*a* illustrates an exemplary enhancement of a gaming component using an exploded matrix configuration.

FIG. 4*a* is an exemplary embodiment for an enhancement to a gaming component. In this example, a grid of five columns 402*a*, 402*b*, 402*c*, 402*d*, 402*e* and four rows 404*a*, 404*b*, 404*c*, 404*d* is displayed, resulting in 5×4=20 gaming components, illustrated as blank cells. An original symbol (not shown) may be associated with each one of the 20 gaming components in each blank cell. At least one gaming component 406 is selected for enhancement. Gaming component 406 is expanded outside of the gaming plane, formed by columns 402*a*-402*e* and rows 404*a*-404*d*, into a different plane, formed by a 2×2 grid of new cells 408*a*, 408*b*, 408*c*, 408*d*. Additional symbols are provided in new cells 408*a*, 408*b*, 408*c*, 408*d* and integrated into the original game. While the enhancement 410 in this example is illustrated as a 2×2 matrix, it should be understood that the matrix may be n×m and shall be limited in size only by the capabilities of the display screen and/or the ability to incorporate the enhancement 410 into the original game.

In one exemplary embodiment, the configuration of FIG. 4*a* may be a spinning reel game. A win may be obtained whenever matching symbols are aligned vertically, horizontally, or diagonally. These are illustrative examples and there may be other patterns of winning combinations of symbols. Using the gaming component enhancement 410, anyone of the symbols provided in cells 408*a*-408*d* may be matched with neighboring symbols to form a winning combination, thus increasing the odds of winning. In another exemplary embodiment, the configuration of FIG. 4*a* may be a bingo card. Similarly, anyone of the symbols provided in cells 408*a*-408*d* may be used to form a complete row or column and result in a winning combination, thus increasing the odds of winning. Other possibilities for the matrix-type gaming enhancement may be used for various embodiments.

Figure 4B:
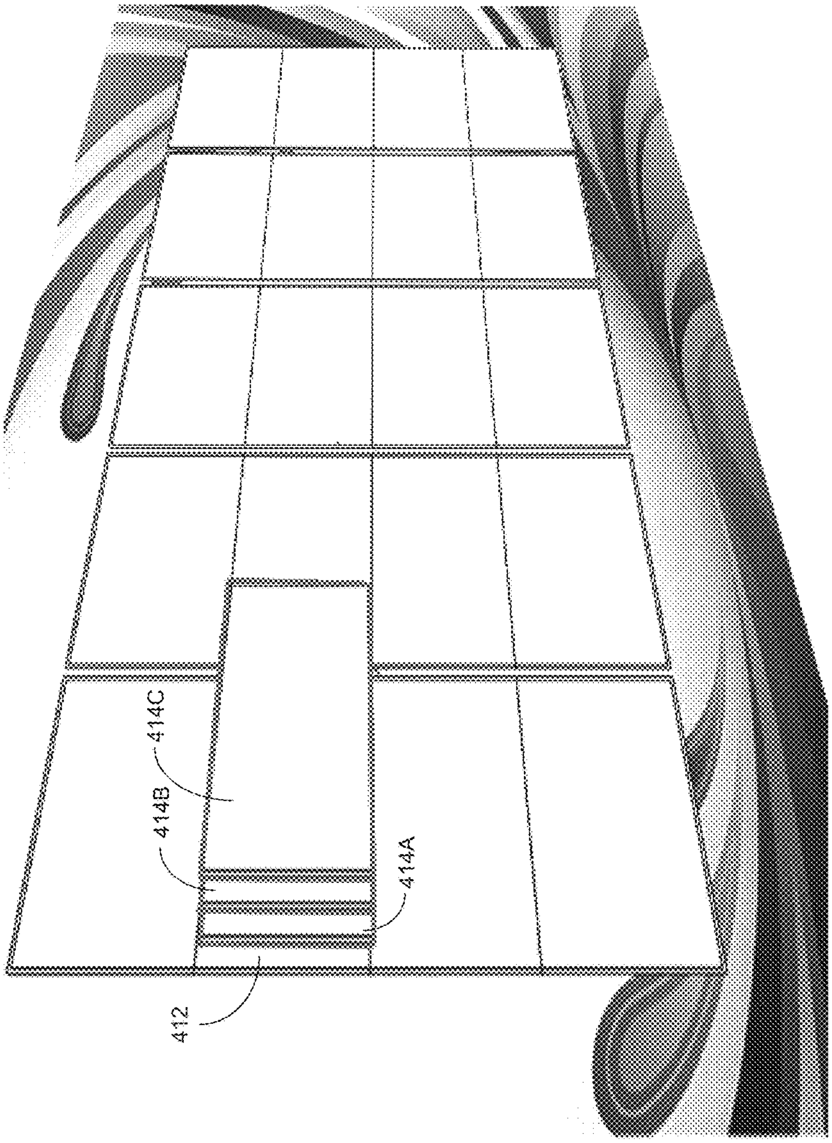
FIG. 4*b* illustrates an exemplary enhancement of a gaming component using stacking of symbols above the gaming plane.
Figure 4C:
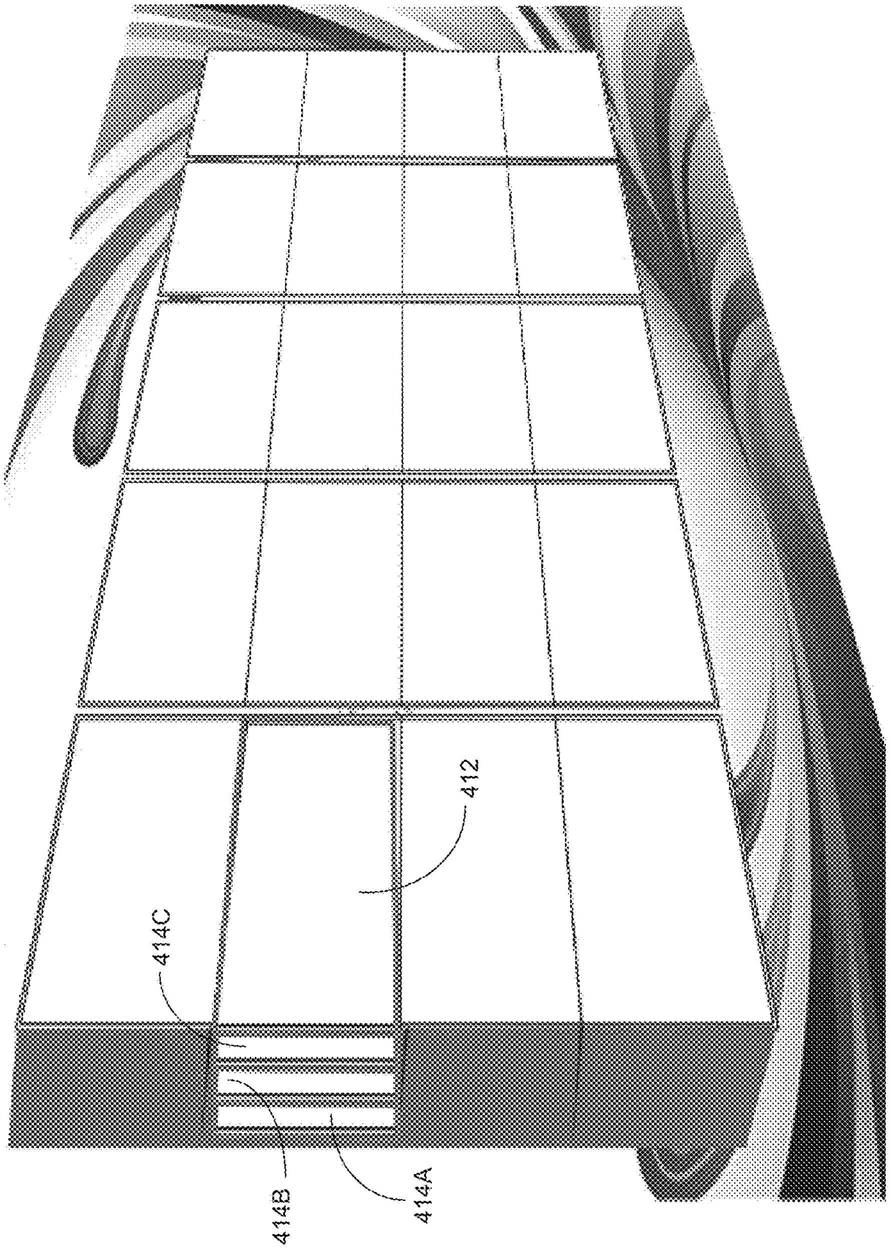
FIG. 4*c* illustrates an exemplary enhancement of a gaming component using stacking of symbols behind the gaming plane.

FIG. 4*b* is another exemplary embodiment for an enhancement to a gaming component. In this example, a selected gaming component 412 is expanded outside of the gaming plane by stacking new cells 414*a*, 414*b*, 414*c* on top of the original symbol. Alternatively, the new cells 414*a*, 414*b*, 414*c* may be stacked behind the original symbol, as illustrated in FIG. 4*c*. In either scenario, various embodiments are possible to integrate the additional symbols provided on cells 414*a*, 414*b*, 414*c* into the original game. For example, in a spinning reel game, anyone of the symbols in cells 414*a*, 414*b*, 414*c* may be used to form a winning combination with neighboring cells. Alternatively, only the top, or visible, symbol may be matched with neighboring cells and as the game progresses, hidden symbols may be discovered and used to further advance the game. In another embodiment, various events in the game, such as a particular winning combination or reaching a threshold of points, may allow the player to see and/or use the additional hidden symbols in addition to the top or visible symbol to form winning combinations. Other scenarios are also possible. In addition, the number of stacked symbols may be more or less than three, as desired.

Figure 4D:
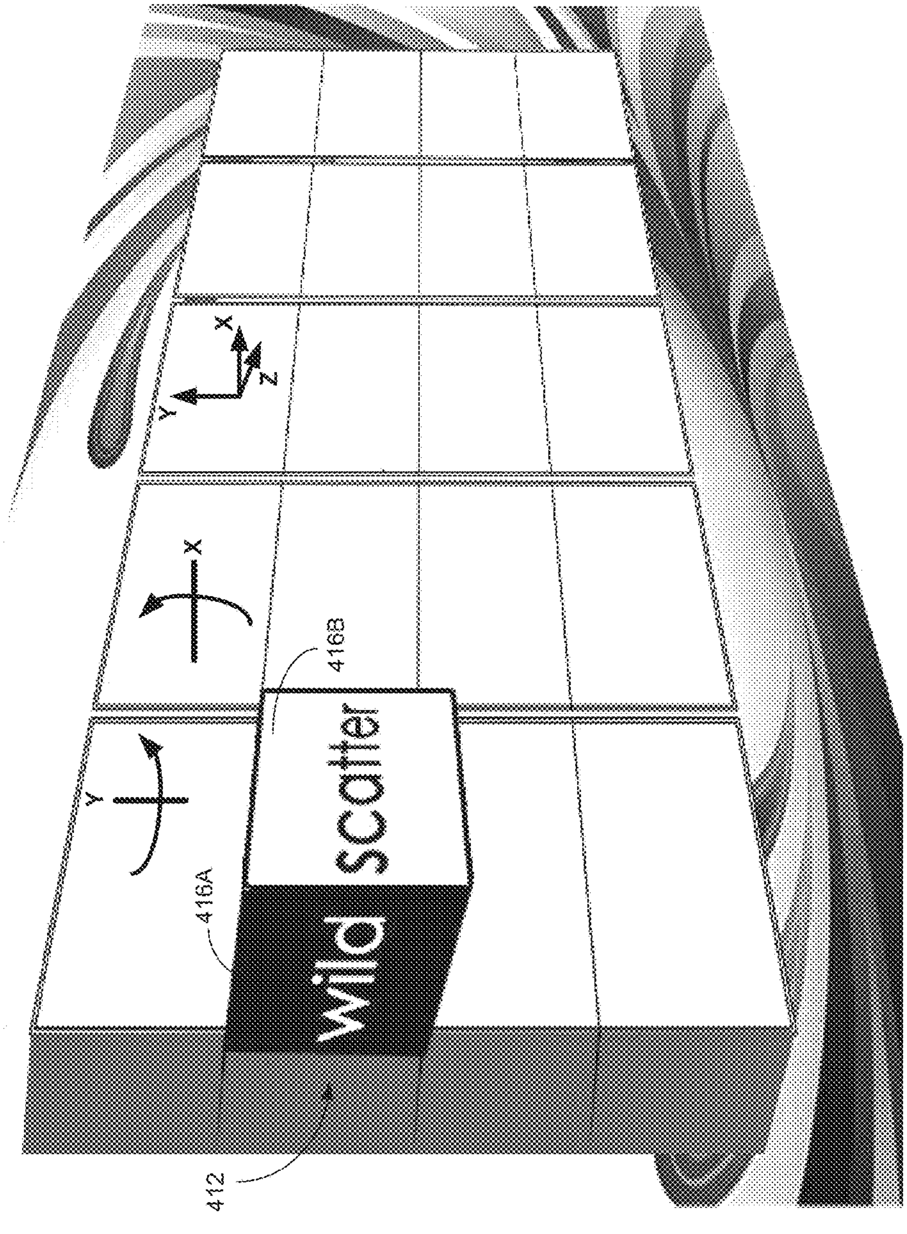
FIG. 4*d* illustrates an exemplary enhancement of a gaming component using a three-dimensional game component.

FIG. 4*d* is an exemplary embodiment for an enhancement to a gaming component whereby expanding the gaming component creates a three-dimensional structure. The single facet gaming component 412 becomes a multi-facet gaming component with the enhancement. Additional symbols may be provided on one or more of the facets of the three-dimensional structure, such as 416*a* and 416*b*. The additional symbols may be used in various ways. For example, in a spinning reel game, as each game component is spun in a single direction, such as about the x axis, the enhanced gaming component may be spun about multiple axes, such as the y axis and/or the x axis, thus resulting in more possibilities for the spinning gaming component. Alternatively, various events in the game, such as a particular winning combination or reaching a threshold of points, may allow the player to freely rotate the multi-faceted gaming component in a desired direction, such that the symbol on the facet that is rotated to the front may be used for a winning combination. The symbols on the facets other than the front may be displayed to the player or hidden from view. Various events in the game may allow hidden facets to be selectively shown to the player. Other scenarios are also possible. While the multi-faceted three-dimensional structure in this example is shown to be a cube, other geometrical shapes are also possible, such as a cylinder, an octagon, and many others.

Figure 5A:
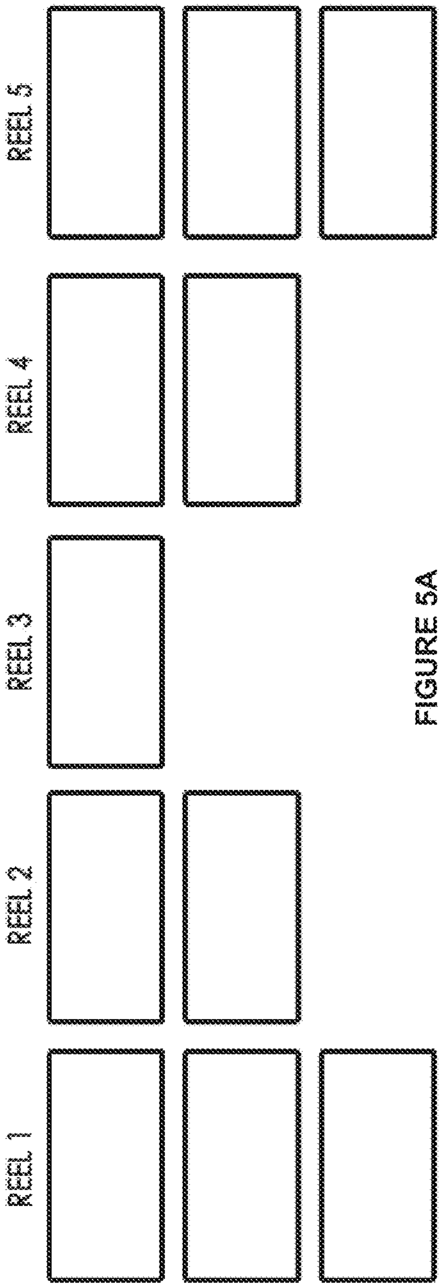
FIGS. 5*a* and 5*b* are top down views of exemplary spinning reels with mirrored configurations using reel stacking.
Figure 5B:
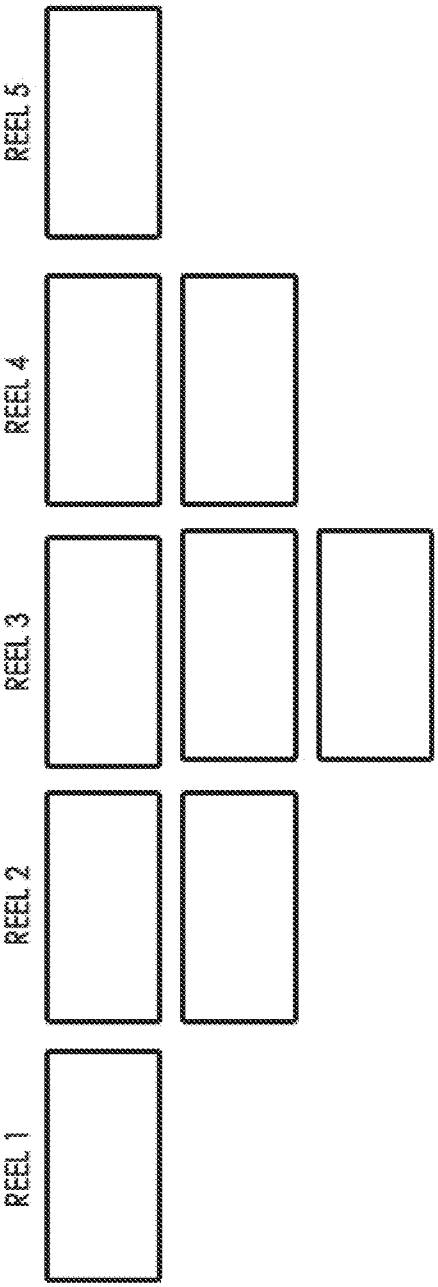

The examples illustrated in FIGS. 4*a*-4*d* show a single gaming component as enhanced. In some embodiments, multiple gaming components on the gaming plane may be enhanced, thus creating various effects and three dimensional variants. For example, FIGS. 5*a* and 5*b* illustrate the use of stacking to create a mirrored effect on spinning reels. As viewed from the top down, FIG. 5*a* shows the stacking of reels 1 and 5 three symbols deep, reels 2 and 4 two symbols deep, and reel 3 having a single symbol. FIG. 5*b* shows the stacking of reel 3 three symbols deep, reels 2 and 4 two symbols deep, and reels 1 and 5 a single symbol deep. Various other configurations may be provided using stacked symbols to obtain mirrored or asymmetrical designs. Stacking of symbols may be more or less than three symbols, having the stacks above or below the original symbol. A combination of above and below an original symbol may be used on a same gaming plane.

Figure 6A:
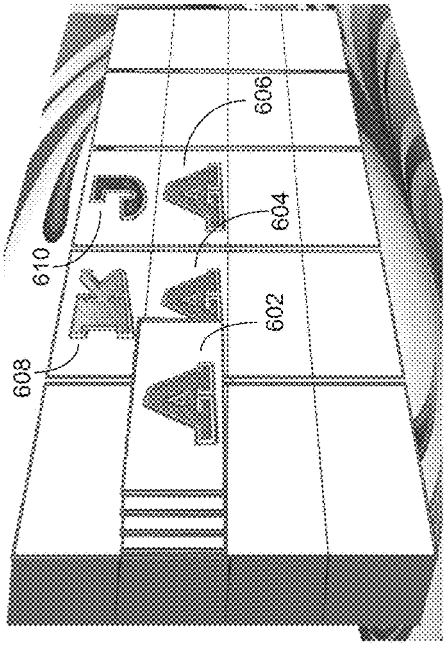
FIGS. 6*a*, 6*b*, 6*c* are an exemplary illustration of cascading of symbols using a stacking concept.
Figure 6B:
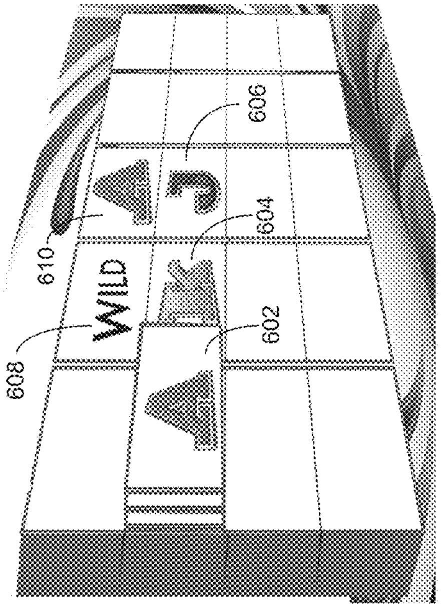

FIGS. 6*a*-6*b* illustrate an exemplary embodiment for game play using the gaming component enhancements, and more particularly the stacking of reels in reel spinning games. In FIG. 6*a*, an Ace on top of reel 602 has four ace symbols stacked under the top Ace symbol (hidden from view). On reels 604 and 606 there are also Ace symbols. These three Ace symbols line up on an active wagered pay pattern to then create an award to the player. The three symbols (top Ace from the stack on reel 602+Ace on Reel 604+Ace on Reel 606) may then remove themselves from the game screen altogether, causing the second stacked Ace on reel 602 to be shown, and a K and J from above reels 604 and 606 respectfully to fall down into the position where the aces on reels 604 and 606 used to be. This is displayed in FIG. 6*b*. The previous positions of the K and J are then filled with new symbols moving down and into the vacant cells. These happen to be a 'wild' and an 'ace' by way of illustrative example. The stacked cells or symbols may be used independently of the stacked symbols on top or below, as part of different winning combinations.

Figure 6C:
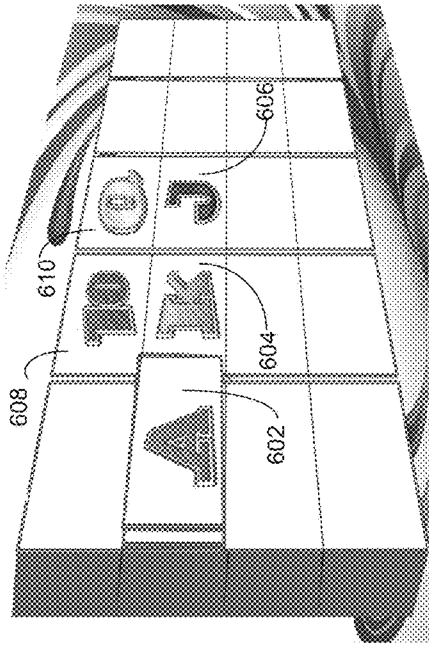

The screen may then be analyzed a second time to see if there are any new winning patterns available after all of the movement and replenishment that happened after the first set of Aces were removed. Since the Ace on reel 602, the Wild on reel 608, and the Ace on reel 610 create another winning pattern, these three symbols are then removed from the game screen. FIG. 6*c* shows the Ace from reel 602 removed from the stack of Aces to leave two in the pile (as two others were used in previous win patterns) and the 10 and the Q on reels 608 and 610 have populated the spots where the Wild and Ace were from the previous win pattern.

Thus, the stacking concept may have a stack of symbols that are either (a) all the same symbol as shown in this example with the stack of Aces on reel 602 or (b) offer a variety of symbols stacked on the position. Instead of a full stack of Aces only on reel 602, it could have been a stack of Ace, K, Q, J, 10, etc, in that position (not shown). The stack doesn't have to have same symbol only characteristics or even consecutive symbol characteristics. The stacked symbols may be a random set of symbols. Removing or eliminating symbols from the stack based on winning patterns that involve the stack may lead to other winning patterns. In the embodiment illustrated, the game screen replenishes to allow for the chance at consecutive wins happening, depending on new symbols that replenish the screen.

Figure 7:
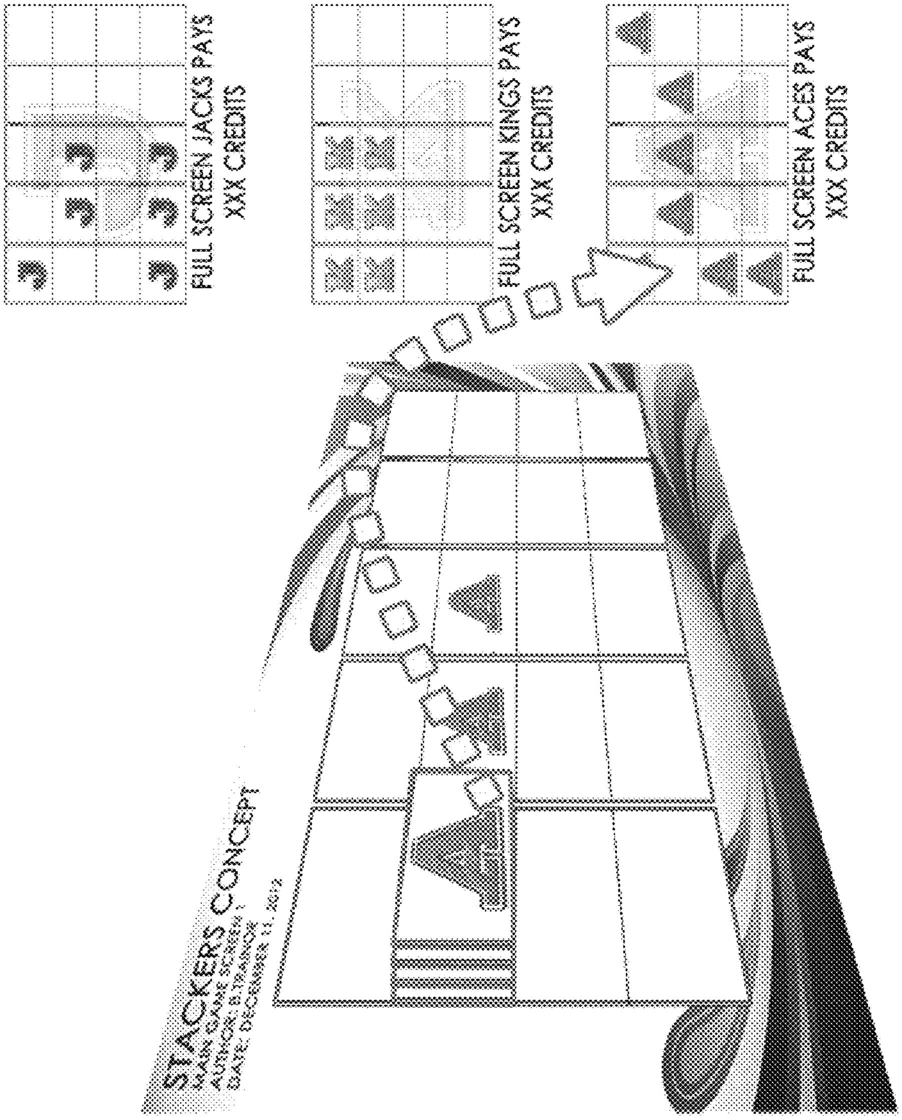
FIG. 7 is an exemplary illustration of associating additional symbols with a secondary game.

FIG. 7 illustrates an exemplary embodiment for using the stacked symbols for the purposes of a secondary game. In this example, the player may interact with the additional symbols and displace them onto one or more secondary game screens. For example, collecting symbols such as Aces, Kings and Jacks may provide additional credits when a given number of these symbols are collected. Alternatively, the symbols may be displaced onto the secondary game screens automatically, without player interaction. Other manners of integrating the additional symbols into a secondary game may be used. The secondary game may be used to trigger a bonus game, for example. The secondary game may also include three dimensional enhancements.

Figure 8A:
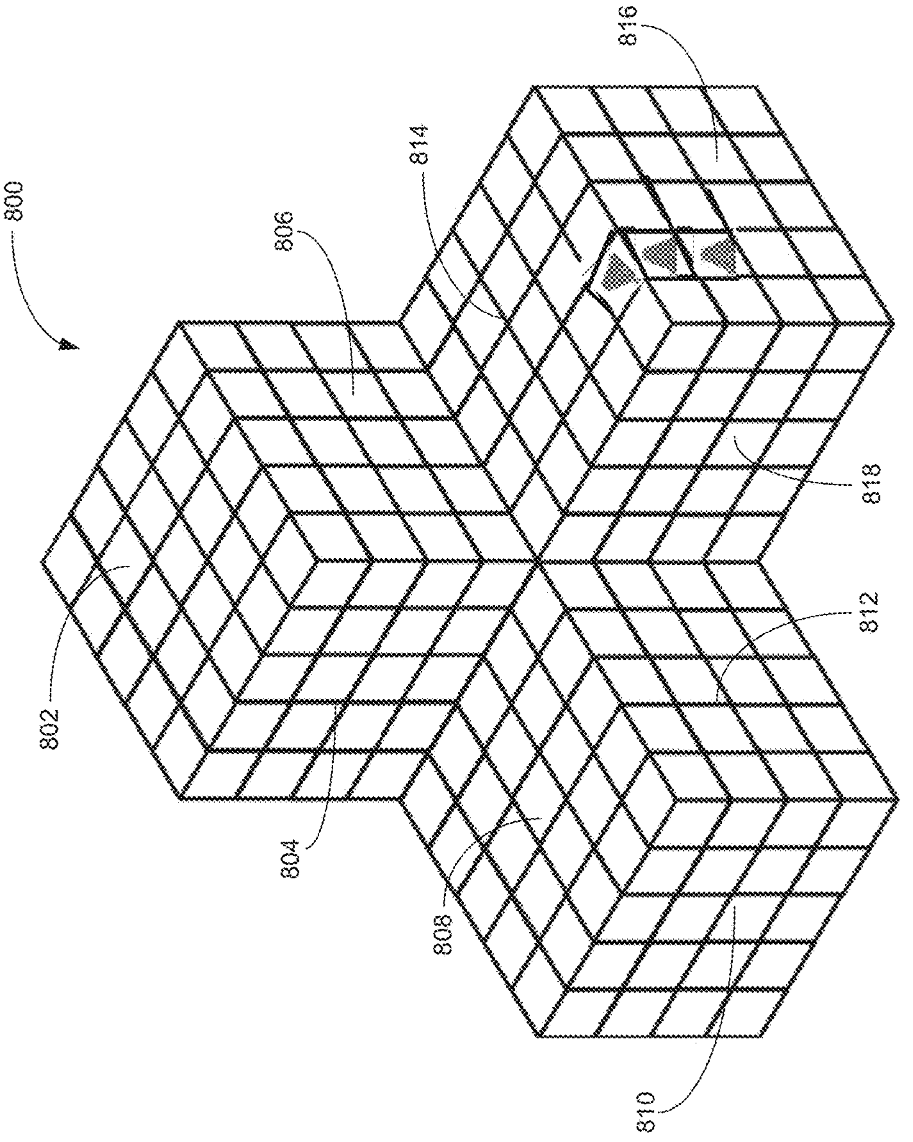
FIG. 8*a* is an exemplary embodiment of a three-dimensional multi-faceted gaming surface.

As indicated above, enhancing the game components may lead to the creation of three-dimensional structures. In addition to three-dimensional game components as illustrated in FIG. 4*d*, the entire gaming surface may be transformed into a multi-faceted structure. FIG. 8*a* is an exemplary embodiment of such an enhancement. The three-dimensional structure 800 comprises nine different surfaces 802, 804, 806, 808, 810, 812, 814, 816, and 818. Each surface may be used as an individual and separate playing surface, thus allowing multiple gaming instances to be run simultaneously. Alternatively, the surfaces may all be used as part of a same gaming instance, with winning patterns overlapping from one surface to another via neighboring cells. For example, one Ace on surface 814 and two Aces on surface 816 may form a winning pattern.

Figure 8B:
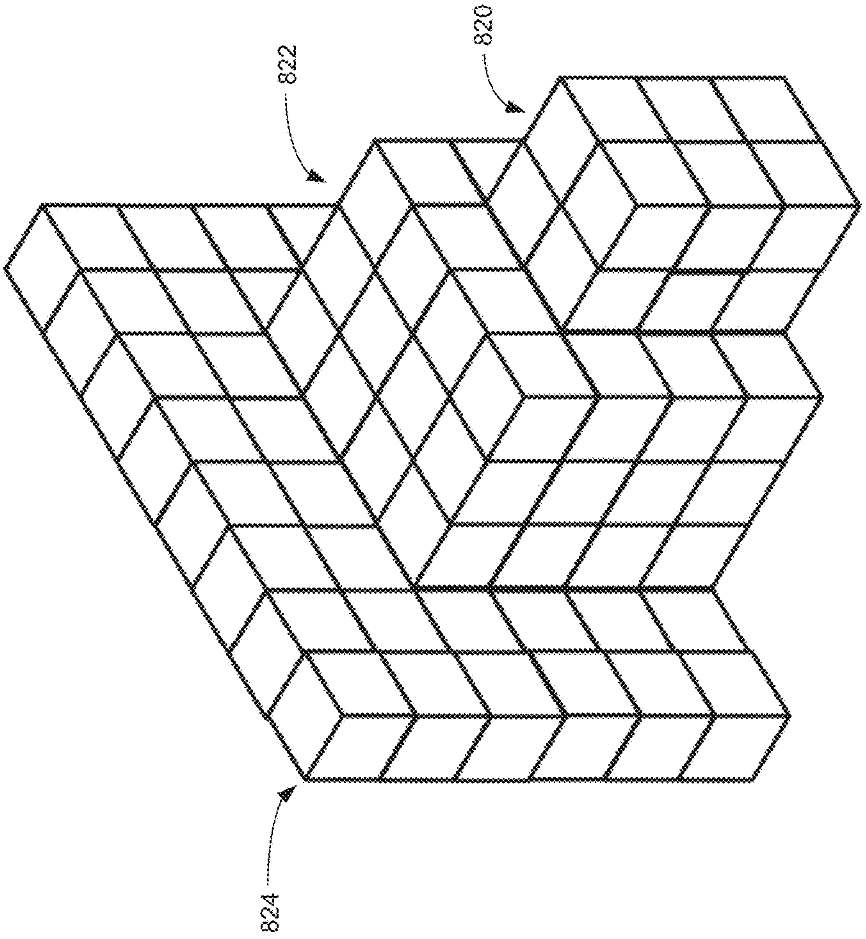
FIG. 8*b* is an exemplary embodiment of a three-dimensional layered gaming surface.

Other configurations for the gaming area are also possible, as illustrated in FIG. 8*b*. In this example, multiple layers 820, 822, 824 are provided to a gaming surface. In one exemplary embodiment, once the player has a group of symbols that are all 'like' symbols, they may be removed off of the game board. Once the first layer 820 of the game board has been removed, the next layer 822, which may be a different size and/or shape, is then available to play on. For example, the layers may go from a 5×3 to a 5×4 to a 5×5. Other sizes and shapes for the stacked layers may also be used.

Figure 8C:
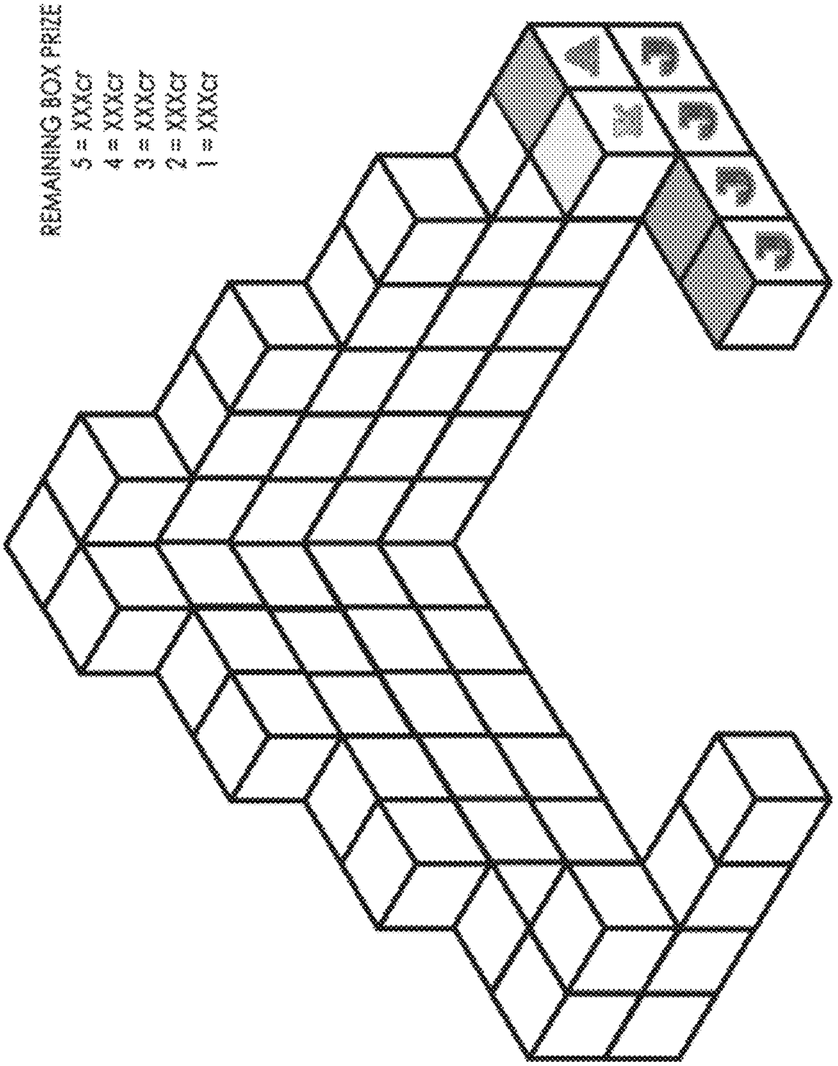
FIG. 8*c* is an exemplary embodiment of a three-dimensional gaming surface with matching symbols.

FIG. 8*c* is yet another exemplary embodiment for a three-dimensional, multi-faceted structure when enhancing game components. As shown, the structure is not specific to standard 5×3 or 5×4 video reel presentations of a slot-type game. It can be applied to any type of game matrix. The win patterns and pay categories do not have to have actual physical and traditional lines and patterns as seen in a 5×3 or 5×4 video reel matrix. Grouping of like symbols may create various pay categories, as long as like symbols are touching each other on one of the facets. A game mechanic like symbol elimination may be applied, where the player is hoping to have groups of the like symbols disappearing off of the game screen and depending on the number of symbols left, there could be a prize associated. For example, if five symbols are left, the prize may be 25 credits but if there was a single symbol left, the player would be paid 1000 credits.

In accordance with embodiments described herein, a selected game component may be an enhanced three-dimensional multi-faceted game component. The multi-faceted game components may be arranged in a three-dimensional configuration. Each multi-faceted game component may be associated with a gaming symbol. The gaming symbol may be identifiable, visible and displayed on multiple faces of each multi-faceted game component. When the multi-faceted game components are arranged in a three-dimensional configuration one or more of the faces may be covered by other game components or hidden from a particular view or angle, while one or more of the faces may still be visible at the particular view or angle. The game symbol for each multi-faceted game component may still be identifiable as it may still be shown on the visible face(s).

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Figure 9:
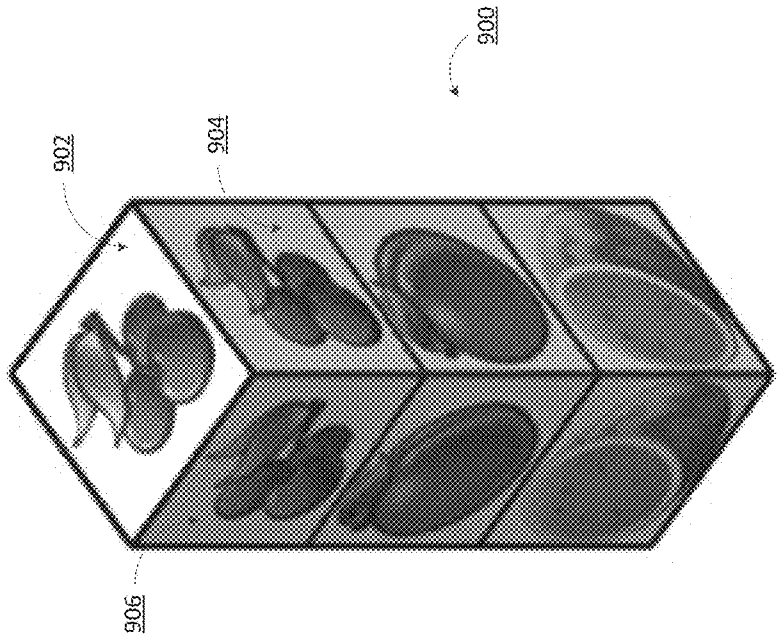
FIG. 9 is an exemplary embodiment of a three-dimensional stack of game components, each being a three-dimensional multi-faceted game component.

Referring now to FIG. 9, there is shown a three-dimensional stack 900 of game components, each being a three-dimensional multi-faceted game component. The stack 900 includes three game components stacked on top of each other along the z-axis. To display stacked symbols, EGM 10 may be configured to display multi-faceted game components each associated with a game symbol identifiable from multiple sides or faces (not only the top) of the game component. As shown, an example three-dimensional multi-faceted game component displays on screen with a visible top symbol 902 and two visible side symbols 904, 906. The cube is an example only and the multi-faceted game component may be of other shapes.

The embodiments described herein may provide various electronic data transformations to provide three-dimensional enhancements. For example, gaming component enhancements are shown in FIG. 4A, including single cell stacking (FIGS. 4B, 4C). Three-dimensional enhancements may involve rotations of multi-faceted game components and gaming surfaces, and the rotations described herein may be multiple axes rotation. There may also be mirrored configurations (FIGS. 5A, 5B), secondary game screens (FIG. 7), and irregular multi-faceted structures (FIGS. 8A-C). Further example three-dimensional enhancements are described herein.

Embodiments described herein may involve multi-faceted game components in a three-dimensional stack 900 along the z-axis. For the illustrative example shown in FIG. 9, if each cube of the stack 900 only displayed the graphic on the top face of the cube, it may not be possible to identify the game symbols of the cubes in the stack 900 except for the top symbol 902 corresponding to the top component on the stack 900. As shown in FIG. 9, the different faces 902, 904, 906 may identify the same game symbol to facilitate identification of the game symbol from different views or angles of the multi-faceted game component. This may facilitate identification of a game symbol corresponding to a multi-faceted game component that is not on the top of the stack, as the top face may not be visible but one or more side faces may be visible. This may provide a mechanism to effectively display multiple multi-faceted game components as a stack 900 while still displaying the gaming symbol corresponding to each multi-faceted game component of the stack 900.

Embodiments described herein may display multi-faceted game components revealing multiple game symbols. Embodiments described herein may involve multi-faceted game components displaying game symbol graphics on multiple sides of a three-dimensional shaped game component. In some embodiments, different game symbols may be displayed on different sides or faces of the three-dimensional game component. In some embodiments, a three-dimensional shaped game component may represent a single game symbol, where the single game symbol is displayed on different sides of the three-dimensional game component so that it may be identified from any angle or view point.

Figure 10:
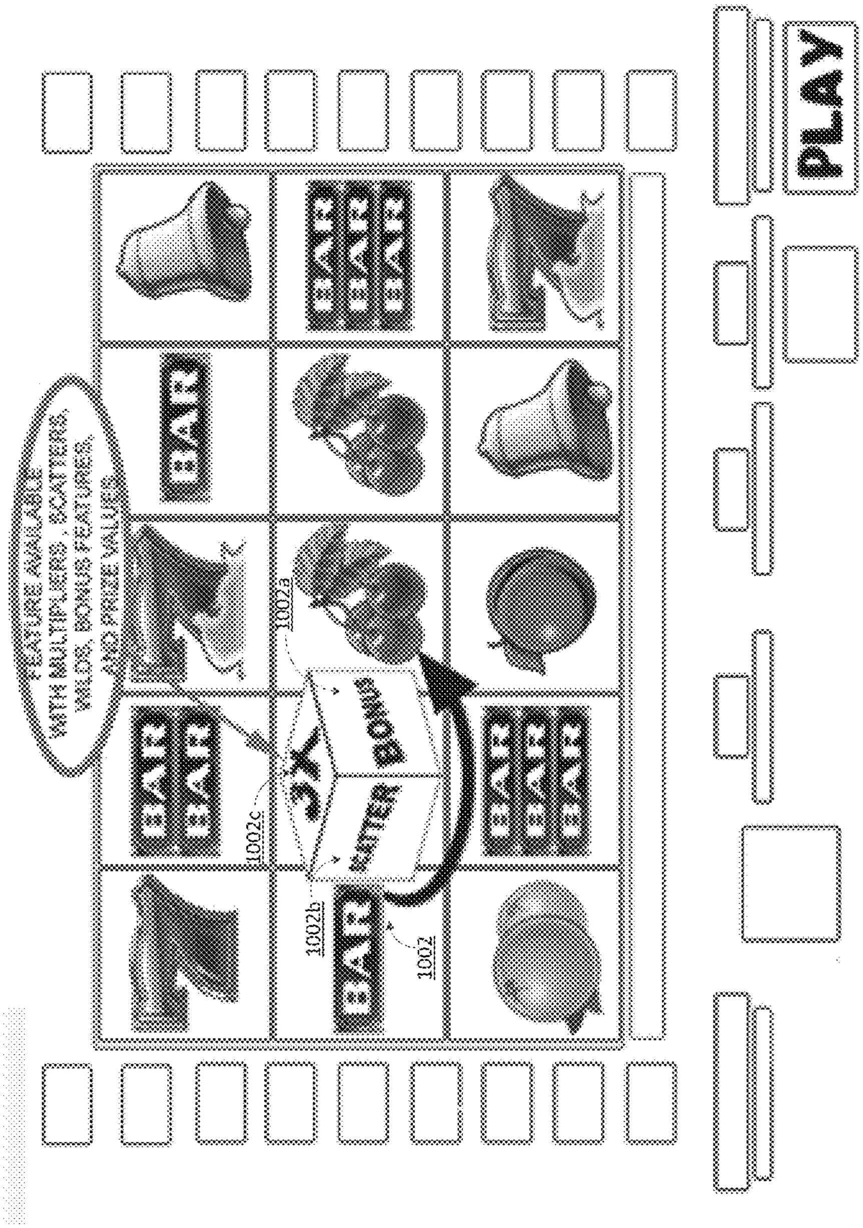
FIG. 10 shows an exemplary enhancement of a gaming component using a three-dimensional multi-faceted game component.

Referring now to FIG. 10, there is an exemplary enhancement of a gaming component using a three-dimensional game component. The three-dimensional game component may be enhanced as a multi-faceted game component, such as is shown in FIG. 4*d*. The reel or grid game is illustrated with a reel position that has depth (e.g. three dimensional features). The gaming component 1002 shown is a cube with multi-faceted symbols as part of the game composition. The reel or grid may form part of a reel strip. The reel may start spinning when a "play" button on a user interface display on a display screen is activated. As the reels stop spinning, the reel continues to spin and will finish spinning once the last reel halts to place symbols in various positions on the grid. Different combinations and patterns (e.g. lines) may form winning combinations of symbols.

FIG. 10 is an exemplary embodiment for an enhancement to a gaming component whereby expanding the gaming component creates a three-dimensional structure. A single facet gaming component 1002 may be enhanced as a multi-facet gaming component. Additional symbols may be provided on one or more of the facets of the three-dimensional structure, such as 1002*a*, 1002*b*, 1002*c*. The symbols may be multipliers, Wilds, scatters, bonus triggers, and static prize values for example.

One or more symbols may be used for the game to achieve winning combinations. The additional symbols may be used in various ways. For example, in a spinning reel game, as each game component is spun in a single direction, such as about the x axis, the enhanced gaming component may be spun about multiple axes, such as the y axis and/or the x axis, thus resulting in more possibilities for the spinning gaming component. Alternatively, various events in the game, such as a particular winning combination or reaching a threshold of points, may allow the player to freely rotate the multi-faceted gaming component in a desired direction, such that the symbol on the facet that is rotated to the front may be used for a winning combination. The symbols on the facets other than the front may be displayed to the player or hidden from view. In this example, three facets 1002*a*, 1002*b*, 1002*c* may be visible during a current view. As the gaming component 1002 spins to different views then different facets may be visible.

Various events in the game may allow hidden facets to be selectively shown to the player. Other scenarios are also possible. While the multi-faceted three-dimensional structure in this example is shown to be a cube, other geometrical shapes are also possible, such as a cylinder, an octagon, and many others.

Figure 11:
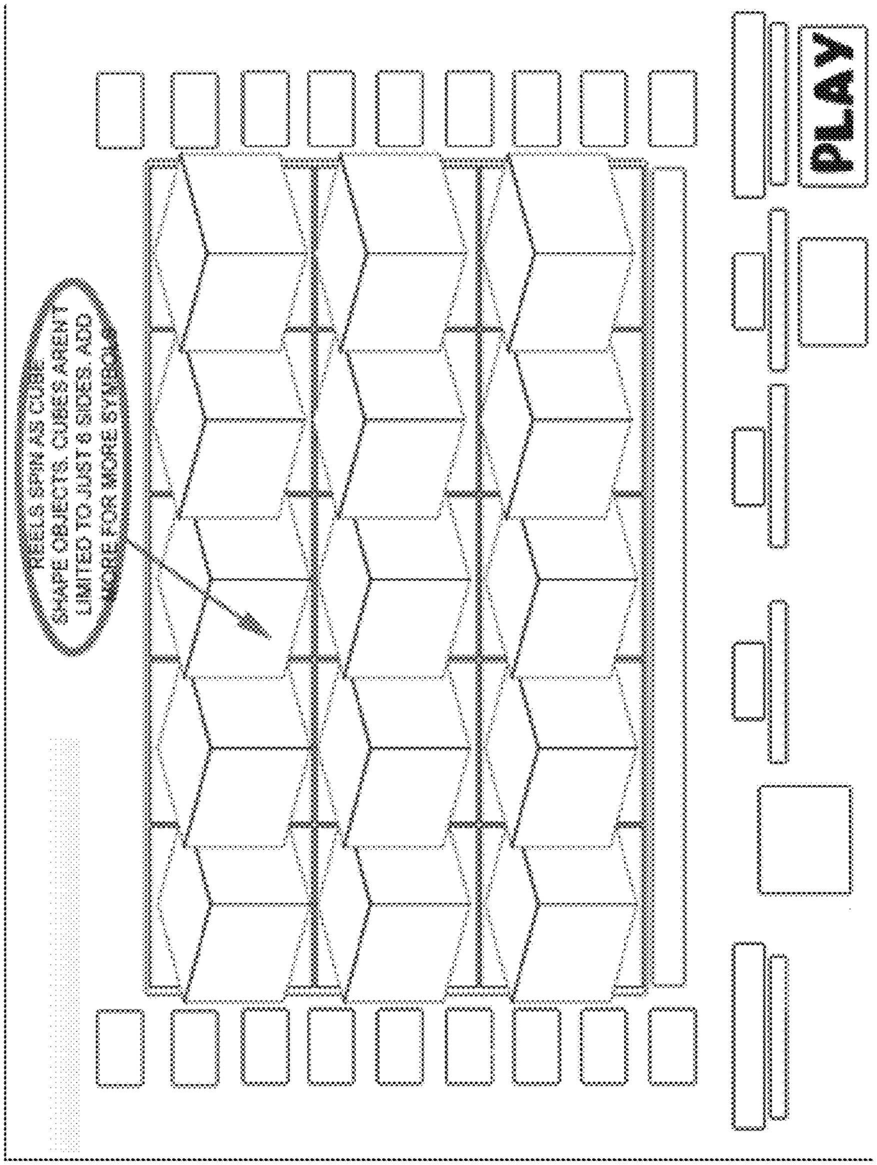
FIG. 11 shows an exemplary enhancement of a gaming component using multiple three-dimensional multi-faceted game components.

This example shows a single gaming component as enhanced. In some embodiments, multiple gaming components on the gaming plane may be enhanced, thus creating various effects and three dimensional variants. Referring now to FIG. 11 there is shown an exemplary enhancement of a gaming component using multiple three-dimensional game components. The three-dimensional game components may be enhanced as multi-faceted game components. In this example, all reel positions or cells may contain a multi-faceted game component. As an illustrative example, a multi-faceted game component may be a cube that may spin in various directions or on different axes. The spin or rotation may be activated in different ways (e.g. user activated, game state activated, event activated). The direction or axis of spin may be varying from one game component to the next.

A cube or other three-dimensional shape may not be limited to its geometric number of facets. For example, a cube may not be limited to six sides. Each facet may also have a weight associated therewith. A higher weight may increase likelihood or probability that the facet will be used in reel or grid combinations (e.g. the spinning will stop with the this facet visible and usable for the game). A lower weight may decrease likelihood or probability that the facet will be used in reel or grid combinations. Weighting may also be implemented as frequency of various symbols on the different facets. For example, if multipliers are used as gaming symbols on different facets then there may be more low paying multipliers than high paying multipliers over the facets of the multiple three-dimensional game components. This may also apply to bonus feature triggers and other symbols.

Figure 12:
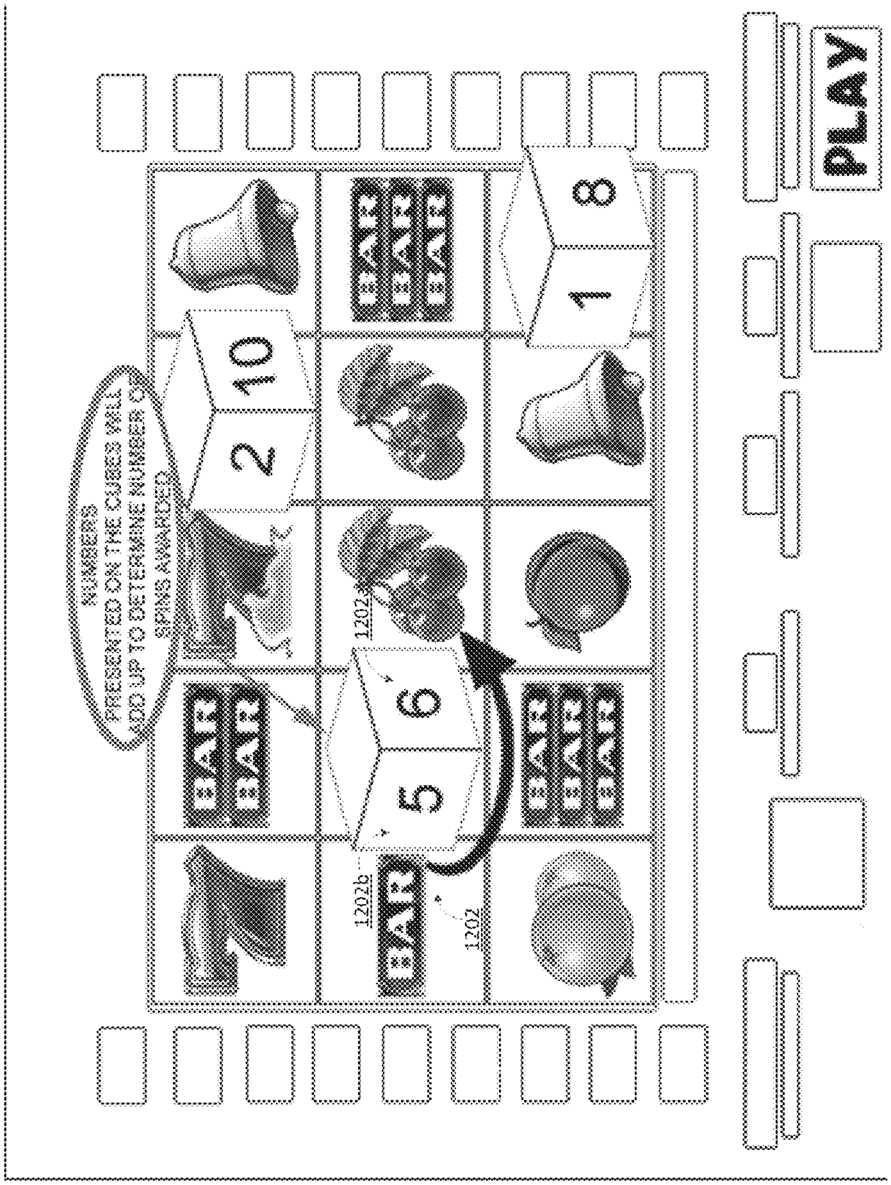
FIG. 12 shows an exemplary enhancement of a gaming component using multiple three-dimensional game components.

Referring now to FIG. 12 there is shown an exemplary enhancement of a gaming component using multiple three-dimensional game components. The three-dimensional game components may be enhanced as multi-faceted game components. The different facets may reflect bonus feature triggers. For example, when a predetermined number of particular bonus gaming symbols are visible when the reel stops, each may enhance into a multi-faceted game component, such as a cube 1202, where each fact may be associated with a bonus feature.

For example, each side or facet of the game component may hold a number, such as shown for facets 1202*a*, 1202*b*. Each multi-faceted game component may spin in a direction or on an axis, automatically or by player action. For example, player may be prompted to spin (via an electronic interaction with EGM 10) each multi-faceted game component displayed onscreen. The addition of all numbers (e.g. numbers on facets 1202*a*, 1202*b*) presented or visible on all or some of the multi-faceted game components may give a total of the number of free games to be awarded to a player, for example. Other bonus features may also be provided by the multi-faceted game components.

There may be a minimum number of free games provided by the bonus features of the multi-faceted game components. For example, FIG. 12 displays three multi-faceted game components with bonus features and a minimum number of free games may be three (one for each of the three multi-faceted game components). There may also be a maximum number of free games. If a multi-faceted game component offers bonus values from 1 to 10 then the maximum number of free games for this example may be 30 (a bonus value of 10 for each of the three multi-faceted game components). The bonus values can also be weighted and randomly chosen.

Figure 13:
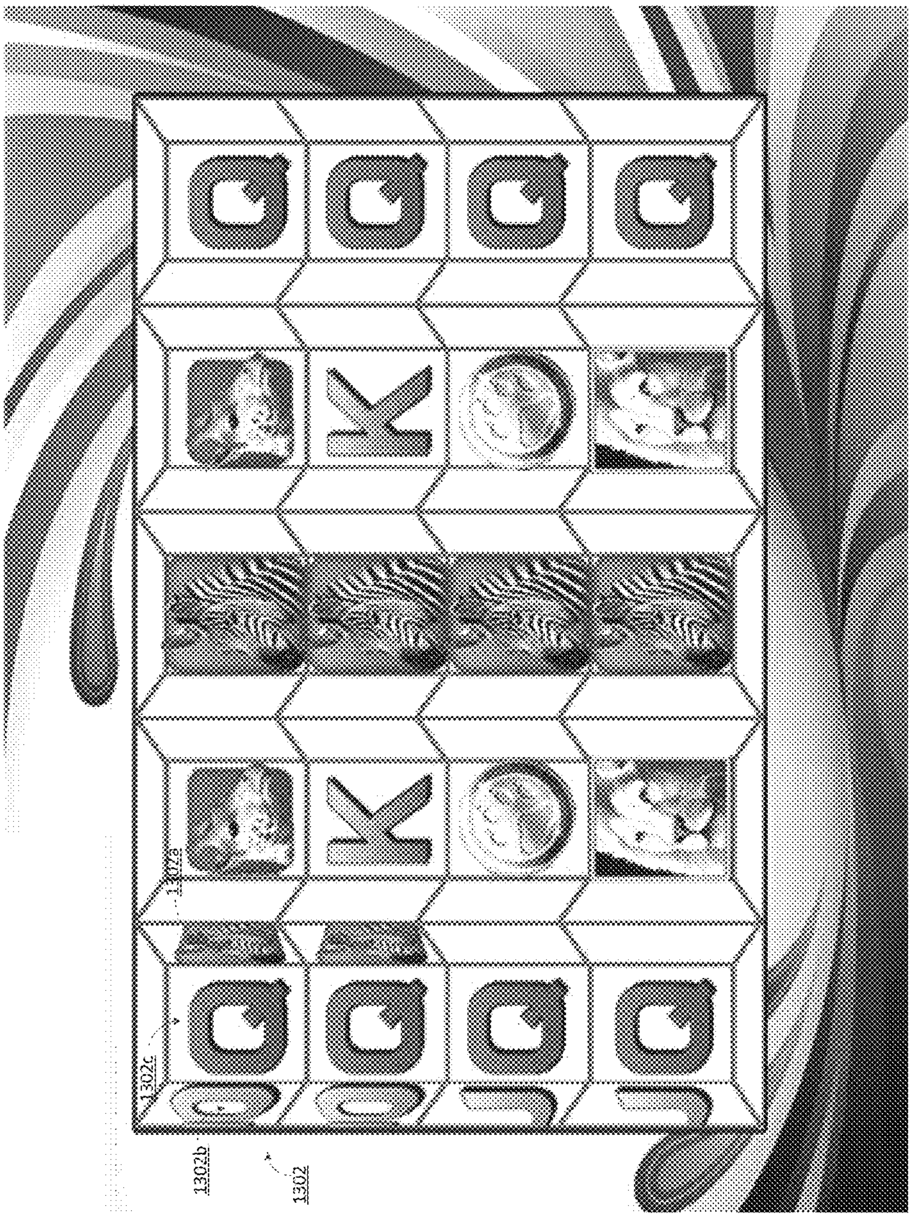
FIG. 13 shows an exemplary enhancement of a gaming component using multiple three-dimensional multi-faceted game components to provide additional symbols.

Referring now to FIG. 13 there is shown an exemplary enhancement of a gaming component using multiple three-dimensional game components. The three-dimensional game components may be enhanced as multi-faceted game components. The multiple faces of game components may be used as separate gaming symbols for a reel or grid type game. That is, the multiple faces may be used for patterns of winning combinations. The multi-faceted game components provide a different structure to grid. Each face of a multi-faceted game component may be used to form part of a winning combination or pattern. For example, a multi-faceted game component 1302 may have three viewable sides or faces 1302*a*, 1302*b*, 1302*c* that may be used to form part of a winning combination or pattern. Generally, only one face (e.g. 1302*c*) of a given multi-faceted game component 1302 may be viewable and used to form a winning combination or pattern. For this example enhancement three faces (e.g. 1302*a*, 1302*b*, 1302*c*) of a given multi-faceted game component 1302 may be used to form a winning combination or pattern.

Figure 14:
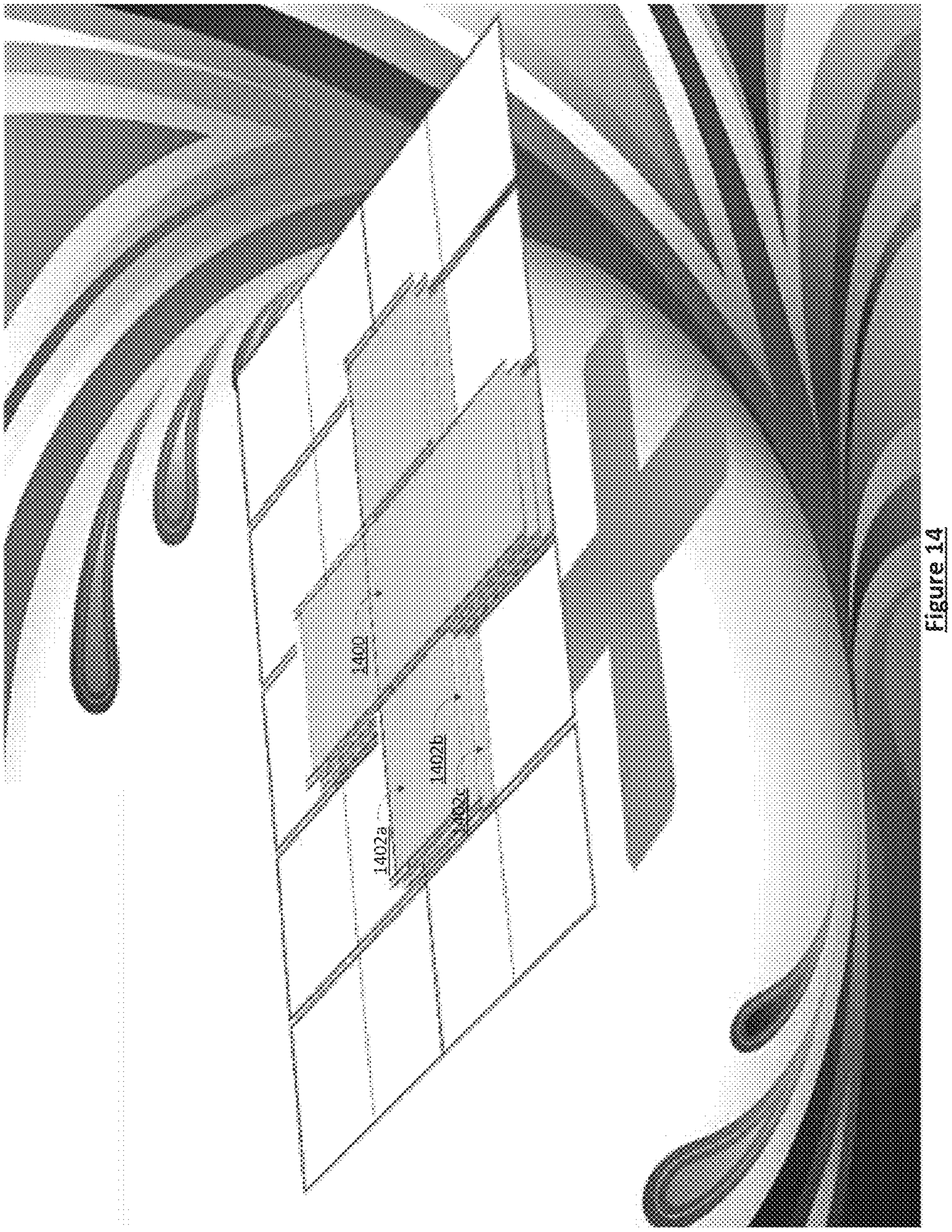
FIG. 14 shows another exemplary enhancement of a gaming component using multiple three-dimensional game components configured in multiple stacks.

Referring now to FIG. 14 there is shown another exemplary enhancement of a gaming component using multiple three-dimensional game components. A selected gaming component may be expanded outside of the gaming plane by stacking additional cells on top of or below, in front of or behind the original symbol.

In accordance with some example embodiments, a shaped symbol may appear behind the matrix (e.g. reel, grid). The shaped symbol may "push up" different cells or gaming components (e.g. the selected gaming components) to provide a three-dimensional enhancement. The shaped symbol may be different each time and may enhance a different number of symbol spaces or cells.

In this example, four selected gaming components 1400 are expanded outside of the gaming plane by stacked cells pushed up from behind of the original symbols. For example, the original symbol cell 1402*a* of a gaming component is enhanced by two stacked cells 1402*b*, 1402*c* behind.

Various embodiments are possible to integrate the additional symbols provided on cells 1402*a*, 1402*b*, 1402*c* into the original game. For example, the stacked cells 1402*a*, 1402*b*, 1402*c* may be multipliers (e.g. 2×, 3×, 4×) or Wild. As another example, in a spinning reel game, anyone of the symbols in cells 1402*a*, 1402*b*, 1402*c* may be used to form a winning combination with neighboring cells. Alternatively, only the top, or visible, symbol may be matched with neighboring cells and as the game progresses, hidden symbols may be discovered and used to further advance the game. In another embodiment, various events in the game, such as a particular winning combination or reaching a threshold of points, may allow the player to see and/or use the additional hidden symbols in addition to the top or visible symbol to form winning combinations. For example, during a bonus feature reels 3, 4, 5 (FIG. 14) have different levels of pushed up cells and the cells may "peel" off as used in free game line wins or as part of a winning combination or pattern. New cells from below or behind may then be revealed. Other scenarios are also possible. In addition, the number of stacked symbols may be more or less than three, as desired.

Figure 15:
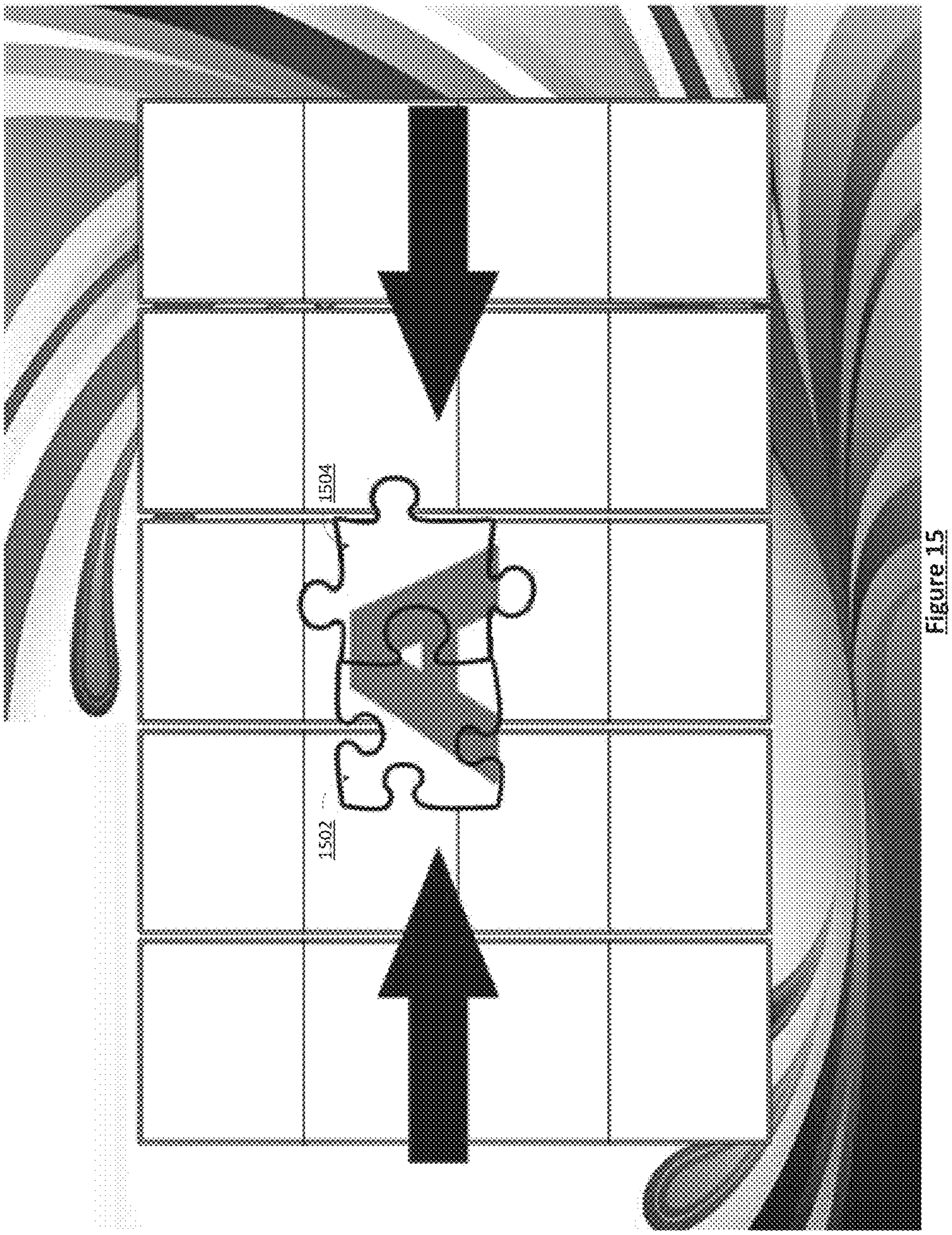
FIG. 15 illustrates two puzzle piece shapes or halves as additional game components to merge together to form an additional symbol.

Referring now to FIG. 15, there is shown another exemplary three-dimensional game enhancement. The example three dimensional enhancement includes additional game components (e.g. components that are not part of the original matrix game) that combine to create an additional game symbol. That is, various components (that are not part of the underlying matrix game) can merge together in front of the matrix game to create new game symbols. The components can move or "fly" in from the top, bottom, left, right, back or front of the game screen, for example.

The additional pieces or components of a shape may float on top (to provide a three-dimensional view and depth) of the game matrix (e.g. reels, grid) and fit or merge together in front of the game matrix (e.g. reels, grid) to create an additional game symbol. The example of FIG. 15 illustrates two puzzle piece shapes or halves as the additional game components 1502, 1504 to merge together to form an "A" symbol.

Figure 16:
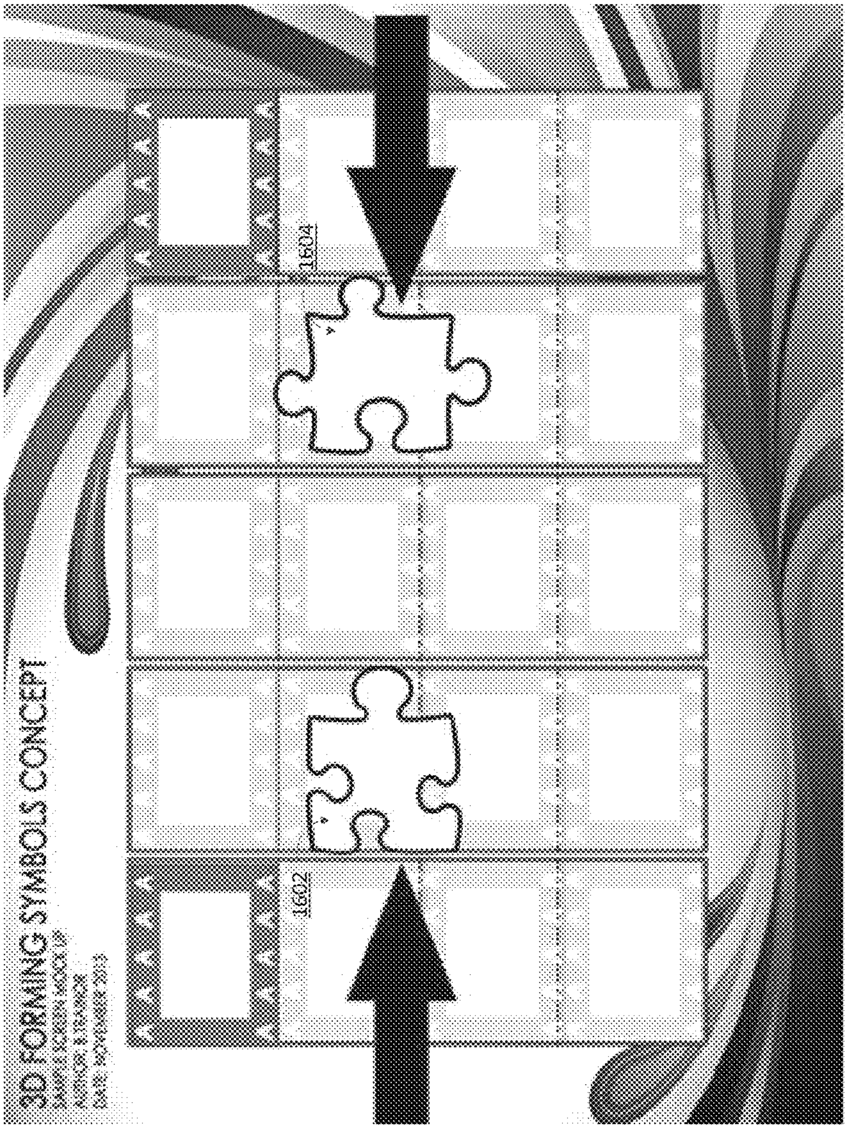
FIGS. 16 and 17 show further example illustrations of an exemplary three-dimensional game enhancement with merging components to form an additional symbol.
Figure 17:
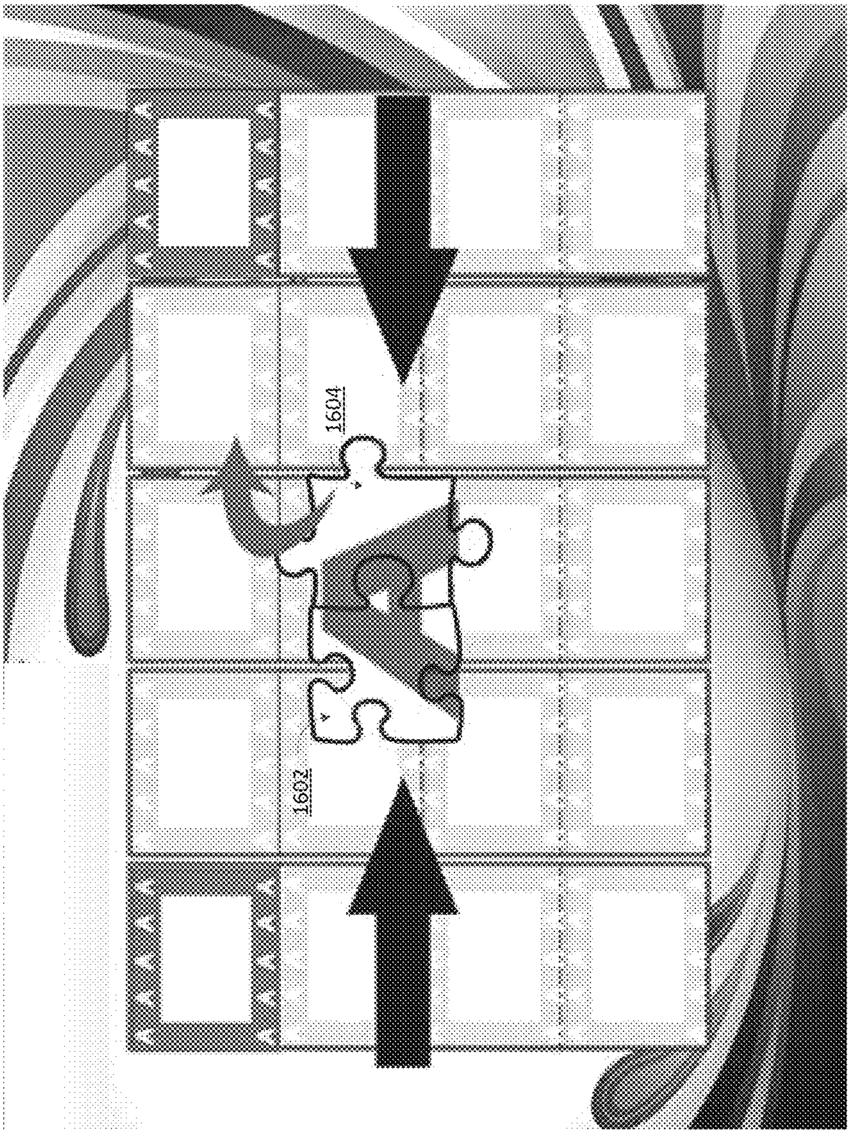

Referring now to FIGS. 16 and 17 there are shown further example illustrations of a exemplary three-dimensional game enhancement with merging components to form an additional symbol. In this example, two halves 1602, 1604 merge together of the underlining matrix game (e.g. grid, reels) that may lock in place on the reels to form an additional, new game component. The new game component may be semi-transparent so that the underlying game matrix is visible and can move behind. FIG. 16 illustrates two halves 1602, 1604 merging over the game screen. The components can move or "fly" in from the top, bottom, left, right, back or front of the game screen, for example. The additional game component may be an overlay on the underlying game matrix.

FIG. 17 illustrates an additional game component formed by the two halves 1602, 1604, the symbol "A". The additional game component may integrate with the underlying game to form winning combinations or patterns. For example, the additional game component may increase the chance of winning by combining with like symbols in the underlying game. The additional game component may offer a multiplier based on the symbol formed by the merged pieces (e.g. offers a chance to win five in a row over and over again with the additional game component).

The additional game component may be placed on the game grid to be used as a game component for the underlying game. For example, a goal of the game may be to get five in a row on the game grid to get an additional five in a row pay outs on top of the pay outs for the underlying game. The additional game component may provide a game within a game. The steps of moving in game pieces and forming additional game components may be repeated to fill in more game components of the underlying game.

Figure 18:
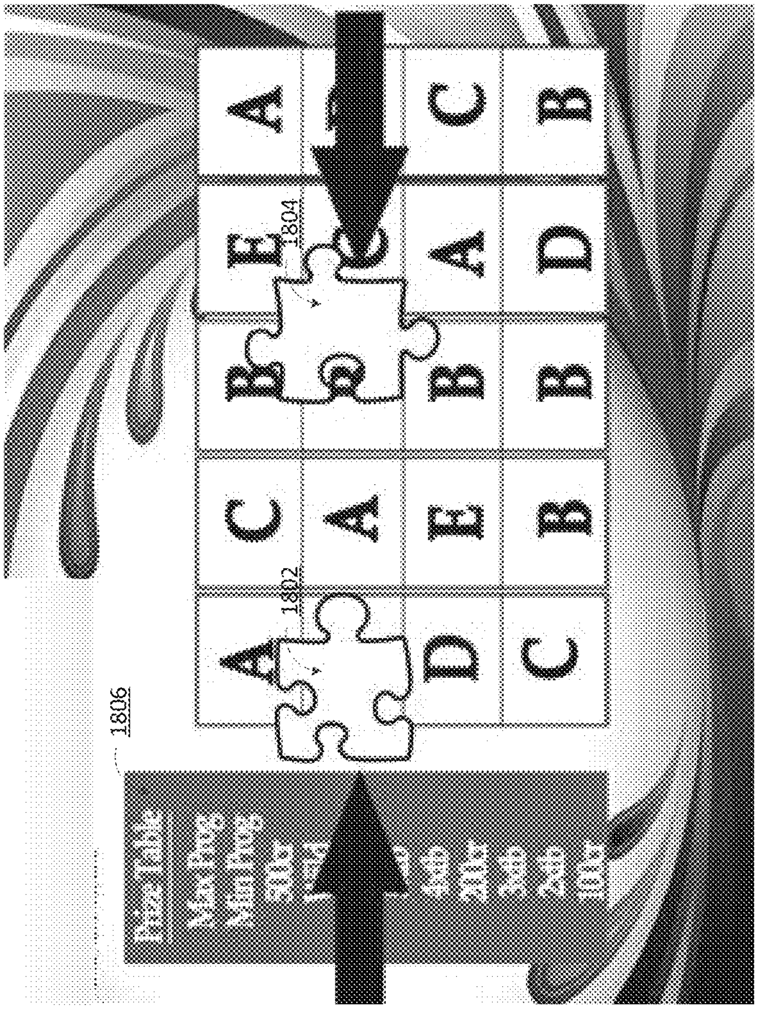
FIGS. 18 to 20 show further example illustrations of an exemplary three-dimensional game enhancement with merging components to form additional symbols.
Figure 19:
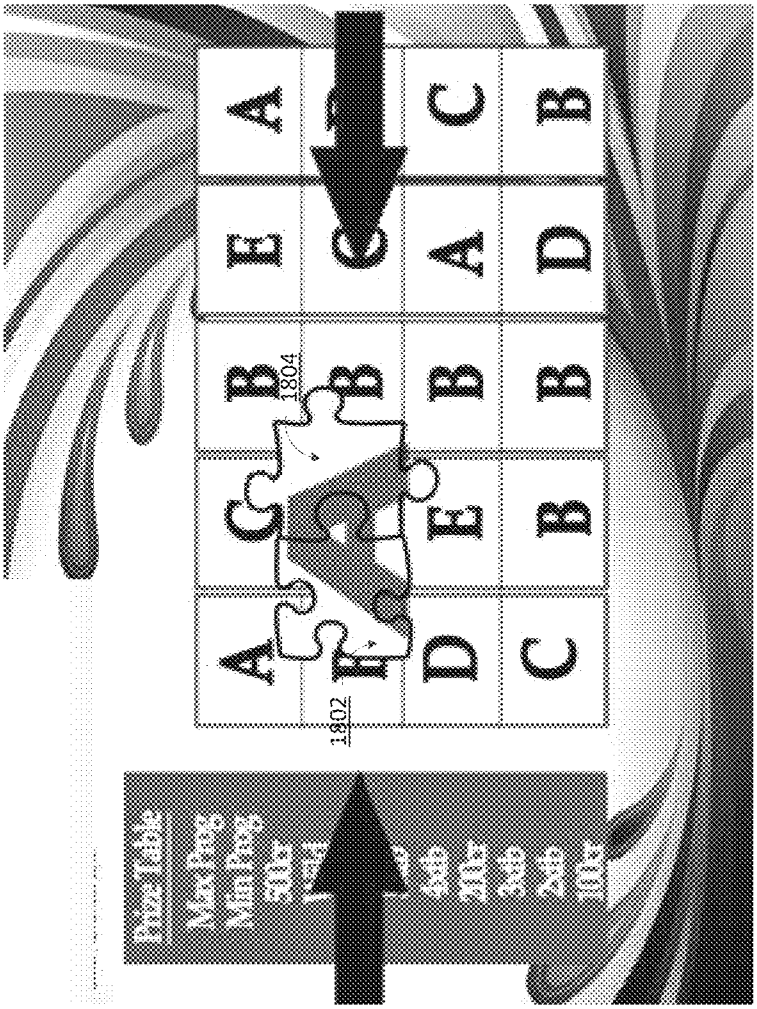
Figure 20:
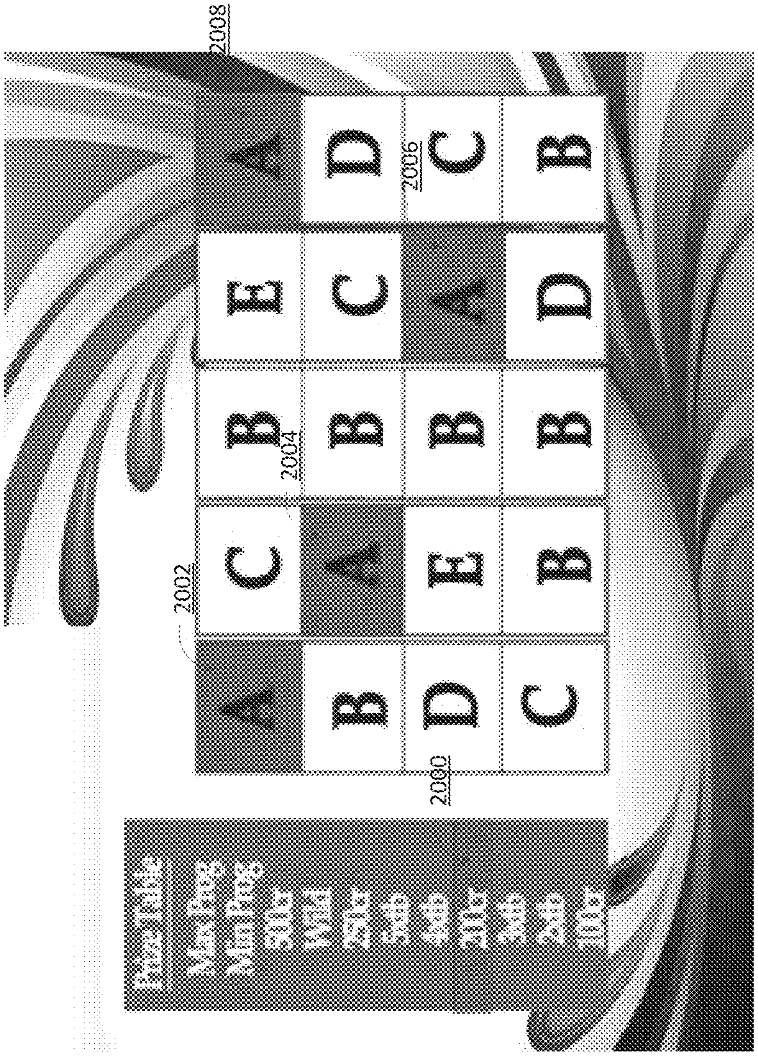

FIGS. 18 to 20 shown further example illustrations of an exemplary three-dimensional game enhancement with merging components to form additional symbols. For this example, two half pieces 1802, 1804 float out to merge the additional game component. The additional game component may integrate with the underlying game matrix in different ways. For example, symbols on the screen that match the merged symbol may pay a scatter prize. A prize ladder 1806 on the side may include win multipliers for the number of symbols on the game screen. The prize ladder 1806 may possibly increase over rounds of the game, and may involve progressive gaming features. The prize ladder 1806 may be displayed as a tape or three-dimensional line flowing.

As shown in FIG. 18, two halves 1802, 1804 merge over the game screen. As noted, the two halves 1802, 1804 may move or fly in from sides, back, front, top, bottom, etc. FIG. 19 illustrates the additional game symbol component formed by the two halves 1802, 1804, the symbol “A”. As shown in FIG. 20, the game board may identify where the “A” symbols 2002, 2004, 2006, 2008 are located in the underlying game matrix. Based on the number of “A” symbols 2002, 2004, 2006, 2008 visible in the underlying game matrix, the prize table on the side may identify the prize(s) 2000 awarded for the ‘A’ symbols 2002, 2004, 2006, 2008 on screen.

Referring now to FIGS. 21 to 28 there is shown another example three-dimensional game enhancement. A three-dimensional game enhancement may involve a transparent symbol that may randomly appear on the reels of the game matrix. The transparent symbol may allow symbols to push through and if those symbols are used in a win they may disappear (cascade) allowing for additional symbols to push through.

Figure 21:
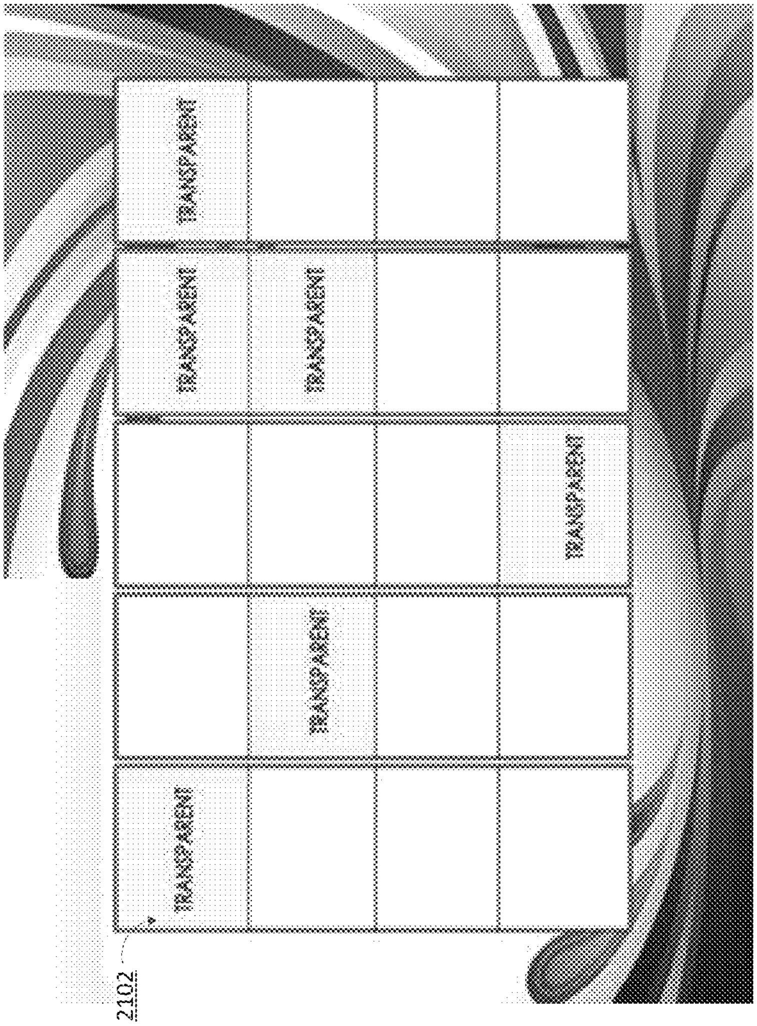
FIGS. 21 to 28 show another example three-dimensional game enhancement with transparent game features and stacks of gaming components.

FIG. 21 illustrates an example three-dimensional game enhancement may involve one or more transparent areas or symbols 2102 shown on the reel grid as part of the matrix game area.

Figure 22:
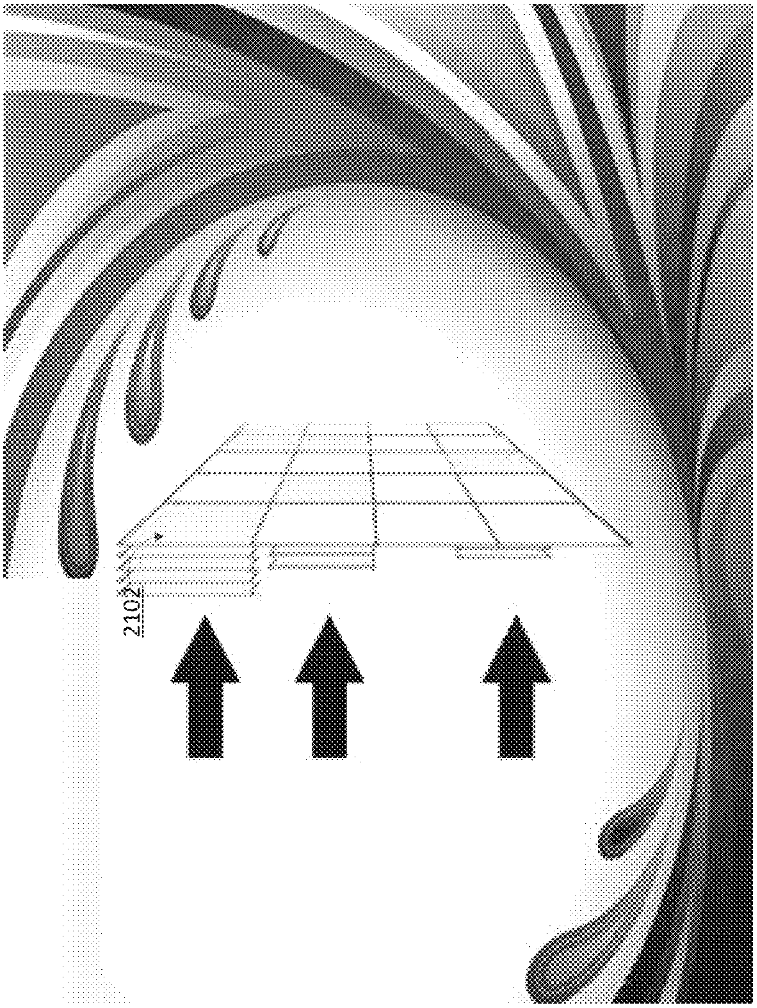

As shown in FIG. 22, when reel symbols land on these transparent areas 2102, and are used in line wins, the symbol spot may be replenished by a reel strip housed in behind the reels. The new symbols may ‘push through’ the transparent area 2102 and become the new symbol position. This “push through” mechanism may be similar to the example shown in FIG. 14 where a selected gaming component may be expanded outside of the gaming plane by stacking additional cells on top of or below, in front of or behind a symbol that lands on the transparent area 2102.

In other example embodiments, a transparent symbol may randomly appear on the reels of the free games. When the transparent symbol appears, it may mark the symbol area with a number or watermark sign. At the end of the bonus, a free game may be awarded where all the transparent symbol areas will be activated. This may allow for a set of reels in behind a game area matrix to become active. Where there are wins using the extra set of reels, winning symbols may disappear which allow for new symbols to push through. If the newly pushed through symbols are used in a win they may disappear (cascade) allowing for additional symbols to push through. This may continue until all of the transparent numbers are used per symbol area of the game matrix.

Figure 23:
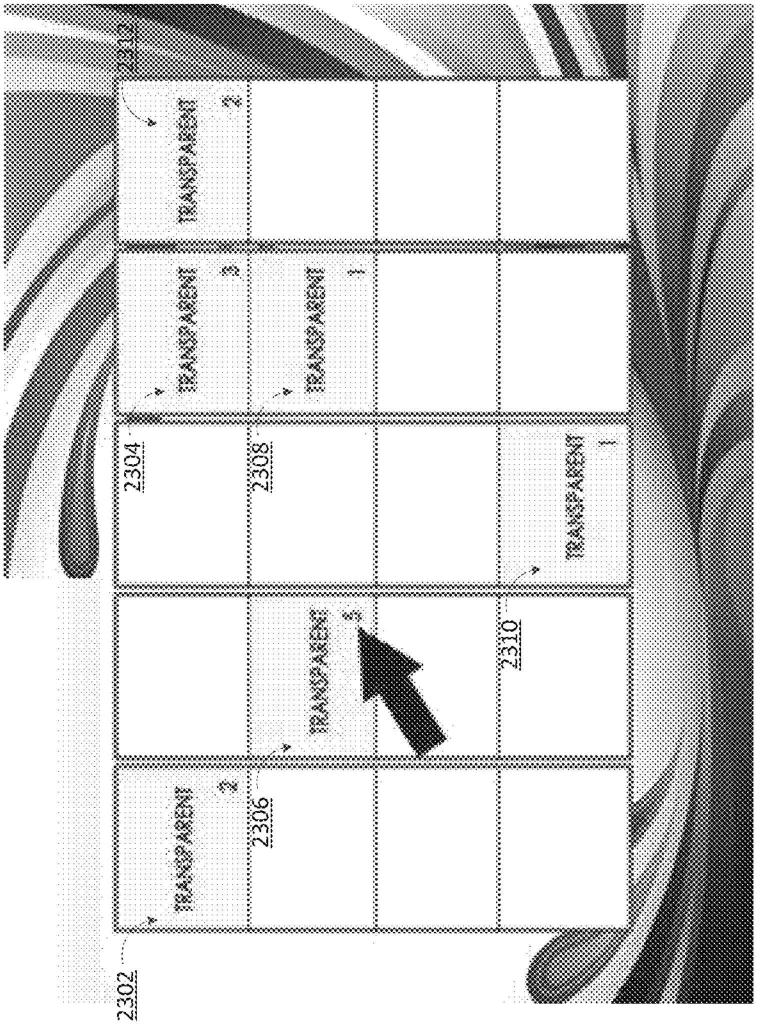

As shown in FIG. 23, transparent areas 2302, 2304, 2306, 2308, 2310, 2312 may randomly appear on the reel grid as part of symbols in the game. When a ‘transparent’ symbol 2302, 2304, 2306, 2308, 2310, 2312 lands, it may mark the game grid matrix in the position it lands with a number or watermark. The number or watermark may indicate a number of additional symbols stacked behind the transparent area 2302, 2304, 2306, 2308, 2310, 2312. For example, a number “5” may indicate that five symbols are stacked behind a transparent area 2306. The total number of transparent symbols that have landed per area may be tracked. As shown, six transparent areas 2302, 2304, 2306, 2308, 2310, 2312 may appear on the game matrix.

Figure 24:
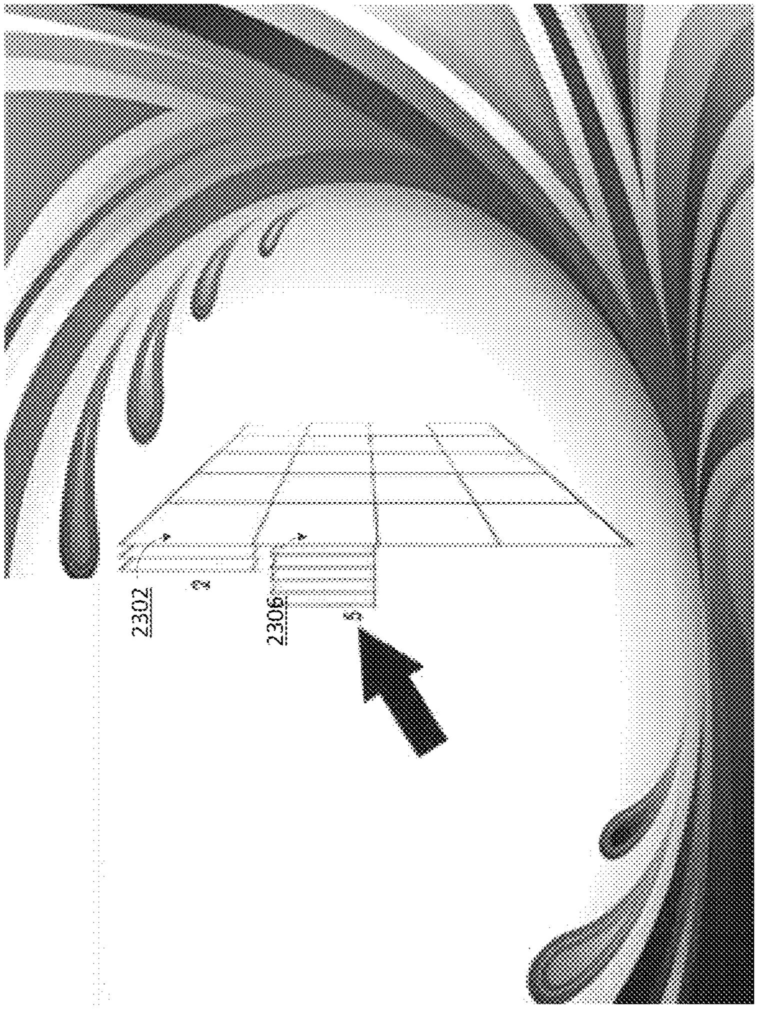

As shown in FIG. 24, when the free games are complete, one final free game may be awarded and the transparent symbol areas will become activated with the ‘push through’ symbols (e.g. as described in relation to FIG. 22). These additional symbols may be wilds, bonus triggers, straight credit prizes, jackpot symbols, scatters, multipliers, etc. symbols. In some example, the deeper the symbol in the stack then the more valuable they become.

In further example embodiments, there may be a pick a prize feature where the player can gamble on the same spot that they touch (via electronic signal) on the display screen in order to get a larger credit prize or collect a payout. The pick a prize feature may be provided as a three-dimensional enhancement. For example, a three-dimensional enhancement may show spots that have already been picked with depth to highlight a gamble of picking the same spot more than once. The same spot can be touched multiple times, as the player picks “deeper” in the hole. The prize is also double rich but the “collect” or “end game” symbol may also be hidden underneath.

Figure 25:
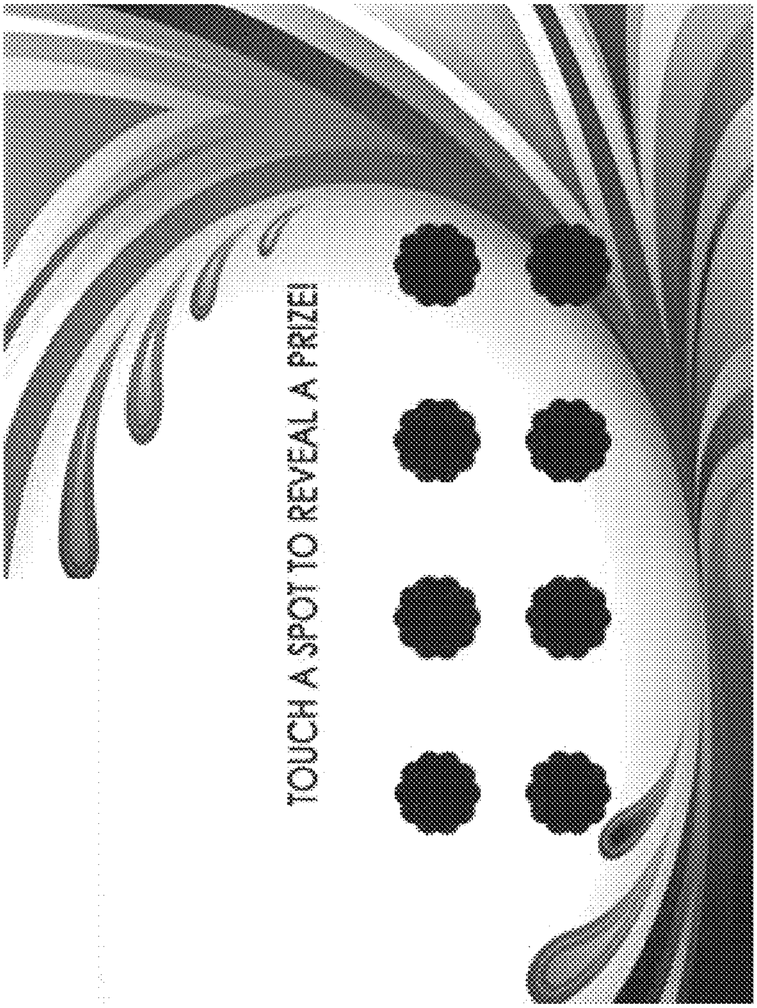
Figure 26:
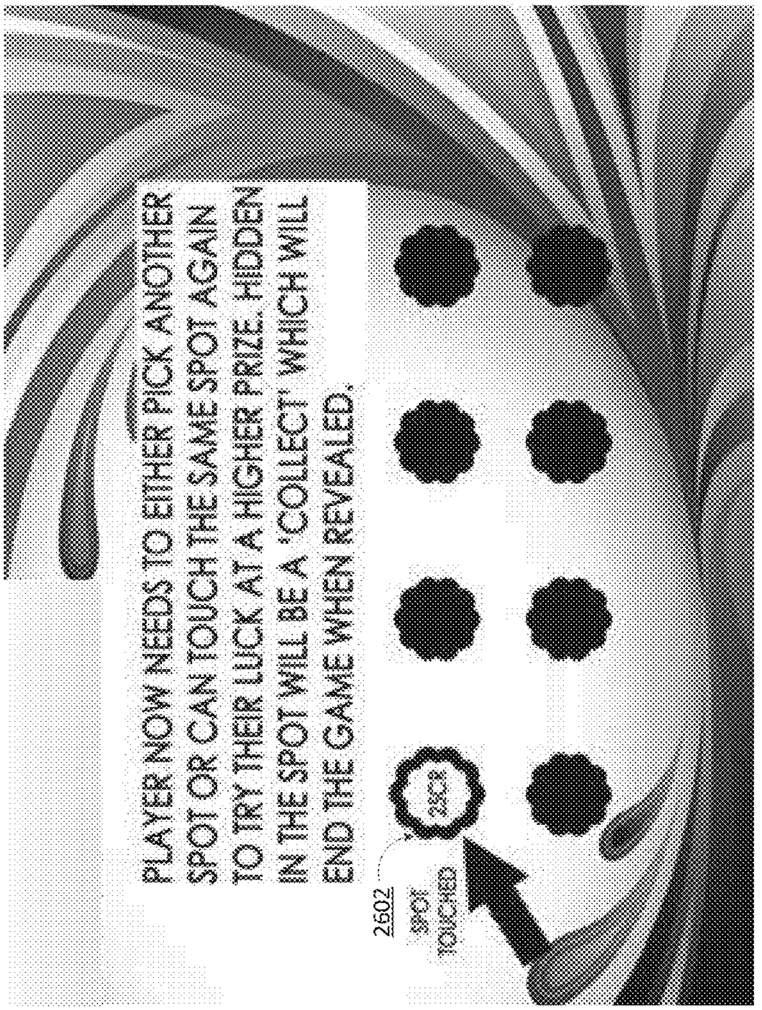
Figure 27:
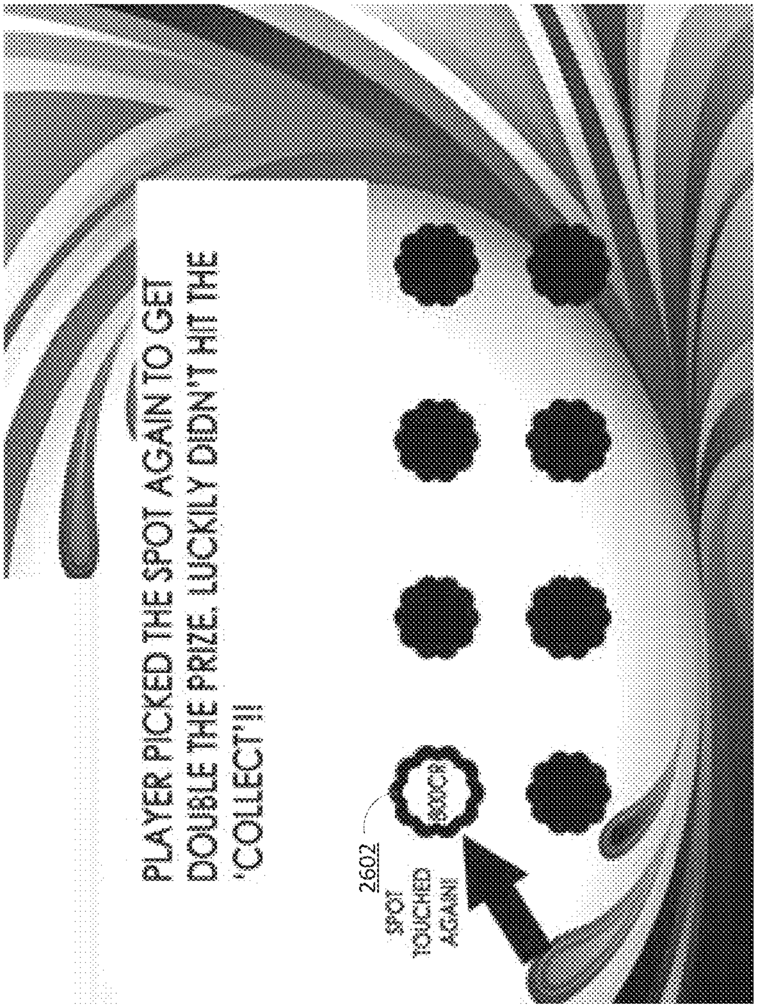
Figure 28:
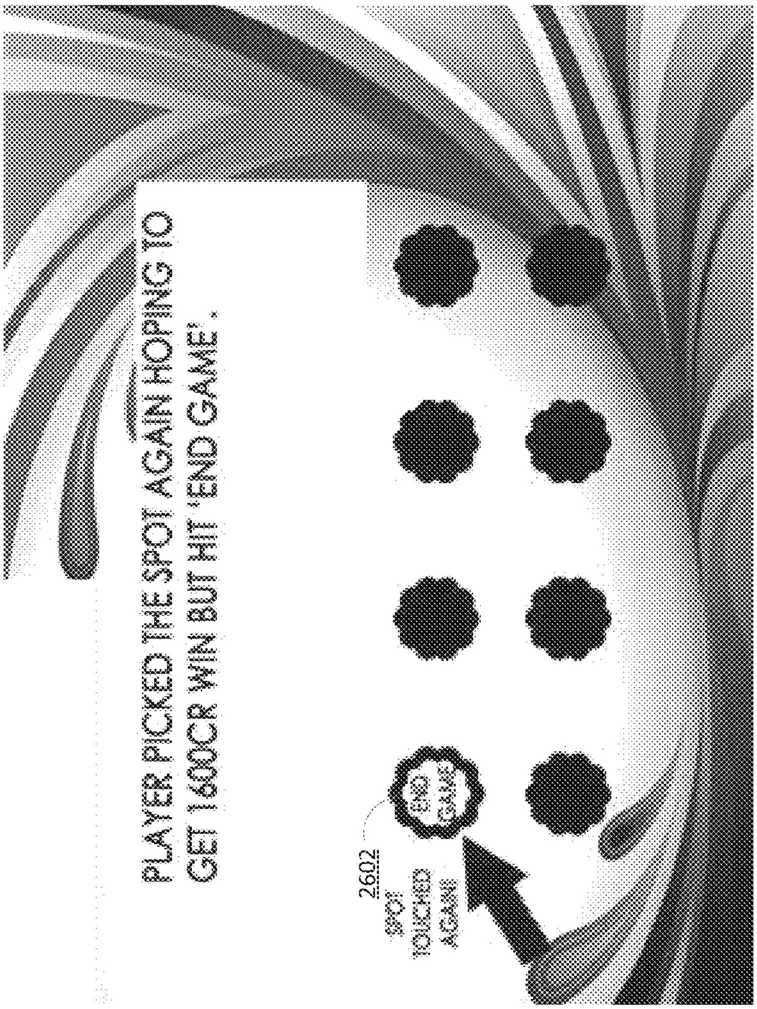

As shown in FIG. 25, a player may be presented with pick a prize screen, and prompted to touch a spot, or other activate a spot. Each spot may be associated with a credit prize or a ‘collect’. As shown in FIG. 26, a player may touch first spot and wins 25 credits. The player may still not collect the credits. As shown in FIG. 27, the player may touch the same spot to win 50 credits, then 100 credits, then 200 credits, then 400 credits, and then 800 credits. That is, the spot may have a three-dimensional enhancement such that different prizes are hidden under already activated or touched spots. However, there is a risk in re-touching the same spot as there may not always be a hidden prize. As shown in FIG. 28, the player may press, touch or otherwise activate the same spot hoping to get a larger credit prize (e.g. 1600 credits) but instead an “end game” symbol may be revealed, or a “collect” symbol.

Figure 29:
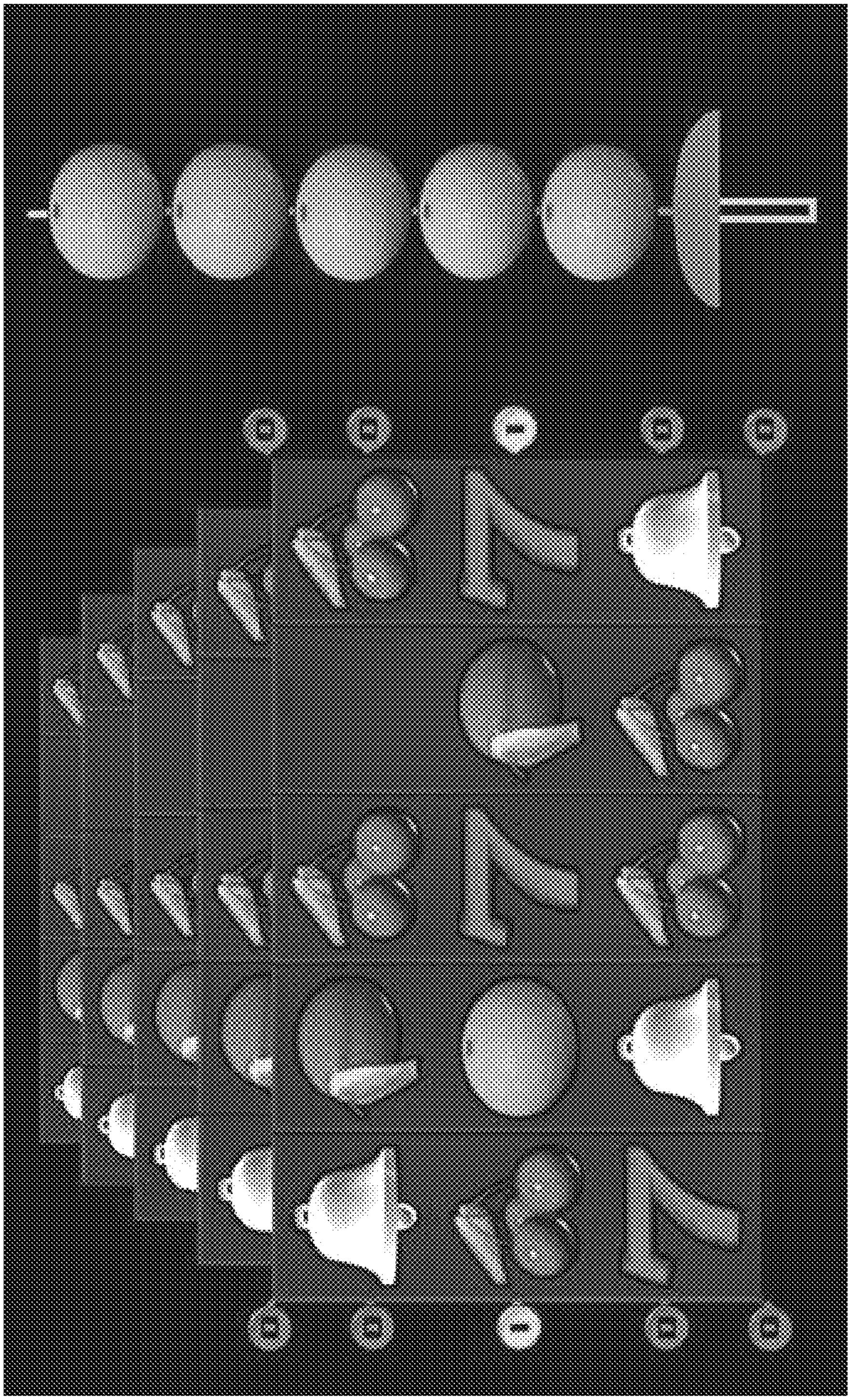
FIG. 29 shows another example three-dimensional game enhancement with stacks of gaming components and extra game feature purchase options.

Referring now to FIG. 29 there is shown another example three-dimensional game enhancement. The game may be a grid or matrix based line-count game, where a player selects their lines and bet. The player may also have to option to purchase symbol positions on the matrix as extra lines. A three-dimensional game enhancement may stack symbols along the z axis. After the reels stop and regular line wins are presented, any additional spots purchased may be presented as a toothpick skewering through the stack of symbols, pulling the stack out and turning it to reveal a side profile. This may reveal any number-in-a-row or scatter wins.

Figure 30A:
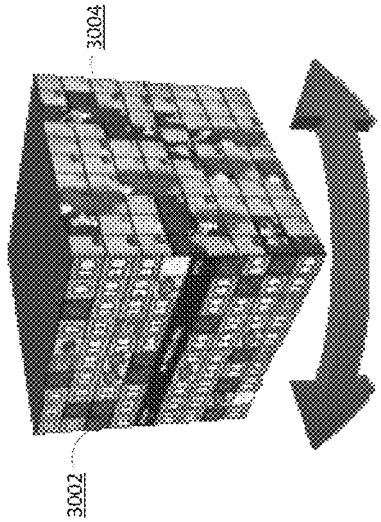
FIGS. 30*a*, 30*b*, 30*c*, 30*d* show another example three-dimensional game enhancement with multi-faceted gaming surfaces.
Figure 30B:
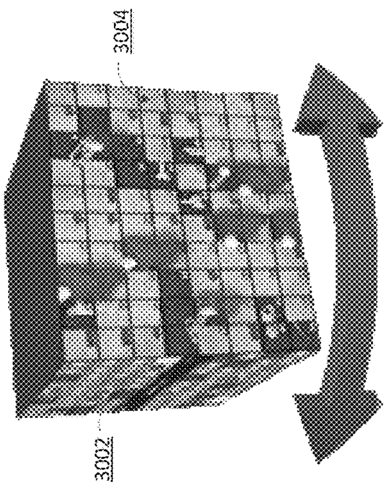

Referring now to FIGS. 30*a*, 30*b*, 30*c*, 30*d* there is shown another example three-dimensional game enhancement. The gaming surface may be shown as a three-dimensional game enhancement in this example. That is, the three-dimensional game enhancement may be a multi-faceted gaming surface. FIGS. 30*a* and 30*b* show two different game surfaces 3002, 3004 on each visible facet of a multi-faceted gaming surface. The multi-faceted gaming surface may rotate or spin to reveal more of a particular game surface 3002, 3004 or different game surfaces that may currently be hidden from view. For example, FIG. 30*b* shows more of one gaming surface 3004.

Figure 30C:
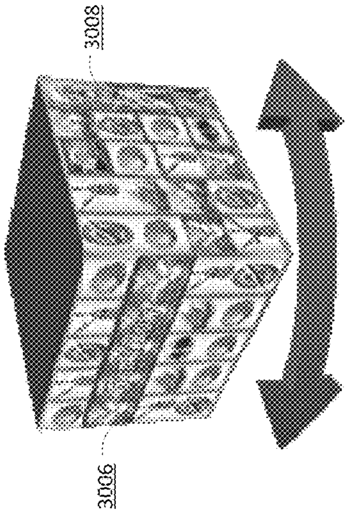
Figure 30D:
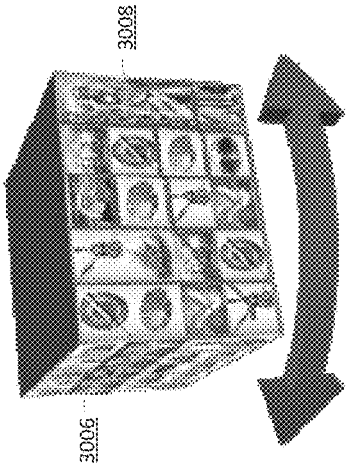

FIGS. 30*c* and 30*b* also show two different game surfaces 3006, 3008 on each visible facet of a multi-faceted gaming surface. The multi-faceted gaming surface may rotate or spin to reveal more of a particular game surface 3006, 3008 or different game surfaces that may currently be hidden from view. For example, FIG. 30*d* shows more of one gaming surface 3008. A cube is an illustrative example and different shapes and configurations may be used for the multi-faceted gaming surface.

Another example three-dimensional game enhancement may involve stacking symbols along a z-axis. For example, symbols may stack five symbols high, where any symbol involved in a winning combination or pattern may be peeled away, revealing the symbol beneath. This may create a z-axis cascading effect. Once all stacked symbols are removed from any spot on the reel that spot may be down to the hard core of the reel. The hard core symbol may be a wild until it is used. Then the symbols are replaced.

The different facets may correspond to different games of the same or different game type. For example, any four-card Keno, or multi-play game where the player is playing more than one game at once may be displayed on different sides of a cube, instead of beside each other, to maximize space. The player may swipe the cube in any direction to change game card. In another example, buttons on screen may be selected to bypass the swipe control, but the rotation may still be displayed on the surface of a cube.

Figure 31:
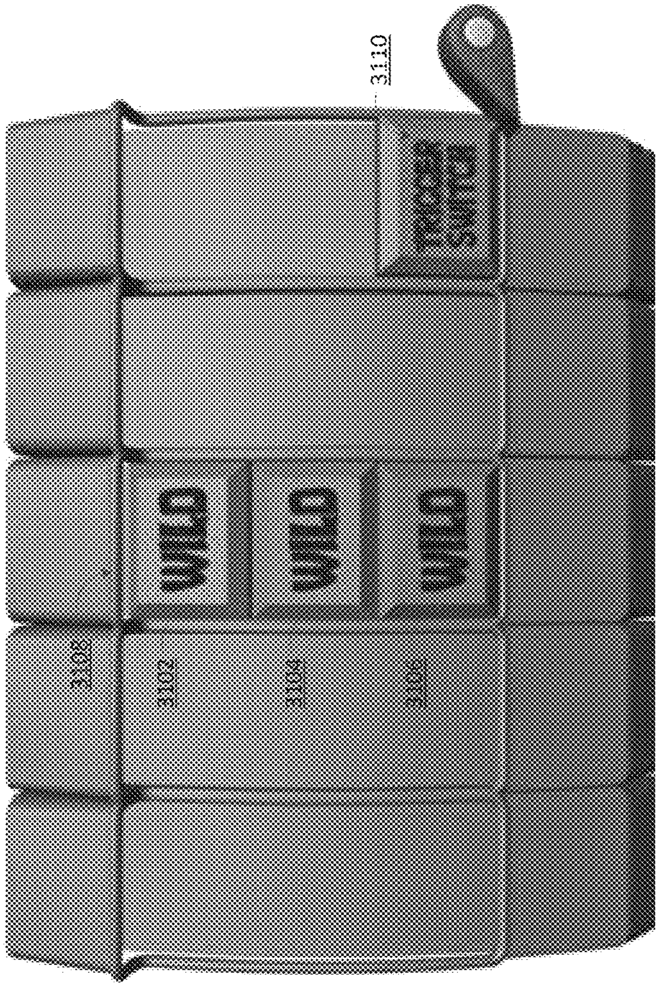
FIG. 31 shows another example three-dimensional game enhancement where gaming components have additional three-dimensional functionality.

Referring now to FIG. 31, there is shown another example three-dimensional game enhancement. The game matrix may relate to symbols on reels that may be activated to extrude or protrude outward on the z axis to create a three-dimensional game enhancement. The three-dimensional game enhancement allows symbols to have a function when they spin past on a reel without landing, instead of just when the symbol lands in view.

The three-dimensional symbols on reels may create different event triggers. For example, there may be a group of stacked symbols 3102, 3104, 3106 that may extrude outward, causing them to catch on the bottom of the reel border 3108, forcing the symbols 3102, 3104, 3106 to automatically stop on screen when they pass into view. In this example the symbols 3102, 3104, 3106 may be wilds.

As another example, a special symbol 3110 could extrude outward to flick a switch every time it passes into view, either triggering an event, or collecting symbols to contribute to a pool of wilds, bonus spins or prize values.

In accordance with some embodiments, three-dimensional game enhancements may relate to various physics effects (e.g. collisions, gravity) used in a three-dimensional environment to interact with symbols and wagering game functionality.

Figure 32:
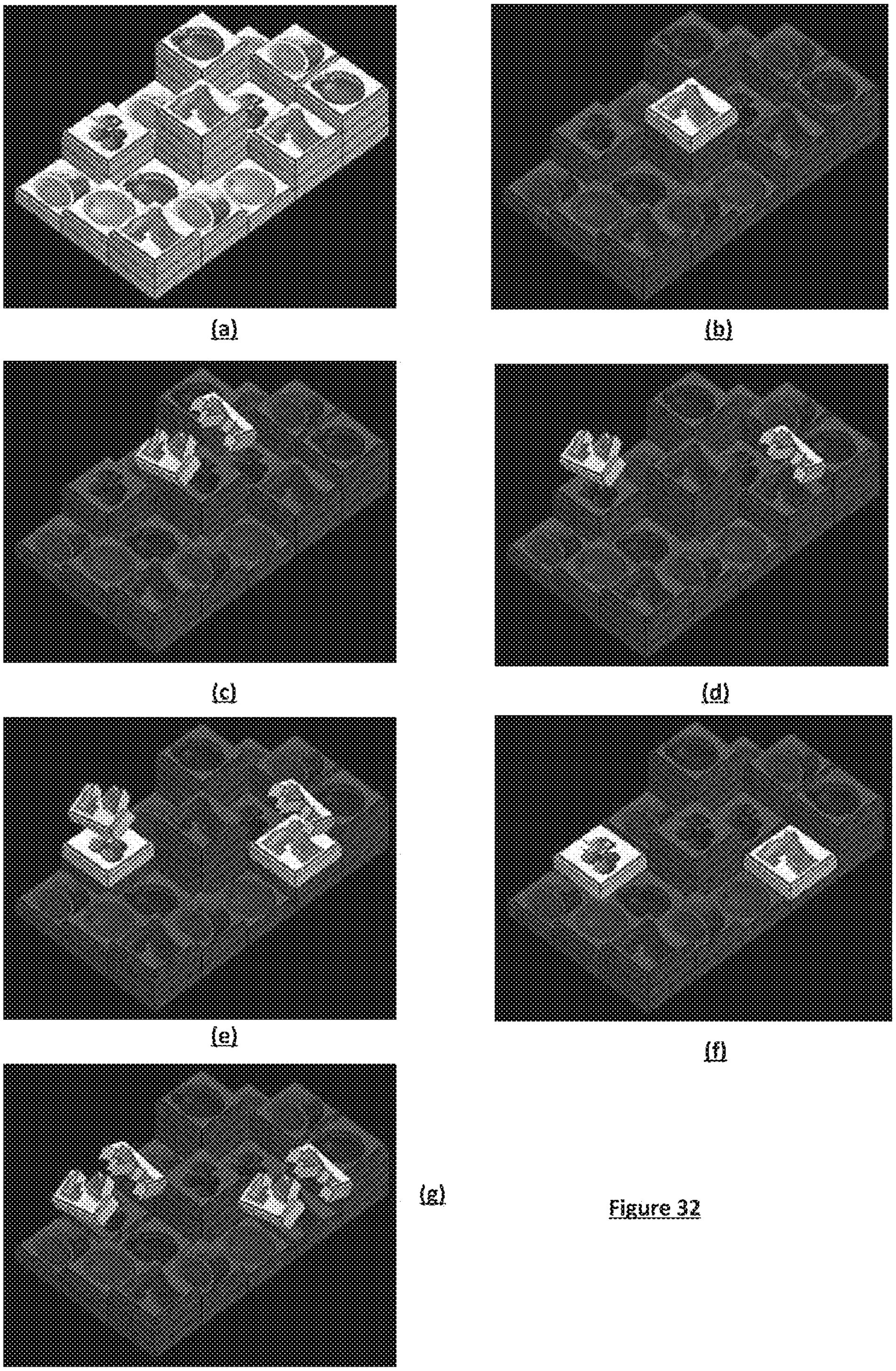
FIG. 32 shows an example three-dimensional game enhancement that relates to physics effects.

Referring now to FIG. 32, there is shown an example three-dimensional game enhancement that relates to physics effects. Symbols may be stacked along the Z-axis (as shown in FIG. 32 (*a*)) and may be triggered to break or split (as shown in FIGS. 32 (*b*), (*c*), (*d*), (*g*)). The break or split may cause the symbol to interact with other symbols by imitating real-world physics such as gravity (e.g. pull the objects downward) and collision (e.g. so more than one object occupying the same three-dimensional space will interact). The enhancement relates to a three-dimensional application (e.g. primarily along the Z-axis).

As shown in FIG. 32 (*a*), symbols may occupy a game matrix and may be stacked along the Z-axis. These stacks can be several symbols high. A predefined event will trigger a symbol (e.g. the symbol highlighted in FIG. 32 (*b*)) to animate a physics effects. An example may be to fall, or break into two or more symbols, and then fall. In the example shown in FIG. 32 (*c*), the symbol breaks into two pieces, with both pieces spreading out, away from its original position. The pieces appear to be affected by gravity, as they fall toward the reels in a three-dimensional space along the Z-axis, as shown in FIG. 32 (*d*). Each piece has the potential to collide with one or more other symbols, causing the pieces to interact with the colliding symbols, as shown in FIGS. 32 (*e*) and (*f*). Colliding symbol interactions may cause symbols to change to wilds, bonus triggers, or similar symbols, and so on. In the example shown in FIG. 32 (*g*), the colliding symbols create further fractions, causing the newly hit symbols to break into pieces, spread out, and interact with other symbols. These collisions could award extra credits, or create special symbols, for example.

Figure 33:
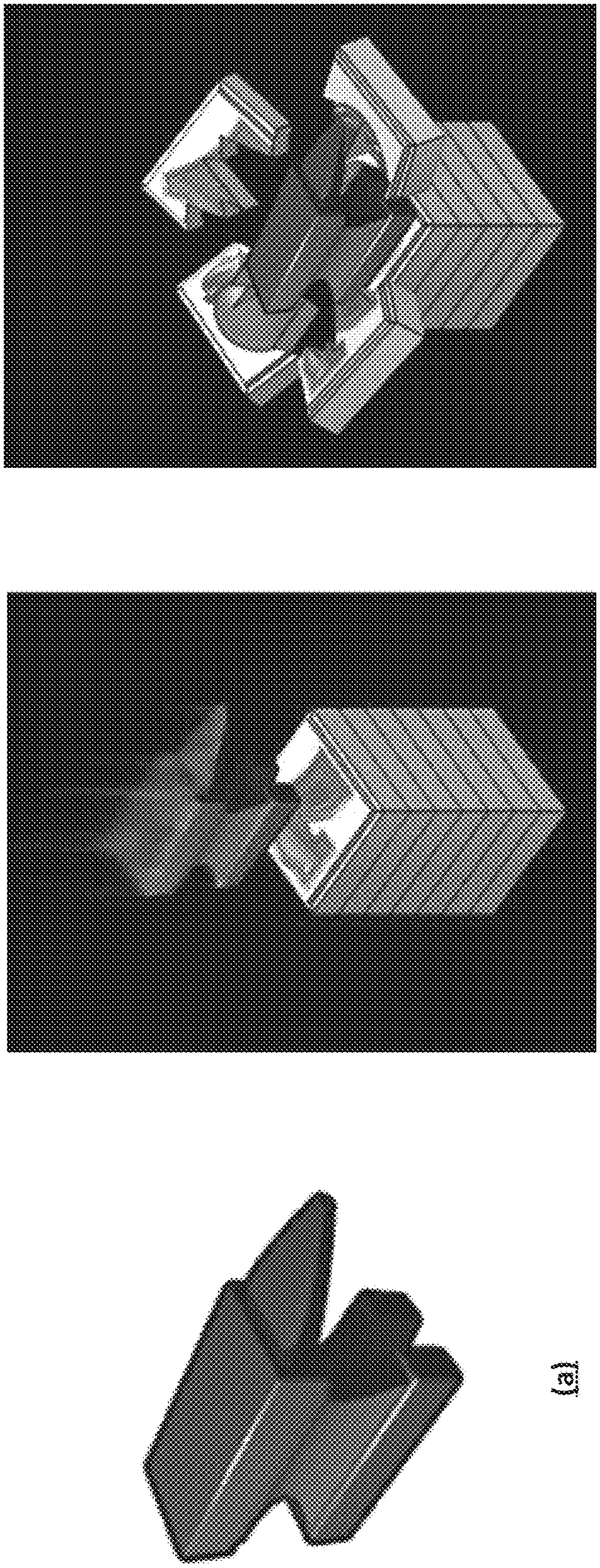
FIG. 33 shows another example three-dimensional game enhancement that relates to physics effects.

Referring now to FIG. 33, there is shown another example three-dimensional game enhancement that relates to physics effects. Symbols, items or gaming components may be associated with different virtual weights, so the symbols or gaming components react differently to a virtual gravity effect. Certain items or gaming components may be perceived as heavy, and other items or gaming components may be perceived as lightweight. These physical attributes may cause the items or gaming components to interact with other symbols or gaming components stacked along the Z-axis.

In the example shown in FIG. 33 (*a*), an ANVIL item may symbolize a heavy object, and may appear within the game. Certain game events may trigger to cause heavy symbols, such as the anvil, to virtually fall downward on the gaming surface, breaking any gaming symbols below, as shown in FIGS. 33 (*b*) and (*c*). Gaming symbols below may break, either causing the broken pieces to interact with other gaming symbols, remove them from play, award credit for broken gaming symbols, or to cause new gaming symbols to cascade on top, creating new wins, and so on.

Figure 34:
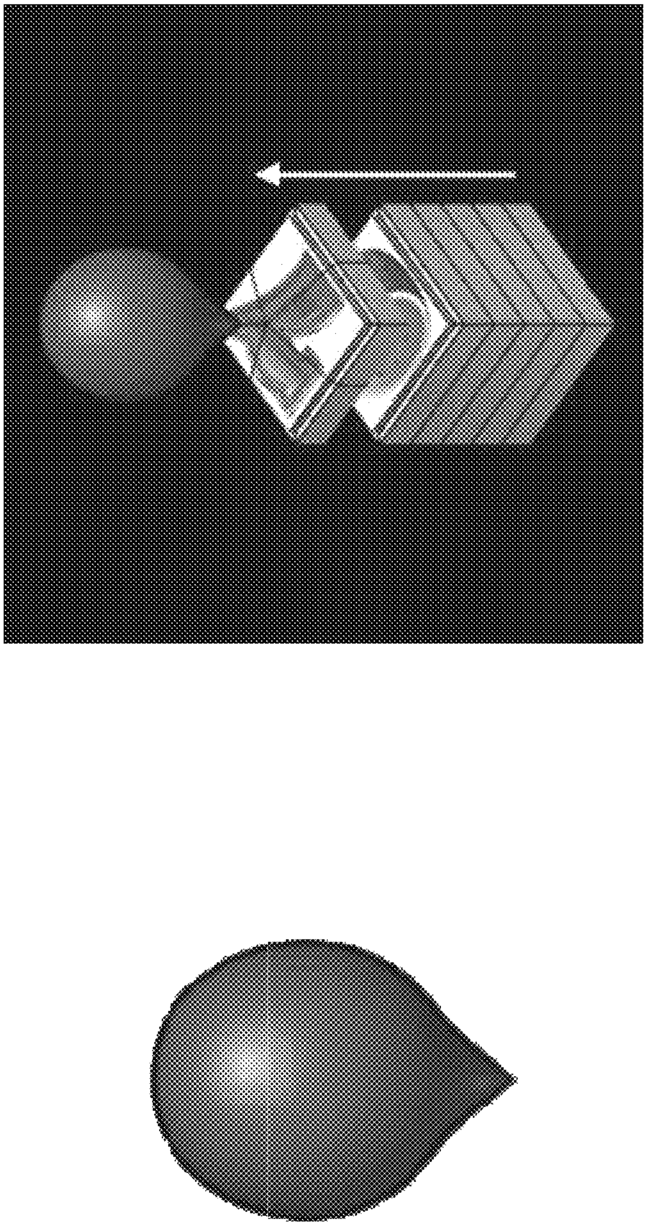
FIG. 34 shows another example of symbols, items or gaming components associated with different virtual weights, so the symbols or gaming components react differently to a virtual gravity effect.

Referring now to FIG. 34, there is shown another example of symbols, items or gaming components associated with different virtual weights, so the symbols or gaming components react differently to a virtual gravity effect. Certain items would be perceived as heavy based on the virtual weight associated therewith, and other items may be perceived as lightweight based on the virtual weight associated therewith. These physical (virtual) attributes may cause the items to interact with gaming symbols stacked along the Z-axis in different ways.

In the example shown in FIG. 34 (*a*), a BALLOON item may symbolize a lightweight object, and may appear within the game. Certain gaming events may be trigger to cause lightweight symbols, such as this balloon, to rise upward, pulling special symbols up to the top of the stack, as shown in FIG. 34 (*b*).

Figure 35:
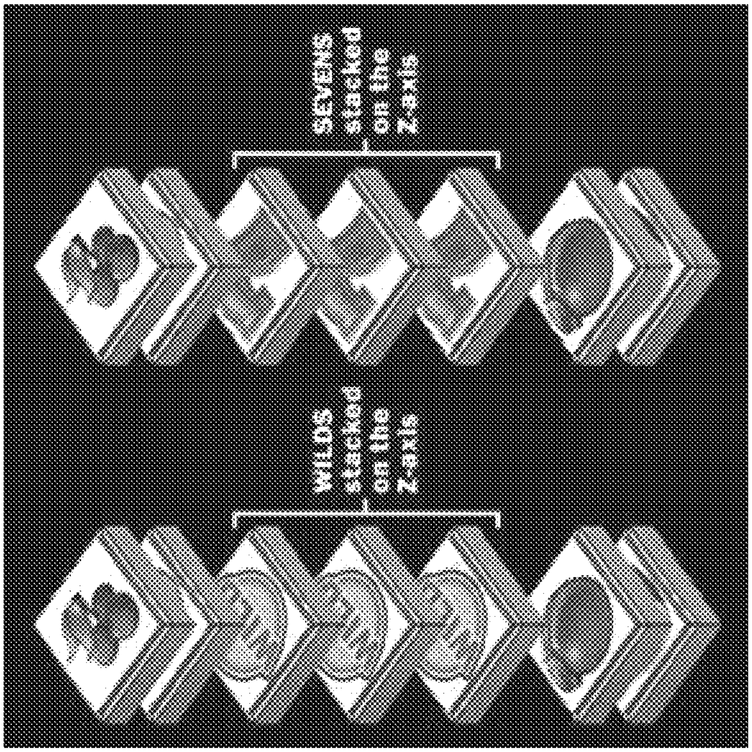
FIG. 35 shows another example three-dimensional game enhancement of stacking symbols or gaming components on the Z-axis.

Referring now to FIG. 35, there is shown another example three-dimensional game enhancement of stacking symbols or gaming components on the Z-axis. The stacked symbols may provide a variety of gaming enhancements, as described herein. For example, certain events may cause a top level gaming component to "peel" off or lift from the stack revealing another gaming symbol underneath. The newly revealed gaming symbol may be used to form additional winning patterns or combinations, for example. The stacked components may relate to Wilds, bonus features, multipliers, and so on. A three-dimensional game enhancement may provide the functionality of stacking symbols on the Z-axis.

The graphic of FIG. 35 illustrates how gaming symbols may be stacked on the Z-axis to create groups of the same symbol, wilds, bonus triggers, any other special symbol, and so on. The symbols may be used independently with other gaming symbols, such that each symbol in the stack may form a different or separate winning combination to provide an additional prize. The symbols may be used together (e.g. three like symbols in a row on the stack) to award additional prizes. Various winning enhancements may be provided.

A further example three-dimensional game enhancement may relate to a matrix that may represent spinning reels in a three-dimensional environment.

When PLAY button is pressed or activated, instead of the reels spinning, a new single layer of symbols may drop from above (along the Z-axis) and blankets the original or underlying matrix with a new layer of symbols. Various winning enhancements may be provided. For example, any wins that are created by the new layer of gaming symbols may cause the winning gaming symbols to disappear and reveal the gaming symbol directly beneath, sometimes causing more wins. This may be referred to as Z-axis or three-dimensional cascading functionality.

Further winning enhancement functionality may be added to create incentives for the player to remove as many symbols as possible. For example, win-multipliers may be provided for matching symbols lower in the stacked layers. Another incentive could be a base layer wild (e.g. the lowest level gaming symbol in the stack may be a Wild symbol).

Figure 36:
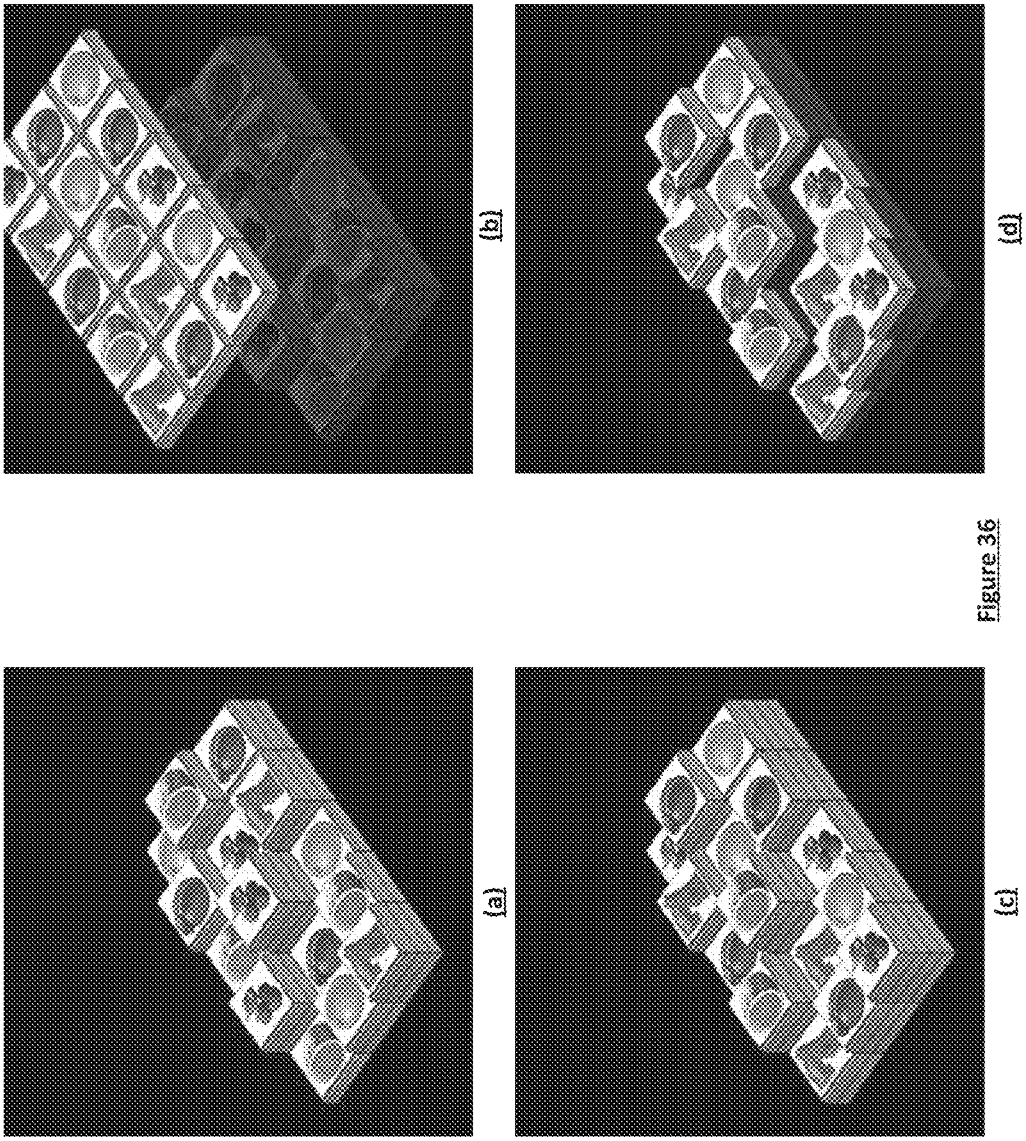
FIG. 36 shows a three-dimensional game enhancement with stacks of symbols or gaming components.

Referring now to FIG. 36 there is shown a three-dimensional game enhancement for a matrix that may represent spinning reels. In the example shown in FIG. 36 (*a*), a gaming matrix is shown already populated with several layers of gaming symbols stacked along the z-axis.

As shown in FIG. 36 (*b*), when a PLAY button is pressed or activated, a new layer of symbols is stacked on top of the original, base, previously dropped, or underlying layer of gaming symbols. In this example, the new layer of symbols appears to drop from above.

As shown in FIG. 36 (*c*), the new layer of gaming symbols collapses to the previously dropped symbols, and blankets the top of all the stacks of symbols on the matrix. There may be different numbers of symbols stacked for various cells of the matrix as symbols, or different depths of levels. For example gaming symbols may disappear when they form part of a winning combination which may result in different size levels of stacked symbols.

As shown in FIG. 36 (*d*), new symbols may drop to form a new top layer of gaming symbols for winning combinations. Next, any winning combinations may be tallied. Winning symbols may be removed to reveal symbols below to potentially create more wins. This may create a backwards cascading effect along the z-axis.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments. The hardware components are configured to provide practical applications of innovative computerized gaming features. The hardware components are configured to provide physical transformations by, for example, transforming the display on gaming screen with three dimensional enhancements.

The concept of enhanced game components may be applied to game mechanics in multiple ways. For example, Wild cards may be placed one on top of each other to create a depth showing multiple wilds in one spot resulting in awarding of the same line multiple times. Wilds may have a multiplier attached to each of the layers in the depth, for example, the front one is worth 1×, the second level is worth 2×, the third level is worth 3×, etc. Surrounding Wilds may be used by offering a layer above a regular reel set that would allow for wilds to be created when reels stop (i.e. any symbol landing would have the opportunity to become wild). This allows for depth to the surrounding wilds. For games that may have a match functionality, it would allow for chunks of wilds and symbols to pay. In some embodiments, Wilds may stay in place until it is awarded. This would allow for the wild to grow in size allowing for either: multiplier attached to the wild; additional wilds stacking up and growing on the spot; or physically growing outwards on the Z axis onscreen.

Scatters may be used in a stacked configuration as well. Scatters may be placed on top of each other to create a depth showing multiple scatters in one spot, resulting in an award for a collective number of scatters. Scatters may also have a multiplier attached to each of the layers in the depth, for example, the front one is worth 1×, the second level is worth 2×, the third level is worth 3×, etc.

The third dimension provided by the enhanced game components may act as a portal or hole into the game (e.g. base game, secondary game, bonus game), given access to a bonus round or an additional win category. Symbols may appear with multiple layers and players may collect symbols and place them one on top of another in a single space. Three-dimensional stacks may be formed by allowing for symbols to be stacked not just on the vertical but also in the third (z) axis, allowing for depth to the normally viewed stacked symbol.

The game component enhancements allow for chunks of symbols that are spanning the vertical space of the reel to also have a back expansion area that causes a 'block' effect. It allows for chunks of symbols that are spanning the horizontal space of the reel to also have a back expansion area that causes a 'block' effect. It may also allow for depth on certain reels to create a new pattern of the physical game grid dimension.

Triggers may be modified using the game component enhancements. Such triggers may include, for example, consecutive triggers (on or outside of a reel), scatter, and trigger tiles. Triggers may lead to various events, such as additional credits, additional payouts, secondary games, bonus rounds, etc. Trigger tiles may be placed on any reel shape/dimension as desired, as a triggering mechanism. Multiple layers could be applied to this triggering mechanism as well. Pay ways may also be modified, as the enhancements allow for multiple games to be played in the same space. Shapes of lines wins may be collected to create a full screen pattern of extra prizes. Different layers with different line sets may be played all at once.

The game enhancements may be applied to multiple environments, such as Keno, 3D game grids, Player User Interfaces (PUI), Greenball (as described in U.S. application Ser. No. 13/631,129, the contents of which are hereby incorporated by reference), and many others. For Keno, multiple balls may be placed on a same number. One screen may be provided with layered effects. For 3D game grids, a 'cube' effect may be created, where the player can interact with the cube to 'spin' it to reveal an additional bonus prize. The enhancement offers a position to expand outwards to create a multiple symbol container. It also offers multi-levels, different matrices, games that become available during bonus rounds as special features activate the exterior, or multiple games to be wagered upon. Multi-facet game boards (i.e. with a matrix on different angles) are also possible.

Bonus types may also be enhanced via the game component enhancements. For example, multiple free games may be played in a layered style. This allows for symbols that land one in front of another that match to create some sort of super win/super symbol that spans in depth and possibly in height, if synchronized reels are used. In a picking screen for picking a prize, the player may grab and drag the 3D object and reposition it on the screen. Progressive posts may get physically larger and expand outwards to show the player that they are getting closer to being awarded, and/or larger in value.

The user interfaces, computer implemented methods, and computer system components described may be used in connection with a variety of different games that are pattern games or that include pattern game components.

Various functions or features described in this disclosure may be implemented as part of different gaming systems. For example:

(A) The winning enhancements may be implemented as part of a game to system (G2S) system.

(B) As previously stated, the user interfaces, computer implemented methods, and computer system components described herein may be used by an EGM.

(C) In the event the game is a lottery game, the game computer may be an in-store gaming system or a gaming kiosk. For lottery games including the enhancements to the game components, the host system may be controlled by a government agency.

As described herein, a third dimension may be provided by the enhanced game components. Three dimensional enhancements may be provided as a primary game (or base game), secondary game or a bonus game in some embodiments. Motion tracking data for the player received via camera may be used to update and modify the three dimensional enhancements, for example. Head and body movements of the player may control aspects of the game.

In some example embodiments, the number of bonus choices may be proportional to the size of the bet, or average bet. The number of features may also be proportional to the size of the bet, or average bet.

Three dimensional enhancements may be provided as dynamic content, where bonus selection and other gaming features may display differently from one trigger to the next. The three dimensional enhancements provide variety in primary and bonus game types to appeal to a broad player demographic.

A bonus game may include progressive levels and may be of a different game type than the primary game, including new symbols and rules. There may also be hidden features within the game.

The game may be a tile based game where different lines shapes of corresponding tiles may be associated with different winning amounts for the game.

Three dimensional enhancements may be used for various game features. For example, there may be a three dimensional enhancement for a trigger symbol, a base game, a tension spin, a large or medium win, a bonus game, a bonus game choice entry, help functionality, introduction to game, and so on.

An example flow for a game with three dimensional enhancements may include a base game with bonus or hidden features. There may be a trigger within the base game to launch a bonus selection game level where the player can select a bonus game from multiple choices. There may be a short description for each bonus game. The amount of bet or average bet within the base game may be proportional to the number of bonus game choices. For example, a higher bet may increase the number of bonus games to select from. The bonus games may be different types of games. The base game may also be a different type of game.

The game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, changes and modifications may be made.

The invention claimed is:

1. An electronic gaming machine for providing game components with three-dimensional (3D) enhancement, the machine comprising:

at least one processor;

at least one persistent data store;

at least one receiver to receive game data for storage in the at least one persistent data store;

a display device configured with a user interface to display at least one of a row and a column of the game components along a plane on a display device in accordance with a set of game rules for a given game, each one of the game components having an original symbol associated thereto, and to display an item in a manner that imitates at least one physics property that includes collision behavior and that interacts with at least one of the game components to display the at least one of the game components separating into at least two pieces in response to a collision between the item and the at least one of the game components, wherein the item provides a 3D enhancement, and wherein the at least one processor is configured to integrate the item into the given game based on the interaction.

2. The electronic gaming machine of claim 1, wherein the at least one processor is further configured to integrate the item into the given game based on the interaction by awarding at least one of wilds, bonus triggers, extra credits, change in the symbols, and special symbols.

3. The electronic gaming machine of claim 1, wherein the at least one physics property includes gravity, and wherein the at least one processor is further configured to associate the item with a virtual weight so that the item reacts differently to a virtual gravity effect.

4. The electronic gaming machine of claim 1, wherein the display device is further configured to display the original symbol of the at least one game component separating into at least two symbols in response to a collision between the item and the at least one of the game components.

5. The electronic gaming machine of claim 1, wherein the display device is further configured to display the item falling towards the plane of the display device.

6. The electronic gaming machine of claim 5, wherein the item interacts with the game components while falling.

7. The electronic gaming machine of claim 1, wherein the item is integrated into the given game as a game component.

8. An electronic gaming system for providing game components with 3D enhancement, the system comprising:

a server comprising a transmitter for transmitting electronic data signals representing game data;

an electronic device comprising: at least one processor; at least one persistent data store;

at least one receiver to receive game data for storage in the at least one persistent data store;

a display device configured with a user interface to display at least one of a row and a column of the game components along a plane on a display device in accordance with a set of game rules for a given game, each one of the game components having an original symbol associated thereto, and to display an item in a manner that imitates at least one physics property that includes collision behavior and that interacts with at least one of the game components to display the at least one of the game components separating into at least two pieces in response to a collision between the item and the at least one of the game components, wherein the item provides a 3D enhancement; wherein the at least one processor is configured to integrate the item into the given game based on the interaction; and a network configured to provide a communication link to couple the server and the electronic device.

9. The electronic gaming system of claim 8, wherein the electronic device is an electronic gaming terminal and wherein the system further comprises:

a mobile gaming device operated by a player coupled via a communications link to the electronic gaming terminal, the mobile gaming device running a remote gaming program to play the given game, the electronic gaming terminal programmed to carry out at least the game functions of pseudo-randomly determining a game outcome and determining an award to a player and receiving player control signals by the electronic gaming terminal from the mobile gaming device to initiate the given game;

wherein the electronic gaming terminal is configured to carry out the given game by the electronic gaming terminal, including determining a final outcome of the given game and any award for the outcome and transmitting electronic data signals to the mobile gaming device identifying the final outcome of the given game and the award.

10. The electronic gaming system of claim 9, wherein the mobile gaming device is a laptop computer, a tablet computer, or a mobile phone.

11. The electronic gaming system of claim 8, wherein the network comprises a wireless network.

12. The electronic gaming system of claim 8, wherein the at least one processor is further configured to integrate the item into the given game based on the interaction by awarding at least one of wilds, bonus triggers, extra credits, change in the symbols, and special symbols.

13. The electronic gaming system of claim 8, wherein the at least one physics property includes gravity, and wherein the at least one processor is further configured to associate the item with a virtual weight so that the item reacts differently to a virtual gravity effect.

14. The electronic gaming system of claim 8, wherein the display device is further configured to display the original symbol of the at least one game component separating into at least two symbols in response to a collision between the item and the at least one of the game components.

15. The electronic gaming system of claim 8, wherein the display device is further configured to display the item falling towards the plane of the display device.

16. The electronic gaming system of claim 15, wherein the item interacts with the game components while falling.

17. The electronic gaming system of claim 8, wherein the item is integrated into the given game as a game component.

18. A computer-implemented method for providing game components with 3D enhancement in a gaming system, the method comprising:

displaying at least one of a row and a column of the game components along a plane on a display device in accordance with a set of game rules for a given game, each one of the game components having an original symbol associated thereto;

displaying an item in a manner that imitates at least one physics property that includes collision behavior and that interacts with at least one of the game components to display the at least one of the game components separating into at least two pieces in response to a collision between the item and the at least one of the game components, wherein the item provides a 3D enhancement; and integrating the item into the given game based on the interaction.

19. The computer-implemented method of claim 18, further comprising: integrating the item into the given game based on the interaction by awarding at least one of wilds, bonus triggers, extra credits, change in the symbols, and special symbols.

20. The computer-implemented method of claim 18, wherein the at least one physics property includes gravity, and wherein the method further comprises: associating the item with a virtual weight so that the item reacts differently to a virtual gravity effect.

21. The computer-implemented method of claim 18, wherein the display device is further configured to display the original symbol of the at least one game component separating into at least two symbols in response to a collision between the item and the at least one of the game components.

22. The computer-implemented method of claim 18, wherein the display device is further configured to display the item falling towards the plane of the display device.

23. The computer-implemented method of claim 22, wherein the item interacts with the game components while falling.

24. The computer-implemented method of claim 18, wherein the item is integrated into the given game as a game component.

25. The electronic gaming machine of claim 1, wherein the item is displayed to in a manner that imitates at least one physics property that includes gravity and that corresponds to a virtual weight, and wherein the virtual weight is heavy and the item is displayed in a manner that is biased in a gravitational direction or the virtual weight is light and the item is displayed in a manner that is opposite that gravitational direction.

* * * * *